US012206626B2

(12) United States Patent
Chen et al.

(10) Patent No.: US 12,206,626 B2
(45) Date of Patent: Jan. 21, 2025

(54) UPLINK TRANSMISSION TIMING PATTERNS

(71) Applicant: Qualcomm Incorporated, San Diego, CA (US)

(72) Inventors: Bo Chen, Beijing (CN); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 17/640,861

(22) PCT Filed: Sep. 9, 2020

(86) PCT No.: PCT/CN2020/114224
§ 371 (c)(1),
(2) Date: Mar. 7, 2022

(87) PCT Pub. No.: WO2021/047539
PCT Pub. Date: Mar. 18, 2021

(65) Prior Publication Data
US 2022/0345286 A1    Oct. 27, 2022

(30) Foreign Application Priority Data

Sep. 9, 2019   (WO) ................ PCT/CN2019/104838

(51) Int. Cl.
*H04L 5/14*      (2006.01)
*H04L 5/00*      (2006.01)
*H04W 72/23*     (2023.01)

(52) U.S. Cl.
CPC .......... *H04L 5/1469* (2013.01); *H04L 5/0007* (2013.01); *H04W 72/23* (2023.01)

(58) Field of Classification Search
None
See application file for complete search history.

(56) References Cited

U.S. PATENT DOCUMENTS 9,209,933 B2 * 12/2015  Damnjanovic ....... H04L 1/0026
10,999,886 B2 * 5/2021  Gaal ................. H04W 72/0446
(Continued)

FOREIGN PATENT DOCUMENTS

CN     105340196 A    2/2016
CN     107888356 A    4/2018
(Continued)

OTHER PUBLICATIONS

CMCC: "Considerations on Support of Supplementary Uplink Frequency", 3GPP TSG-RAN WG2 Meeting #99bis, R2-1711824, Prague, Czech, Oct. 9-13, 2017,Oct. 13, 2017 (Oct. 13, 2017) The Whole Document, 6 Pages.
(Continued)

*Primary Examiner* — Faiyazkhan Ghafoerkhan
(74) *Attorney, Agent, or Firm* — Holland & Hart LLP/Qualcomm

(57) ABSTRACT

Methods, systems, and devices for wireless communications are described. A communication device, otherwise known as a user equipment (UE) may receive an indication of an uplink transmission timing pattern configuration for transmitting uplink transmissions on a first carrier. The UE may identify to use both the first carrier and a second carrier during a single uplink transmission mode, where the UE may transition between sending the uplink transmissions on the first and second carriers. The UE may also determine, based on the uplink transmission timing pattern configuration, a timing of uplink carrier switching periods for retuning between transmissions on the first carrier and on the second carrier. As a result, the UE may transmit, during the single uplink transmission mode, on both the first carrier and the second carrier in accordance with the uplink transmission timing pattern configuration for the first carrier and the uplink carrier switching periods.

27 Claims, 35 Drawing Sheets

(56) References Cited

U.S. PATENT DOCUMENTS

| | | | |
|---|---|---|---|
| 2014/0369242 A1* | 12/2014 | Ng | H04L 5/001 370/280 |
| 2017/0033843 A1* | 2/2017 | Wang | H04W 4/70 |
| 2017/0302419 A1* | 10/2017 | Liu | H04L 5/0078 |
| 2018/0054824 A1* | 2/2018 | Xue | H04L 5/0098 |
| 2022/0345286 A1* | 10/2022 | Chen | H04L 5/0007 |

FOREIGN PATENT DOCUMENTS

| | | |
|---|---|---|
| CN | 109474400 A | 3/2019 |
| CN | 109565400 A | 4/2019 |
| CN | 109728890 A | 5/2019 |
| EP | 1258541 A2 | 11/2002 |
| EP | 2996418 A1 | 3/2016 |
| WO | WO-2010144875 | 12/2010 |
| WO | WO-2017027575 | 2/2017 |
| WO | WO-2017173388 A1 | 10/2017 |
| WO | WO-2018144433 A1 | 8/2018 |

OTHER PUBLICATIONS

International Search Report and Written Opinion—PCT/CN2020/114224—ISA/EPO—Dec. 15, 2020.

International Search Report and Written Opinion—PCT/CN2019/104838—ISA/EPO—May 27, 2020.

Sony: "Summary of SRS", 3GPP Draft, R1-1811880, 3GPP TSG RAN WG1 Meeting #94bis, Summary of SRS V04, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Oct. 12, 2018 (Oct. 12, 2018), XP051519203, 57 pages, Retrieved from the Internet: URL:http://www.3gpp.org/ftp/tsg%5Fran/WG1%5FRL1/TSGR1%5F94b/Docs/R1%2D1811880%2Ezip [retrieved on Oct. 12, 2018], p. 34 p. 2.

Supplementary European Search Report—EP20863955—Search Authority—The Hague—Sep. 7, 2023.

* cited by examiner

Uplink Symbols

Downlink Symbols

Reference Signal Symbols

UPLINK TRANSMISSION TIMING PATTERNS

CROSS REFERENCE TO RELATED APPLICATIONS

The present application is a 371 national stage filing of International PCT Application No. PCT/CN2020/114224 by Chen et al., entitled "UPLINK TRANSMISSION TIMING PATTERNS," filed Sep. 9, 2020; and claims priority to International PCT Application No. PCT/CN2019/104838 by Chen et al., entitled "UPLINK TRANSMISSION TIMING PATTERNS," filed Sep. 9, 2019, each of which is assigned to the assignee hereof, and each of which is expressly incorporated by reference in its entirety herein.

FIELD OF TECHNOLOGY

The following relates generally to wireless communications and more specifically to uplink transmission timing patterns.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, each of which may be otherwise known as a user equipment (UE). Some wireless communications systems may support a single uplink transmission mode for communication devices, for example, to support uplink carrier aggregation or a supplemental uplink transmission. Some wireless communications systems may also support configuring communication devices with uplink transmission timing patterns (e.g., in the form of slot structures, frame structures, etc.) that support one or more of a time division duplex (TDD) carrier or a frequency division duplex (FDD) carrier for the single uplink transmission mode. However, improvements in the uplink transmission timing patterns for application with a single uplink transmission mode are desired.

SUMMARY

The described techniques may relate to configuring communication devices, which may be user equipments (UEs), to support various uplink transmission timing patterns (also referred to as time-division duplexing (TDD) uplink-downlink (UL-DL) patterns). The communication devices may, in some examples, operate in single uplink transmission mode, which may support at least one new radio (NR) TDD carrier (e.g., a carrier in a high radio frequency band with a relatively large bandwidth) and at least one NR frequency-division duplexing (FDD) carrier uplink carrier or a TDD uplink carrier (e.g., a carrier in a low radio frequency band with a relatively small bandwidth) of a different carrier frequency. In a single uplink transmission mode, there is a chance that the communication devices may erroneously detect both uplink grants for an NR high-frequency TDD uplink carrier and an NR low-frequency FDD uplink carrier or an NR low-frequency TDD uplink carrier. The described techniques may remedy this type of error by configuring the communication devices to determine which uplink carrier to use according to an uplink transmission timing pattern. For example, the described techniques may configure the communication devices to receive an indication of an uplink transmission timing pattern configuration to use in transmitting uplink transmissions on a carrier. The uplink transmission timing pattern configuration may indicate an uplink transmission timing pattern. Additionally, the described techniques may configure the communication devices to use multiple carriers during the single uplink transmission mode, where the communication devices may transition between sending the uplink transmissions, for example, on the TDD carrier and on the FDD carrier.

In some examples, when the communication devices are configured with multiple uplink carriers on different frequencies, the described techniques may also configure one or more uplink carrier switching periods (e.g., uplink carrier switching gaps) as part of the uplink transmission timing patterns. These uplink carrier switching periods may be used by the communication devices for retuning of the NR TDD uplink carrier and the NR FDD uplink carrier for the uplink transmissions. As a result, the communication devices may perform radio frequency (RF)-retuning between uplink frequencies if the communication devices determine (or identify) the uplink transmission timing pattern appropriately, as well as a timing of the one or more uplink carrier switching periods for retuning between transmissions on the different carriers. The communication devices may follow the defined uplink transmission timing pattern including the timing of the one or more uplink carrier switching periods for the RF-retuning to reduce an overhead of the switching periods. The described techniques may configure signaling of the various uplink transmission timing patterns for the communication devices, as well as uplink carrier switching periods, to enable the communication devices to experience improvements to power consumption, spectral efficiency, or higher data rates and, in some examples, may promote enhanced efficiency for wireless communication operations, among other benefits when operating in a single uplink transmission mode.

A method of wireless communication at a UE is described. The method may include receiving an indication of an uplink transmission timing pattern configuration for use by the UE in transmitting uplink transmissions on a first carrier, identifying that the UE is to use both the first carrier and a second carrier during a single uplink transmission mode, where the UE transitions between sending the uplink transmissions on the first carrier and on the second carrier, determining, based on the uplink transmission timing pattern configuration, a timing of one or more uplink carrier switching periods for retuning between transmissions on the first carrier and on the second carrier, and transmitting, during the single uplink transmission mode, on both the first carrier and the second carrier in accordance with the uplink transmission timing pattern configuration for the first carrier and the one or more uplink carrier switching periods.

An apparatus for wireless communication is described. The apparatus may include a processor, memory coupled with the processor, and instructions stored in the memory. The instructions may be executable by the processor to cause the apparatus to receive an indication of an uplink transmission timing pattern configuration for use by the apparatus in transmitting uplink transmissions on a first carrier, identify that the apparatus is to use both the first carrier and a second carrier during a single uplink transmission mode, where the apparatus transitions between sending the uplink transmissions on the first carrier and on the second carrier, determine, based on the uplink transmission timing pattern configuration, a timing of one or more uplink carrier switching periods for retuning between transmissions on the first carrier and on the second carrier, and transmit, during the single uplink transmission mode, on both the first carrier and the second carrier in accordance with the uplink transmission timing pattern configuration for the first carrier and the one or more uplink carrier switching periods.

Another apparatus for wireless communication is described. The apparatus may include means for receiving an indication of an uplink transmission timing pattern configuration for use by the apparatus in transmitting uplink transmissions on a first carrier, identifying that the apparatus is to use both the first carrier and a second carrier during a single uplink transmission mode, where the apparatus transitions between sending the uplink transmissions on the first carrier and on the second carrier, determining, based on the uplink transmission timing pattern configuration, a timing of one or more uplink carrier switching periods for retuning between transmissions on the first carrier and on the second carrier, and transmitting, during the single uplink transmission mode, on both the first carrier and the second carrier in accordance with the uplink transmission timing pattern configuration for the first carrier and the one or more uplink carrier switching periods.

A non-transitory computer-readable medium storing code for wireless communication at a UE is described. The code may include instructions executable by a processor to receive an indication of an uplink transmission timing pattern configuration for use by the UE in transmitting uplink transmissions on a first carrier, identify that the UE is to use both the first carrier and a second carrier during a single uplink transmission mode, where the UE transitions between sending the uplink transmissions on the first carrier and on the second carrier, determine, based on the uplink transmission timing pattern configuration, a timing of one or more uplink carrier switching periods for retuning between transmissions on the first carrier and on the second carrier, and transmit, during the single uplink transmission mode, on both the first carrier and the second carrier in accordance with the uplink transmission timing pattern configuration for the first carrier and the one or more uplink carrier switching periods.

In some examples of the method, apparatuses, and non-transitory computer-readable medium described herein, receiving the indication of the uplink transmission timing pattern configuration may include operations, features, means, or instructions for receiving a radio resource control message, where the indication of the uplink transmission timing pattern configuration includes one or more blank symbol information elements in the radio resource control message, the radio resource control message also including an indication of a specific carrier on which one or more uplink carrier switching periods are used for the retuning between the first carrier and the second carrier.

Some examples of the method, apparatuses, and non-transitory computer-readable medium described herein may further include operations, features, means, or instructions for identifying one or more blank uplink symbols based on one or more blank symbol information elements received with the uplink transmission timing pattern configuration, and where the one or more blank uplink symbols correspond to the timing of the one or more uplink carrier switching periods for the retuning between the first carrier and the second carrier.

In some examples of the method, apparatuses, and non-transitory computer-readable medium described herein, the one or more blank uplink symbols correspond to one or more uplink symbols of the uplink transmission timing pattern configuration.

In some examples of the method, apparatuses, and non-transitory computer-readable medium described herein, the one or more blank uplink symbols correspond to a time duration of the uplink transmissions on the second carrier.

Some examples of the method, apparatuses, and non-transitory computer-readable medium described herein may further include operations, features, means, or instructions for determining, based on the one or more blank symbol information elements, that one or more beginning uplink symbols of the uplink transmission timing pattern configuration may be tagged as the one or more blank uplink symbols.

Some examples of the method, apparatuses, and non-transitory computer-readable medium described herein may further include operations, features, means, or instructions for determining, based on the one or more blank symbol information elements, that one or more ending uplink symbols of the uplink transmission timing pattern configuration may be tagged as the one or more blank uplink symbols.

Some examples of the method, apparatuses, and non-transitory computer-readable medium described herein may further include operations, features, means, or instructions for determining that the timing and specific carrier of the one or more uplink carrier switching periods for the retuning between the first carrier and the second carrier correspond to one or more uplink symbols of the uplink transmission timing pattern configuration of the first carrier based on the one or more blank uplink symbols in the uplink transmission timing pattern configuration and the specific carrier.

In some examples of the method, apparatuses, and non-transitory computer-readable medium described herein, transmitting during the single uplink transmission mode on both the first carrier and the second carrier may include operations, features, means, or instructions for transmitting the uplink transmissions on the second carrier, retuning from the second carrier to the first carrier based on the timing and specific carrier of the one or more uplink carrier switching periods, and transmitting the uplink transmissions on the first carrier and on one or more uplink symbols of the uplink transmission timing pattern configuration based on the retuning.

In some examples of the method, apparatuses, and non-transitory computer-readable medium described herein, the retuning from the second carrier to the first carrier occurs before the one or more uplink symbols of the first carrier.

In some examples of the method, apparatuses, and non-transitory computer-readable medium described herein, the retuning from the second carrier to the first carrier occurs after the one or more uplink symbols of the first carrier.

In some examples of the method, apparatuses, and non-transitory computer-readable medium described herein, transmitting during the single uplink transmission mode on both the first carrier and the second carrier may include operations, features, means, or instructions for transmitting the uplink transmissions on the first carrier, retuning from the first carrier to the second carrier based at least in part on the timing and specific carrier of the one or more uplink carrier switching periods, and transmitting the uplink transmissions on the second carrier and on one or more uplink symbols of the uplink transmission timing pattern configuration based at least in part on the retuning.

In some examples of the method, apparatuses, and non-transitory computer-readable medium described herein, transmitting during the single uplink transmission mode on both the first carrier and the second carrier may include operations, features, means, or instructions for transmitting the uplink transmissions on the first carrier and on one or more uplink symbols of the uplink transmission timing pattern configuration.

In some examples of the method, apparatuses, and non-transitory computer-readable medium described herein, transmitting during the single uplink transmission mode on both the first carrier and the second carrier may include operations, features, means, or instructions for transmitting the uplink transmissions on the second carrier during a time duration corresponding to downlink symbols or one or more blank uplink symbols of the uplink transmission timing pattern configuration.

Some examples of the method, apparatuses, and non-transitory computer-readable medium described herein may further include operations, features, means, or instructions for identifying an absence of one or more blank uplink symbols in the uplink transmission timing pattern configuration or in one or more information elements, where the one or more blank uplink symbols correspond to the timing of the one or more uplink carrier switching periods for the retuning between the first carrier and the second carrier by the UE.

Some examples of the method, apparatuses, and non-transitory computer-readable medium described herein may further include operations, features, means, or instructions for determining that the timing of the one or more uplink carrier switching periods for the retuning between the first carrier and the second carrier corresponds to one or more symbols of the second carrier based on the absence of one or more blank uplink symbols in the uplink transmission timing pattern configuration.

Some examples of the method, apparatuses, and non-transitory computer-readable medium described herein may further include operations, features, means, or instructions for determining capability information of the UE and transmitting the capability information, where the uplink transmission timing pattern configuration may be indicated based on the capability information.

In some examples of the method, apparatuses, and non-transitory computer-readable medium described herein, the uplink transmission timing pattern configuration may be UE-specific.

In some examples of the method, apparatuses, and non-transitory computer-readable medium described herein, the uplink transmission timing pattern configuration may be cell-specific.

In some examples of the method, apparatuses, and non-transitory computer-readable medium described herein, the first carrier includes a TDD carrier.

In some examples of the method, apparatuses, and non-transitory computer-readable medium described herein, the second carrier includes an FDD carrier.

In some examples of the method, apparatuses, and non-transitory computer-readable medium described herein, a quantity of blank uplink symbols corresponding to the timing of the one or more uplink carrier switching periods for the retuning between the first carrier and the second carrier may be based on a location of the UE within a cell.

In some examples of the method, apparatuses, and non-transitory computer-readable medium described herein, the quantity of blank uplink symbols may be higher at a cell edge of the cell compared to a cell center of the cell.

A method of wireless communication at a base station is described. The method may include receiving capability information from a UE, determining, based on the capability information, an uplink transmission timing pattern configuration for use by the UE in transmitting uplink transmissions on a first carrier during a single uplink transmission mode, the uplink transmission timing pattern configuration including one or more blank uplink symbols corresponding to a timing of one or more uplink carrier switching periods for retuning between the first carrier and a second carrier by the UE when operating in the single uplink transmission mode, and transmitting an indication of the uplink transmission timing pattern configuration to the UE.

An apparatus for wireless communication is described. The apparatus may include a processor, memory coupled with the processor, and instructions stored in the memory. The instructions may be executable by the processor to cause the apparatus to receive capability information from a UE, determine, based on the capability information, an uplink transmission timing pattern configuration for use by the UE in transmitting uplink transmissions on a first carrier during a single uplink transmission mode, the uplink transmission timing pattern configuration including one or more blank uplink symbols corresponding to a timing of one or more uplink carrier switching periods for retuning between the first carrier and a second carrier by the UE when operating in the single uplink transmission mode, and transmit an indication of the uplink transmission timing pattern configuration to the UE.

Another apparatus for wireless communication is described. The apparatus may include means for receiving capability information from a UE, determining, based on the capability information, an uplink transmission timing pattern configuration for use by the UE in transmitting uplink transmissions on a first carrier during a single uplink transmission mode, the uplink transmission timing pattern configuration including one or more blank uplink symbols corresponding to a timing of one or more uplink carrier switching periods for retuning between the first carrier and a second carrier by the UE when operating in the single uplink transmission mode, and transmitting an indication of the uplink transmission timing pattern configuration to the UE.

A non-transitory computer-readable medium storing code for wireless communication at a base station is described. The code may include instructions executable by a processor to receive capability information from a UE, determine, based on the capability information, an uplink transmission timing pattern configuration for use by the UE in transmitting uplink transmissions on a first carrier during a single uplink transmission mode, the uplink transmission timing pattern configuration including one or more blank uplink symbols corresponding to a timing of one or more uplink carrier switching periods for retuning between the first carrier and a second carrier by the UE when operating in the single uplink transmission mode, and transmit an indication of the uplink transmission timing pattern configuration to the UE.

In some examples of the method, apparatuses, and non-transitory computer-readable medium described herein, transmitting the indication of the uplink transmission timing pattern configuration may include operations, features, means, or instructions for transmitting a radio resource control message, where the indication of the uplink transmission timing pattern configuration includes an information element in the radio resource control message.

Some examples of the method, apparatuses, and non-transitory computer-readable medium described herein may further include operations, features, means, or instructions for configuring one or more information elements to indicate presence or absence of the one or more blank uplink symbols.

In some examples of the method, apparatuses, and non-transitory computer-readable medium described herein, the one or more blank uplink symbols correspond to one or more uplink symbols of the uplink transmission timing pattern configuration.

Some examples of the method, apparatuses, and non-transitory computer-readable medium described herein may further include operations, features, means, or instructions for configuring one or more information elements to indicate that one or more beginning uplink symbols of the uplink transmission timing pattern configuration may be tagged as the one or more blank uplink symbols.

Some examples of the method, apparatuses, and non-transitory computer-readable medium described herein may further include operations, features, means, or instructions for configuring one or more information elements to indicate that one or more ending uplink symbols of the uplink transmission timing pattern configuration may be tagged as the one or more blank uplink symbols.

In some examples of the method, apparatuses, and non-transitory computer-readable medium described herein, the uplink transmission timing pattern configuration may be UE-specific.

In some examples of the method, apparatuses, and non-transitory computer-readable medium described herein, the uplink transmission timing pattern configuration may be cell-specific.

In some examples of the method, apparatuses, and non-transitory computer-readable medium described herein, the first carrier includes a TDD carrier.

In some examples of the method, apparatuses, and non-transitory computer-readable medium described herein, the second carrier includes an FDD carrier.

In some examples of the method, apparatuses, and non-transitory computer-readable medium described herein, a quantity of blank uplink symbols corresponding to the timing of the one or more uplink carrier switching periods for the retuning between the first carrier and the second carrier may be based on a location of the UE within a cell.

In some examples of the method, apparatuses, and non-transitory computer-readable medium described herein, the quantity of blank uplink symbols may be higher at a cell edge of the cell compared to a cell center of the cell.

DETAILED DESCRIPTION

Figure 1:
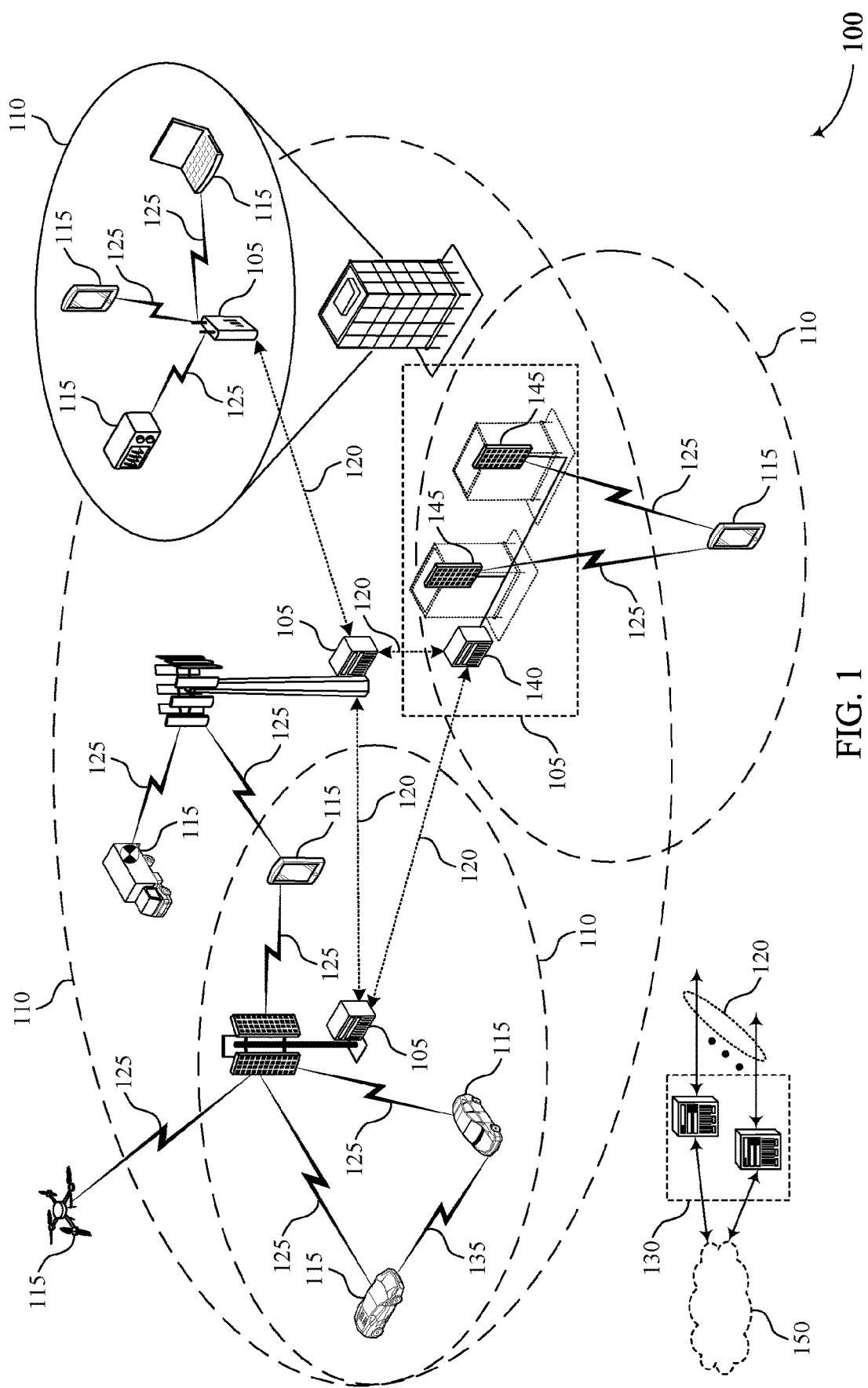
FIGS. 1 and 2 illustrate examples of a wireless communications system that supports uplink transmission timing patterns in accordance with aspects of the present disclosure.

Some wireless communication systems may include communication devices, such as user equipments (UEs) and base stations, for example, eNodeBs (eNBs), next-generation NodeBs or giga-NodeBs (either of which may be referred to as a gNB) that may support various radio access technologies. Examples of radio access technologies include 4G systems such as Long Term Evolution (LTE) systems and fifth generation (5G) systems which may be referred to as New Radio (NR) systems. The communication devices may, in some examples, support one of the above example radio access technologies while operating in a single uplink transmission mode. In the single uplink transmission mode, the communication devices may support at least one NR time-division duplexing (TDD) carrier and at least one NR frequency-division duplexing (FDD) carrier uplink carrier or a TDD uplink carrier of a different carrier frequency. In some examples, in the single uplink transmission mode, the communication devices may transmit one uplink transmission at a time, but may use one or more different uplink carriers for the uplink transmission. The NR TDD carrier may be a carrier in a high radio frequency band with a relatively large bandwidth, while the NR FDD carrier uplink carrier or the TDD uplink carrier may be a carrier in a low radio frequency band with a relative smaller bandwidth compared to the NR TDD carrier.

In some examples, the communication devices may incorrectly receive uplink grants for an NR high-frequency TDD uplink carrier and an NR low-frequency FDD uplink carrier or an NR low-frequency TDD uplink carrier. The communication devices may thus be configured to determine which uplink carrier to use according to an uplink transmission timing pattern to avoid the incorrect reception (detection) of the uplink grants. For example, the communication devices may be configured to receive an indication of an uplink transmission timing pattern to use in transmitting uplink transmissions on a carrier (e.g., a TDD carrier). Additionally, the communication devices may be configured to use both the carrier and an additional carrier (e.g., an FDD carrier) during the single uplink transmission mode, where the communication devices may transition between sending the uplink transmissions on the TDD carrier and on the FDD carrier.

The uplink transmission timing patterns may be dependent on uplink data channel coverages for different radio frequency bands. For example, the communication devices may be configured to use a higher bandwidth carrier for the uplink transmissions when the communication devices are at a cell center, such that the communication devices may achieve higher uplink performance. In other examples, the communication devices may be configured to use a lower bandwidth carrier for the uplink transmission when the communication devices are at a cell edge, due to coverage issues of higher frequency carriers. The TDD carrier may correspond to the uplink transmission timing patterns, which may include one or more uplink slots. The communication devices may transmit uplink transmissions using the FDD uplink carrier during all times except during the uplink slots of the TDD carrier. During the uplink slots of the TDD carrier, the communication devices may transmit using the TDD carrier. In some examples, when the communication devices are configured with multiple uplink carriers on different frequencies, the uplink transmission timing patterns may be configured with one or more uplink carrier switching periods, which may also be referred to as uplink carrier switching gaps. In some examples, the communication devices may assume a zero-second retuning time between uplink transmissions on different carriers. However, in some examples, the communication devices may not have multiple different uplink transmission chains. As a result, the communication devices having a single uplink transmission chain may experience a retuning time between transmission on the FDD uplink carrier and transmissions during uplink symbols of the TDD carrier.

The uplink carrier switching periods may be used by the communication devices for retuning of the NR TDD uplink carrier and the NR FDD uplink carrier. As a result, the communication devices may be configured to perform radio frequency (RF)-retuning between uplink frequencies if the communication devices determine (or identify) the uplink transmission timing pattern appropriately, as well as a timing of the one or more uplink carrier switching periods for retuning between transmissions on the different carriers. The communication devices may be configured to follow a defined uplink transmission timing pattern including the timing of the one or more uplink carrier switching periods for the RF-retuning to reduce an overhead of the switching periods. Therefore, as demand for communication efficiency increases, some wireless communications systems may fail to support satisfactory uplink transmission timing patterns and thereby may be unable to support reliable wireless communications. To address the above deficiencies, the communication devices may be configured to receive signaling of uplink transmission timing patterns, as well as configuration of uplink carrier switching periods.

Particular aspects of the subject matter described in this disclosure may be implemented to realize one or more of the following potential advantages. The techniques employed by the described one or more communication devices may provide benefits and enhancements to the operation of the communication devices. For example, operations performed by the described one or more communication devices may provide improvements to power consumption when operating in a single uplink transmission mode. In some examples, configuring the described one or more communication devices with signaling capability of uplink transmission timing patterns may support improvements to spectral efficiency, higher data rates and, in some examples, may promote enhanced efficiency for wireless communication operations, among other benefits when operating in a single uplink transmission mode.

Aspects of the disclosure are initially described in the context of wireless communications systems. Aspects of the disclosure are further illustrated by and described with reference to uplink transmission timing patterns and process flows that relate to single uplink transmission mode operations. Aspects of the disclosure are further illustrated by and described with reference to apparatus diagrams, system diagrams, and flowcharts that relate to uplink transmission timing patterns that relate to single uplink transmission mode operations.

FIG. 1 illustrates an example of a wireless communications system 100 that supports uplink transmission timing patterns in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

UEs 115 may receive an indication of an uplink transmission timing pattern for transmitting uplink transmissions on a first carrier. The UEs 115 may identify to use both the first carrier and a second carrier during a single uplink transmission mode, where the UEs 115 may transition between sending the uplink transmissions on the first and second carriers. The UE may also determine, based on the uplink transmission timing pattern, a timing of uplink carrier switching periods for retuning between transmissions on the first carrier and on the second carrier. As a result, the UEs 115 may transmit, during the single uplink transmission mode, on both the first carrier and the second carrier in accordance with the uplink transmission timing pattern for the first carrier and the uplink carrier switching periods.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
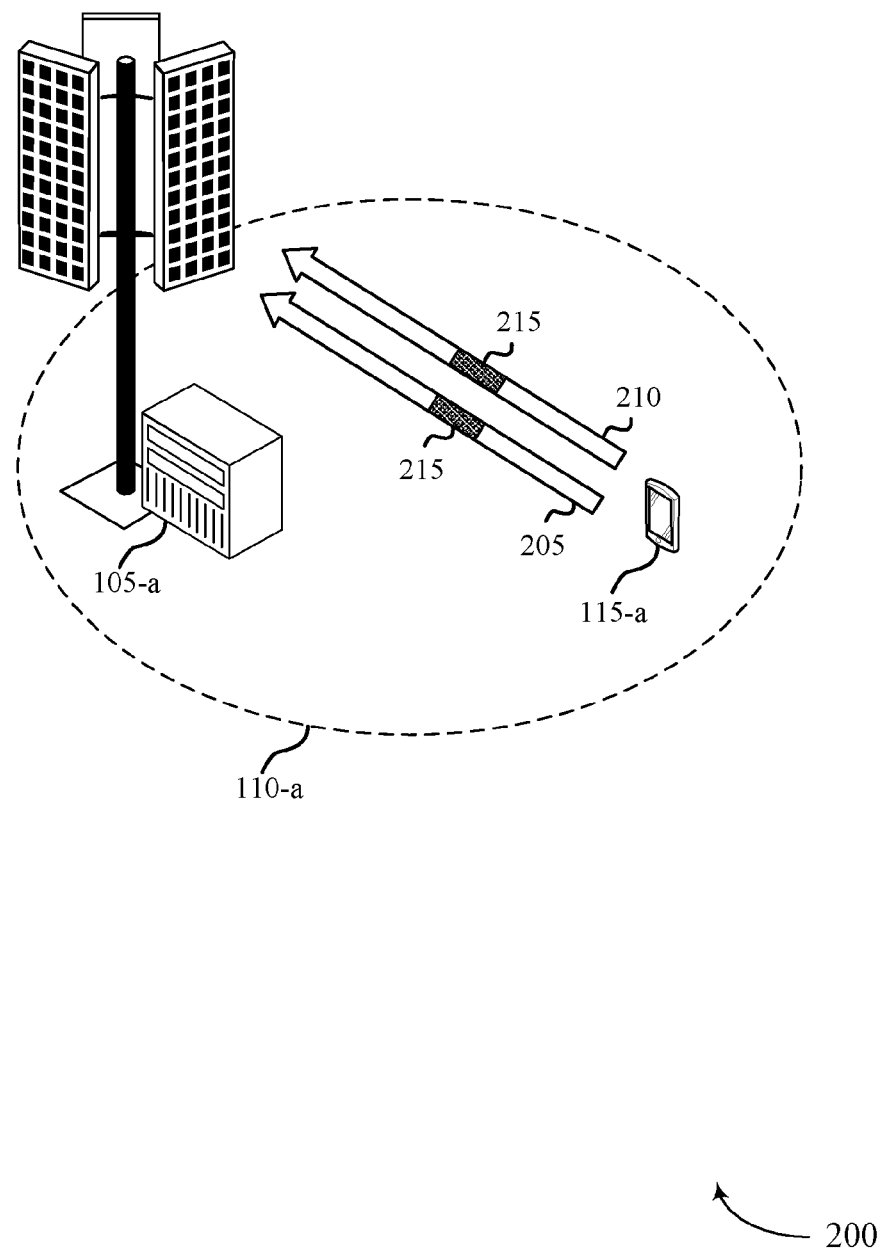

FIG. 2 illustrates an example of a wireless communications system 200 that supports uplink transmission timing patterns in accordance with aspects of the present disclosure. The wireless communications system 200 may include a base station 105-*a* and a UE 115-*a* within a geographic coverage area 110-*a*. The base station 105-*a* and the UE 115-*a* may be examples of the corresponding devices described with reference to FIG. 1. In some examples, the wireless communications system 200 may support one or more radio access technologies including 4G systems such as LTE systems, LTE-A systems, or LTE-A Pro systems, and 5G systems which may be referred to as NR systems. In some examples, the wireless communications system 200 may implement aspects of the wireless communications system 100 to support improvements to power consumption, spectral efficiency, higher data rates and, in some examples, may promote enhanced efficiency for wireless communication operations, among other benefits.

The UE 115-*a* may support one of the above example radio access technologies, such as NR, while operating in a carrier aggregation mode or a single uplink transmission mode. The modes may allow the UE 115-*a* to use multiple carriers for uplink transmissions. For example, the UE 115-*a* may support a first carrier 205 and a second carrier 210 for uplink transmissions 215. In some examples, one or more of the first carrier 205 or the second carrier 210 may be a TDD uplink carrier or an FDD uplink carrier. The TDD uplink carrier may be a carrier in a first radio frequency band with a first bandwidth, while the FDD uplink carrier may be a carrier in a second radio frequency band with a second bandwidth. In some examples, the first radio frequency band may be higher compared to the second radio frequency band. Additionally, the first bandwidth may be larger compared to the second bandwidth.

The UE 115-*a* may transmit the uplink transmissions 215, in some examples, in accordance with an uplink transmission timing pattern. The uplink transmission timing pattern may correspond to the first carrier 205. For example, in the single uplink transmission mode, the UE 115-*a* may transmit the uplink transmissions 215 one at a time, but may use one or more different uplink carriers (e.g., the second carrier 210) for the uplink transmissions 215. The first carrier 205 (e.g., a TDD uplink carrier) may have an uplink transmission timing pattern which includes one or more uplink slots. The UE 115-*a* may transmit the uplink transmissions 215 using the second carrier 210 (e.g., an FDD uplink carrier) during all slots except uplink slots of the first carrier 205. During the uplink slots of the first carrier 205, the UE 115-*a* may transmit the uplink transmission 215 using the first carrier 205 exclusively.

The base station 105-*a* may configure the UE 115-*a* with uplink transmission timing patterns, for example, semi-statically via RRC signaling or dynamic signaling (e.g., via downlink control information). In some examples, the uplink transmission timing patterns may be dependent on a position of the UE 115-*a* within the geographic coverage area 110-*a* (e.g., at a cell edge of the geographic coverage area 110-*a* or a cell center of the geographic coverage area 110-*a*). The base station 105-*a* may configure the UE 115-*a* to use a higher bandwidth carrier for the uplink transmissions 215 when the UE 115-*a* is at a cell center of the geographic coverage area 110-*a*, such that the UE 115-*a* may achieve higher uplink performance. In other examples, the base station 105-*a* may configure the UE 115-*a* to use a lower bandwidth carrier for the uplink transmissions 215 when the UE 115-*a* is at a cell edge of the geographic coverage area 110-*a*, due to coverage issues of higher frequency carriers. Examples of uplink transmission timing patterns for when the UE 115-*a* is at a cell center or a cell edge are described with reference to FIGS. 3 and 4.

Figure 3:
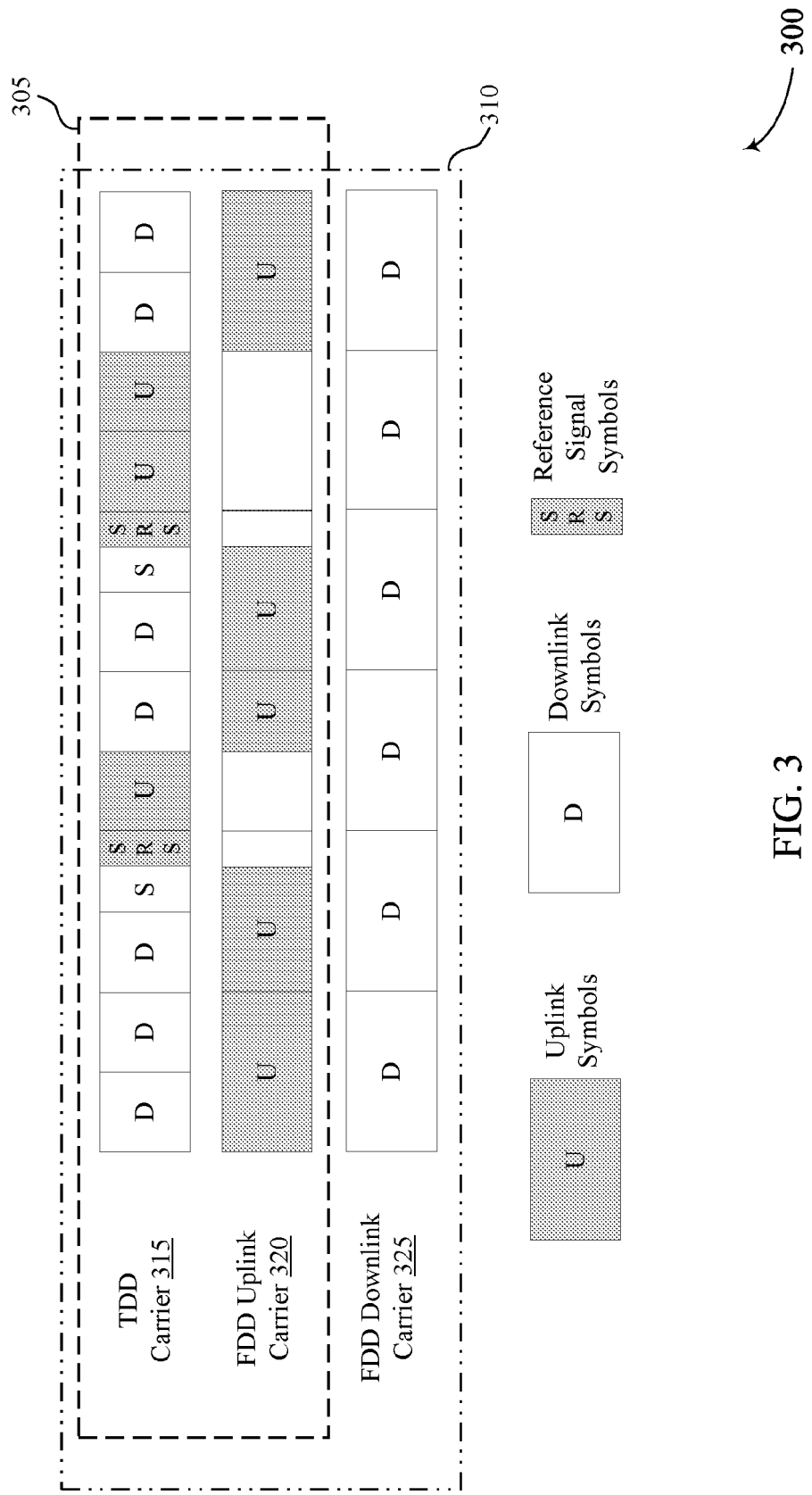
FIGS. 3 through 22 illustrate examples of uplink transmission timing patterns in accordance with aspects of the present disclosure.

FIG. 3 illustrates an example of an uplink transmission timing pattern 300 in accordance with aspects of the present disclosure. In some examples, the uplink transmission timing pattern 300 may also implement aspects of the wireless communications systems 100 and 200, as described with reference to FIGS. 1 and 2. For example, the uplink transmission timing pattern 300 may be based on a configuration by the base station 105-a and implemented by the UE 115-a. In the example of FIG. 3, the uplink transmission timing pattern 300 may correspond to when the UE 115-a is at a cell center of the geographic coverage area 110-a, as described in FIG. 2.

The uplink transmission timing pattern 300 may support one or more of a single uplink transmission mode 305 or a carrier aggregation mode 310. With reference to FIG. 2, the UE 115-a may communicate with the base station 105-a in accordance with the uplink transmission timing pattern 300. For example, when operating in the single uplink transmission mode 305, the UE 115-a may communicate with the base station 105-a via a TDD carrier 315 or an FDD uplink carrier 320. The TDD carrier 315 may be a carrier in a high radio frequency band, while the FDD uplink carrier 320 may be a carrier in a low radio frequency band. Similarly, the TDD carrier 315 may relate to a wide bandwidth, while the FDD uplink carrier 320 may relate to a narrow bandwidth. When operating in the carrier aggregation mode 310, the UE 115-a may, alternatively, communicate with the base station 105-a via one or more of the TDD carrier 315, the FDD uplink carrier 320, or the FDD downlink carrier 325. The FDD downlink carrier 325 may be a carrier in a low radio frequency band, and may relate to a narrow bandwidth.

In some examples, one or more of the TDD carrier 315, the FDD uplink carrier 320, or the FDD downlink carrier 325 of the uplink transmission timing pattern 300 may correspond to a slot configuration having one or more of downlink symbols or uplink symbols on which the UE 115-a may communicate with the base station 105-a. In some examples, one or more of the TDD carrier 315, the FDD uplink carrier 320, or the FDD downlink carrier 325 may correspond to a slot configuration having one or more symbols on which the UE 115-a may transmit reference signals, such as sounding reference signals, to the base station 105-a. The UE 115-a may thus, in accordance with the uplink transmission timing pattern 300, actively communicate with the base station 105-a exclusively on a single uplink carrier. That is, with reference to FIG. 2, the UE 115-a may transmit the uplink transmissions 215 one at a time, but may use one or more different uplink carriers for the uplink transmissions 215. Alternatively, the UE 115-a may transmit the uplink transmissions 215 using the FDD uplink carrier 320 during all slots except the uplink slots of the TDD carrier 315. During the uplink slots of the TDD carrier 315, the UE 115-a may transmit the uplink transmissions 215 using the TDD carrier 315 exclusively. As demand for communication efficiency increases, the uplink transmission timing pattern 300 may be insufficient to support the uplink transmissions 215, as described in FIG. 2, and thereby may be unable to support reliable wireless communications between the base station 105-a and the UE 115-a.

Figure 4:
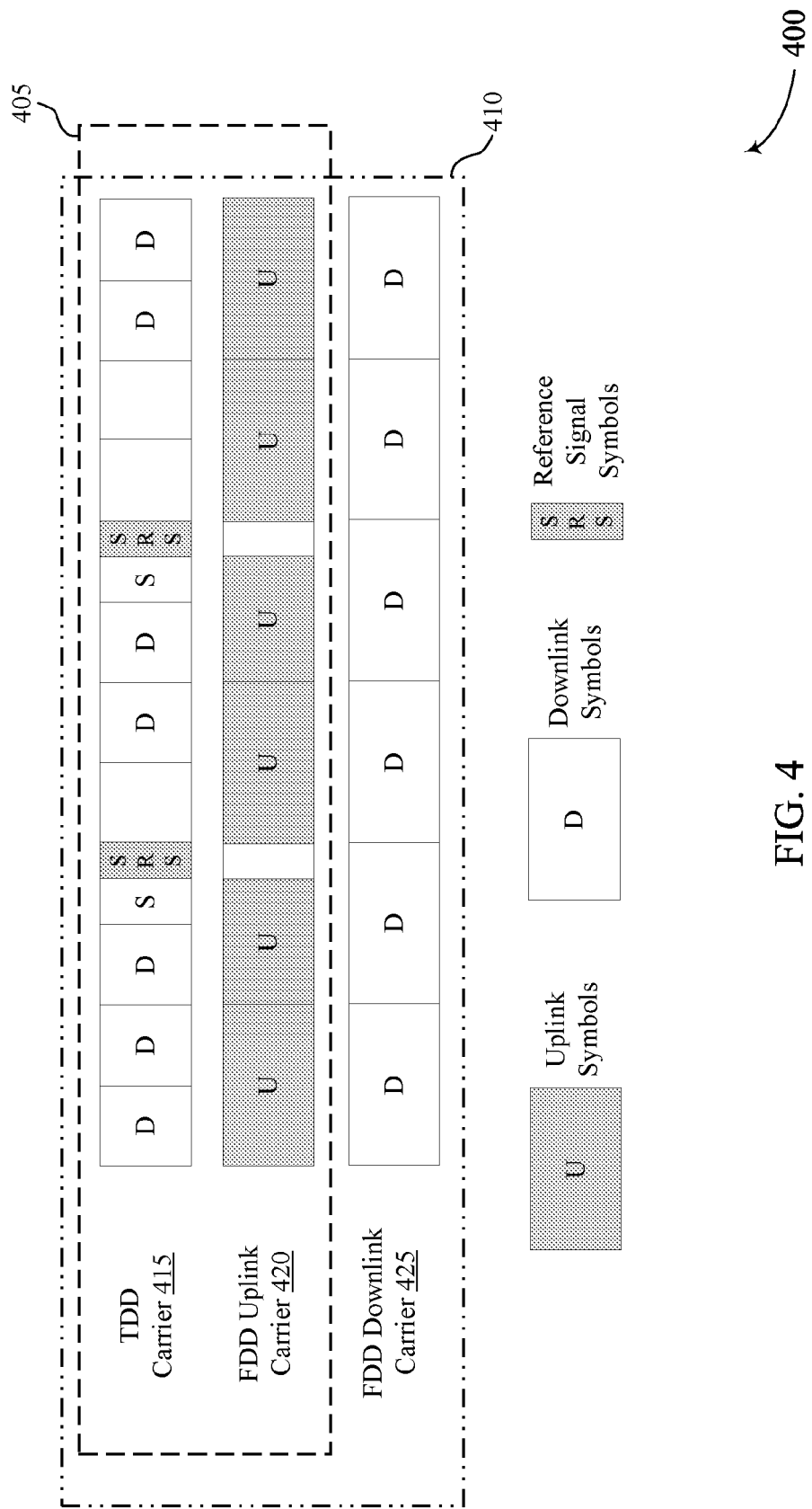

FIG. 4 illustrates an example of an uplink transmission timing pattern 400 in accordance with aspects of the present disclosure. In some examples, the uplink transmission timing pattern 400 may also implement aspects of the wireless communications systems 100 and 200, as described with reference to FIGS. 1 and 2. For example, the uplink transmission timing pattern 400 may be based on a configuration by the base station 105-a and implemented by the UE 115-a. In the example of FIG. 4, the uplink transmission timing pattern 400 may correspond to when the UE 115-a is at a cell edge of the geographic coverage area 110-a, as described in FIG. 2.

The uplink transmission timing pattern 400 may support one or more of a single uplink transmission mode 405 or a carrier aggregation mode 410. With reference to FIG. 2, the UE 115-a may communicate with the base station 105-a in accordance with the uplink transmission timing pattern 400. For example, when operating in the single uplink transmission mode 405, the UE 115-a may communicate with the base station 105-a via a TDD carrier 415 or an FDD uplink carrier 420. The TDD carrier 415 may be a carrier in a high radio frequency band, while the FDD uplink carrier 420 may be a carrier in a low radio frequency band. Similarly, the TDD carrier 415 may relate to a wide bandwidth, while the FDD uplink carrier 420 may relate to a narrow bandwidth. When operating in the carrier aggregation mode 410, the UE 115-a may, alternatively, communicate with the base station 105-a via one or more of the TDD carrier 415, the FDD uplink carrier 420, or the FDD downlink carrier 425. The FDD downlink carrier 425 may be a carrier in a low radio frequency band and may relate to a narrow bandwidth. In some examples, one or more of the TDD carrier 415, the FDD uplink carrier 420, or the FDD downlink carrier 425 of the uplink transmission timing pattern 400 may correspond to a slot configuration having one or more of downlink symbols or uplink symbols on which the UE 115-a may communicate with the base station 105-a. In some examples, one or more of the TDD carrier 415, the FDD uplink carrier 420, or the FDD downlink carrier 425 may correspond to a slot configuration having one or more symbols on which the UE 115-a may transmit signals to the base station 105-a.

In the example of FIG. 4, the UE 115-a may actively communicate with the base station 105-a exclusively on a single uplink carrier. That is, with reference to FIG. 2, the UE 115-a may transmit one uplink transmission 215 at a time, but may use one or more different uplink carriers for the uplink transmissions 215. The UE 115-a may transmit the uplink transmissions 215 using the FDD uplink carrier 420 during all times except the uplink slots of the TDD carrier 415. During the uplink slots of the TDD carrier 415, the UE 115-a may transmit the uplink transmissions 215 using the TDD carrier 415. As demand for communication efficiency increases, the uplink transmission timing pattern 400 may be inadequate to support the uplink transmissions 215, as described in FIG. 2, and thereby may be unable to support reliable wireless communications between the base station 105-a and the UE 115-a.

Returning to FIG. 2, the UE 115-a may, in some examples, erroneously receive, from the base station 105-a, uplink grants for the first carrier 205 (e.g., an NR high-frequency TDD uplink carrier) and the second carrier 210 (e.g., an NR low-frequency FDD uplink carrier or an NR low-frequency TDD uplink carrier). The base station 105-a may configure the UE 115-a with one or more uplink transmission timing pattern to avoid the improper reception (detection) of the uplink grants. In some examples, the uplink transmission timing patterns may be dependent on uplink data channel coverages for different radio frequency bands. The base station 105-a may, for example, configure the UE 115-a to use a higher bandwidth carrier for the uplink transmissions 215 when the UE 115-a is at a cell center of the geographic coverage area 110-a, such that the UE 115-a may achieve better uplink performance. In some other examples, the base station 105-a may configure the UE 115-a to use a lower bandwidth carrier for the uplink transmissions 215 when the UE 115-a is at a cell edge of the geographic coverage area 110-a, due to coverage issues of using higher frequency carriers. The base station 105-a may therefore configure the UE 115-a to determine which uplink carrier to use according to an uplink transmission timing pattern to prevent the improper reception (detection) of the uplink grants.

The base station 105-a may configure the UE 115-a semi-statically with one or more uplink transmission timing patterns (e.g., TDD-UL-DL-Config) according to RRC signaling. For example, the base station 105-a may transmit an RRC message that may carry an indication (e.g., via one or more information elements of the RRC message) of an uplink transmission timing pattern or a set of uplink transmission timing patterns. The one or more information elements of the RRC message may be UE-specific information elements or cell-specific information elements. In some examples, the UE 115-a may report capability information, which the base station 105-a may use for configuring (or selecting) an uplink transmission timing pattern for the UE 115-a to use for the uplink transmissions 215. In some examples, the uplink transmission timing pattern may correspond to a number of parameter values configured by the base station 105-a, which may be configured in accordance with the capability information.

A parameter corresponding to an uplink transmission timing pattern may be a slot configuration period parameter (e.g., dl-UL-TransmissionPeriodicity), which may have a parameter value corresponding to a slot configuration period of P msec. In some examples, a parameter corresponding to an uplink transmission timing pattern may be a downlink slot parameter (e.g., nrofDownlinkSlots), which may have a parameter value corresponding to a number of downlink slots $d_{slot}$ with exclusively downlink symbols. In some other examples, a parameter corresponding to an uplink transmission timing pattern may be a downlink symbol parameter (e.g., nrofDownlinkSymbol), which may have a parameter value corresponding to a number of downlink symbols $d_{sym}$. In some other examples, a parameter corresponding to an uplink transmission timing pattern may be an uplink slot parameter (e.g., nrofUplinkSlots), which may have a parameter value corresponding to a number of uplink slots $u_{slot}$ with exclusively uplink symbols. In other examples, a parameter corresponding to an uplink transmission timing pattern may be an uplink symbol parameter (e.g., nrofUplinkSymbol), which may have a parameter value corresponding to a number of uplink symbols $u_{sym}$. Thus, by way of example, a slot configuration period of P msec may include S slots. From the S slots, a first downlink slot $d_{slot}$ may include only downlink symbols and a last uplink slot $u_{slot}$ may include only uplink symbols. The downlink symbols $d_{sym}$ after the first downlink slot $d_{slot}$ are downlink symbols. The uplink symbols $u_{sym}$ before the last uplink slot $u_{slot}$ are uplink symbols. The base station 105-a may determine a number of flexible symbols according to the following expression:

$$((S-d_{slots}-u_{slots}) \cdot N_{symb}^{slot}-d_{sym}-u_{sym}) \quad (1)$$

Thus, the remaining symbols determined, according to Equation (1), in the slot configuration are flexible symbols. An example of an uplink transmission timing pattern according to one or more parameters corresponding to the uplink transmission timing pattern is described with reference to FIG. 5.

Figure 5:
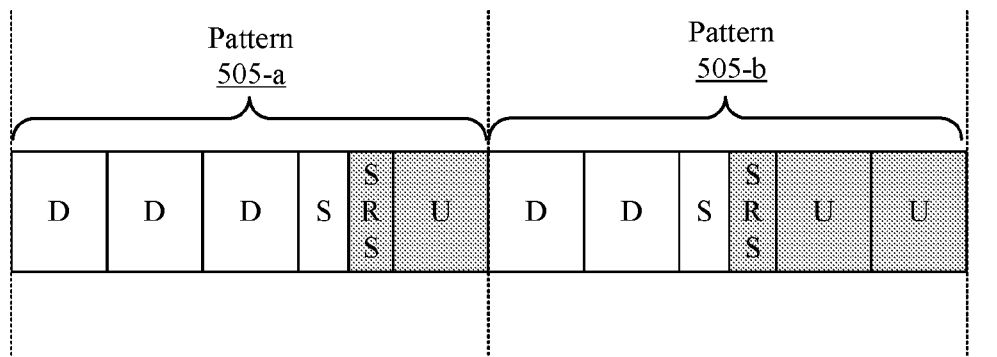
Figure 5:
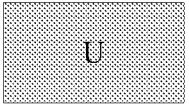
Figure 5:
Figure 5:

FIG. 5 illustrates an example of an uplink transmission timing pattern 500 in accordance with aspects of the present disclosure. More particularly, the uplink transmission timing pattern 500 may include one or more of a first uplink transmission timing pattern 505-a or a second uplink transmission timing pattern 505-b. In some examples, the uplink transmission timing pattern 500 may also implement aspects of the wireless communications systems 100 and 200, as described with reference to FIGS. 1 and 2. For example, the uplink transmission timing pattern 500 may be based on a configuration by the base station 105-a and implemented by the UE 115-a. In the example of FIG. 5, the uplink transmission timing pattern 500 may correspond to when the UE 115-a is at a cell edge or a cell center of the geographic coverage area 110-a, as described in FIG. 2.

In the example of FIG. 5, the first uplink transmission timing pattern 505-a and the second uplink transmission timing pattern 505-b may correspond to a number of different parameter values configured by the base station 105-a, as described in FIG. 2, which may be configured in accordance with the capability information provided by the UE 115-a. For example, for the first uplink transmission timing pattern 505-a, the base station 105-a may configure the slot configuration period parameter (e.g., dl-UL-TransmissionPeriodicity) by assigning the parameter value corresponding to the slot configuration period of P msec to be 2.5 msec. The base station 105-a may also configure a parameter value corresponding to a number of slots S to be 5 slots. Thus, the first uplink transmission timing pattern 505-a may have a total of 5 slots with a period of 2.5 msec.

The base station 105-a may also configure, for the first uplink transmission timing pattern 505-a, the downlink slot parameter (e.g., nrofDownlinkSlots) by assigning the parameter value corresponding to the number of downlink slots $d_{slot}$ to be 3 slots, which means 3 slots of the 5 slots have exclusively downlink symbols. The base station 105-a may also, for the first uplink transmission timing pattern 505-a, configure the downlink symbol parameter (e.g., nrofDownlinkSymbol) by assigning the parameter value corresponding to the number of downlink symbols $d_{sym}$ to be 10. Each downlink slot therefore includes 10 downlink symbols. The base station 105-a may configure, in some examples, the uplink slot parameter (e.g., nrofUplinkSlots) by assigning a parameter value corresponding to a number of uplink slots $u_{slot}$ to be 1, which means 1 slot of the 5 slots has exclusively uplink symbols. In other examples, the base station 105-a may configure the uplink symbol parameter (e.g., nrofUplinkSymbol) by assigning a parameter value corresponding to a number of uplink symbols $u_{sym}$ to be 2. Thus, each uplink slot includes 2 uplink symbols. The base station 105-a may, additionally, determine a number of flexible symbols according to Equation (1). Thus, the remaining symbols (e.g., 2 remaining symbols) determined, according to Equation (1), for the first uplink transmission timing pattern 505-a are flexible symbols.

In the example of FIG. 5, for the second uplink transmission timing pattern 505-b, the base station 105-a may configure the slot configuration period parameter (e.g., dl-UL-TransmissionPeriodicity) by assigning the parameter value corresponding to the slot configuration period of P msec to be 2.5 msec. The base station 105-a may also configure a parameter value corresponding to a number of slots S to be 5 slots. Thus, the second uplink transmission timing pattern 505-b may have a total of 5 slots with a period of 2.5 msec. For the second uplink transmission timing pattern 505-b, the base station 105-a may also configure the downlink slot parameter (e.g., nrofDownlinkSlots) by assigning the parameter value corresponding to the number of downlink slots $d_{slot}$ to be 2 slots, which means 2 slots of the 5 slots have exclusively downlink symbols. The base station 105-a may, for the second uplink transmission timing pattern 505-b, configure the downlink symbol parameter (e.g., nrofDownlinkSymbol) by assigning the parameter value corresponding to the number of downlink symbols $d_{sym}$ to be 10. Each downlink slot therefore includes 10 downlink symbols.

In some examples, the base station 105-a may configure, for the second uplink transmission timing pattern 505-b, the uplink slot parameter (e.g., nrofUplinkSlots) by assigning a parameter value corresponding to a number of uplink slots $u_{slot}$ to be 1, which means 1 slot of the 5 slots has exclusively uplink symbols. In other examples, the base station 105-a may configure, for the second uplink transmission timing pattern 505-b, the uplink symbol parameter (e.g., nrofUplinkSymbol) by assigning a parameter value corresponding to a number of uplink symbols $u_{sym}$ to be 2. Thus, each uplink slot includes 2 uplink symbols. The base station 105-a may also determine a number of flexible symbols according to Equation (1). Thus, the remaining symbols (e.g., 2 remaining symbols) determined, according to Equation (1), for the second uplink transmission timing pattern 505-b are flexible symbols.

Returning to FIG. 2, in some examples, when the UE 115-a is configured with multiple uplink carriers on different frequencies, the base station 105-a may configure the uplink transmission timing patterns with one or more uplink carrier switching periods. The uplink carrier switching periods may be used by the UE 115-a for retuning of the first carrier 205 and the second carrier 210. In some examples, the base station 105-a may configure the uplink transmission timing patterns to include one or more blank uplink symbols corresponding to a timing of the one or more uplink carrier switching periods for retuning between the first carrier 205 and the second carrier 210 by the UE 115-a when operating in the single uplink transmission mode. The base station 105-a may indicate the one or more blank uplink symbols using one or more blank symbol information elements in the RRC message carrying the indication of the uplink transmission timing patterns. In some cases, the RRC message may also include an indication of a specific carrier (e.g., a TDD carrier, an FDD carrier) on which the one or more uplink carrier switching periods are included. As such, the information elements may function as tags or parameters used by the UE 115-a to identify the one or more blank uplink symbols of the uplink transmission timing patterns.

The base station 105-a may configure a parameter corresponding to an uplink transmission timing pattern to indicate a number of blank uplink symbols in the uplink transmission timing pattern. For example, the base station 105-a may configure one or more information elements to indicate presence or absence of the one or more blank uplink symbols. The parameter may be an uplink blank symbol parameter (e.g., nrofBlankSymbols1), which may have a parameter value corresponding to a number of blank uplink symbols $b_{sym1}$. Additionally or alternatively, the base station 105-a may configure another parameter that may be an uplink blank symbol parameter (e.g., nrofBlankSymbols2), which may have a parameter value corresponding to a number of blank uplink symbols $b_{sym2}$. In some examples, if one of or both of the $b_{sym1}$ and the $b_{sym2}$ are configured by the base station 105-a, the first $b_{sym1}$ uplink symbols may be tagged as blank uplink symbols and the last $b_{sym2}$ uplink symbols may be tagged as blank uplink symbols. Thus, the base station 105-a may configure one or more information elements to indicate that one or more beginning uplink symbols or ending uplink symbols of the uplink transmission timing pattern are tagged as the one or more blank uplink symbols.

In some examples, the base station 105-a may determine a number of blank uplink symbols (e.g., a minimum number of blank uplink symbols) according to the capability information, so that the UE 115-a is capable of performing the retuning. Thus, when an uplink transmission timing pattern is indicated to the UE 115-a, the uplink transmission timing pattern may include or may be accompanied with a tag or parameter that indicates a number and temporal placement of blank uplink symbols that may be used for retuning of the first carrier 205 or the second carrier 210. The blank uplink symbols, as indicated, may be at the beginning or at the end of uplink slots of the first carrier 205. The parameter may also indicate how many blank uplink symbols are to be observed at the beginning of the uplink slots, and/or how many blank uplink symbols are to be observed at the end of the uplink slots.

By way of example, the UE 115-a may receive an indication of an uplink transmission timing pattern for use by the UE 115-a in transmitting the uplink transmissions 215 on the first carrier 205. The UE 115-a may identify to use both the first carrier 205 and the second carrier 210 during the single uplink transmission mode. The UE 115-a may transition between sending the uplink transmissions 215 on the first carrier 205 and on the second carrier 210. In some examples, the UE 115-a may determine, based on the uplink transmission timing pattern and/or the specific carrier indication (e.g., included in the RRC configuration), a timing of one or more uplink carrier switching periods for retuning between transmissions on the first carrier 205 and on the second carrier 210, and transmit, during the single uplink transmission mode, on both the first carrier 205 and the second carrier 210 in accordance with the uplink transmission timing pattern for the first carrier 205 and the one or more uplink carrier switching periods.

In some examples, the UE 115-a may receive an RRC message including an indication of the uplink transmission timing pattern includes one or more blank symbol information elements and an indication of a specific carrier that includes the uplink carrier switching periods. The UE 115-a may identify the carrier that includes the uplink carrier switching periods and one or more blank uplink symbols based on the one or more blank symbol information elements received with the uplink transmission timing pattern. For example, the UE 115-a may identify one or more blank uplink symbols based on the uplink transmission timing pattern including or being accompanied with a tag or parameter that indicates a number and temporal placement of blank uplink symbols that may be used for retuning by the UE 115-a. The one or more blank uplink symbols may correspond to the timing of the one or more uplink carrier switching periods for the retuning between the first carrier 205 and the second carrier 210. The one or more blank uplink symbols may correspond to one or more uplink symbols of the uplink transmission timing pattern. Example of uplink transmission timing patterns with or without blank uplink symbols are described with reference to FIG. 6.

Figure 6:
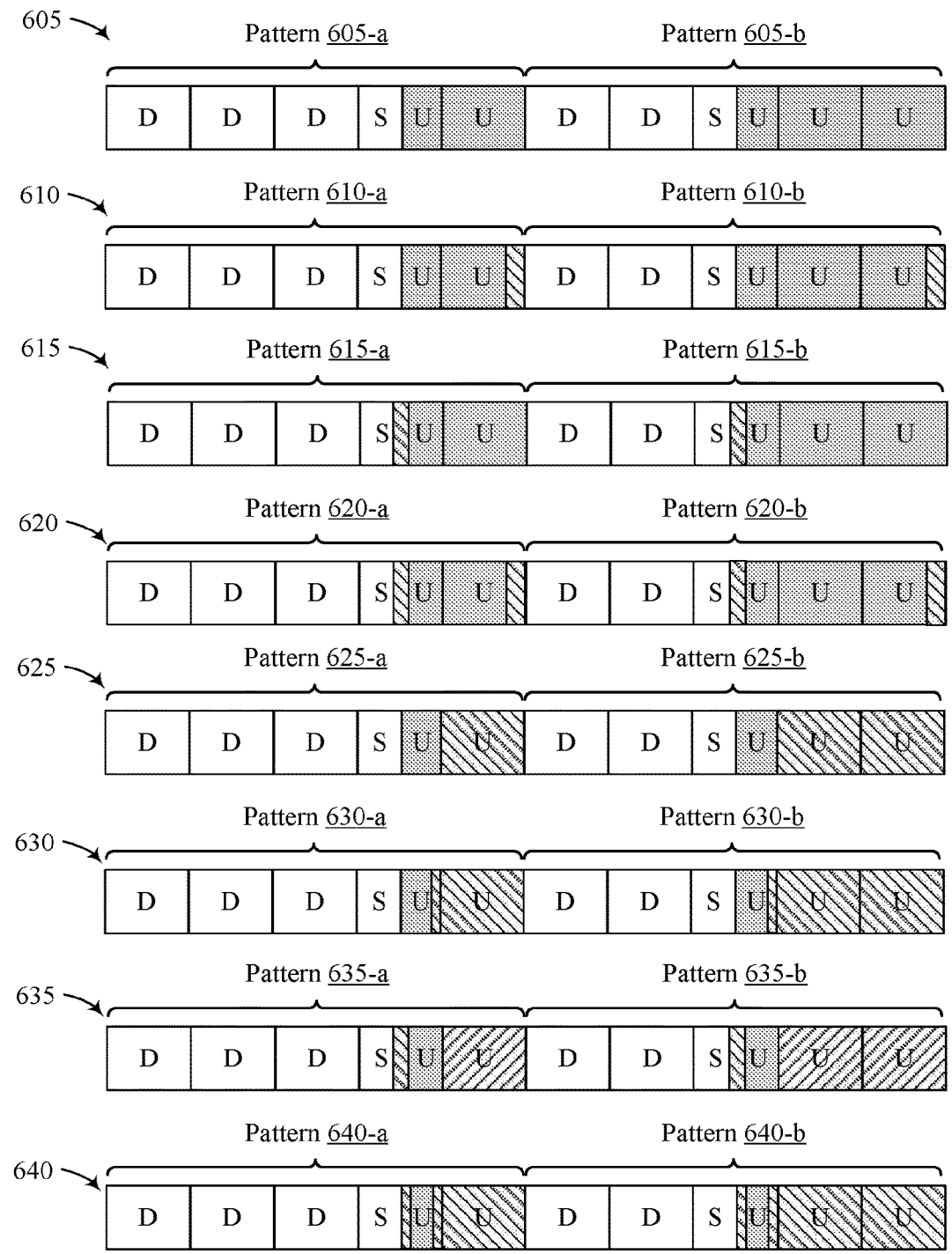

FIG. 6 illustrates an example of uplink transmission timing patterns 600 that in accordance with aspects of the present disclosure. More particularly, the uplink transmission timing patterns 600 may include one or more of a first set of uplink transmission timing patterns 605-a through 640-a or a second set of uplink transmission timing patterns 605-b through 640-b. In some examples, the uplink transmission timing patterns 600 may also implement aspects of the wireless communications systems 100 and 200, as described with reference to FIGS. 1 and 2. For example, the uplink transmission timing patterns 600 may be based on a configuration by the base station 105-*a* and implemented by the UE 115-*a*. In the example of FIG. 6, the uplink transmission timing patterns 600 may correspond to when the UE 115-*a* is at a cell edge or a cell center of the geographic coverage area 110-*a*, as described in FIG. 2. The first set of uplink transmission timing patterns 605-*a* through 640-*a* and the second set of uplink transmission timing patterns 605-*b* through 640-*b* may correspond to a number of different parameter values configured by the base station 105-*a*, as described in FIG. 2, which may be configured in accordance with the capability information provided by the UE 115-*a*.

For the first set of uplink transmission timing patterns 605-*a* through 640-*a*, the base station 105-*a* may configure the slot configuration period parameter (dl-UL-TransmissionPeriodicity) by assigning the parameter value corresponding to the slot configuration period of P msec to be 2.5 msec. The base station 105-*a* may also configure a parameter value corresponding to a number of slots S to be 5 slots. Thus, the first set of uplink transmission timing patterns 605-*a* through 640-*a* may have a total of 5 slots with a period of 2.5 msec. The base station 105-*a* may also configure, for the first set of uplink transmission timing patterns 605-*a* through 640-*a*, the downlink slot parameter (nrofDownlinkSlots) by assigning the parameter value corresponding to the number of downlink slots $d_{slot}$ to be 3 slots, which means 3 slots of the 5 slots have exclusively downlink symbols. The base station 105-*a* may also, for the first set of uplink transmission timing patterns 605-*a* through 640-*a*, configure the downlink symbol parameter (nrofDownlinkSymbol) by assigning the parameter value corresponding to the number of downlink symbols $d_{sym}$ to be 7. Each downlink slot therefore includes 7 downlink symbols. The base station 105-*a* may configure, in some examples, the uplink slot parameter (nrofUplinkSlots) by assigning a parameter value corresponding to a number of uplink slots $u_{slot}$ to be 1, which means 1 slot of the 5 slots has exclusively uplink symbols. In other examples, the base station 105-*a* may configure the uplink symbol parameter (nrofUplinkSymbol) by assigning a parameter value corresponding to a number of uplink symbols $u_{sym}$ to be 5. Thus, each uplink slot includes 5 uplink symbols.

For the second set of uplink transmission timing patterns 605-*b* through 640-*b*, the base station 105-*a* may configure the slot configuration period parameter (dl-UL-TransmissionPeriodicity) by assigning the parameter value corresponding to the slot configuration period of P msec to be 2.5 msec. The base station 105-*a* may also configure a parameter value corresponding to a number of slots S to be 5 slots. Thus, the second set of uplink transmission timing patterns 605-*b* through 640-*b* may have a total of 5 slots with a period of 2.5 msec. The base station 105-*a* may also configure, for the second set of uplink transmission timing patterns 605-*b* through 640-*b*, the downlink slot parameter (nrofDownlinkSlots) by assigning the parameter value corresponding to the number of downlink slots $d_{slot}$ to be 2 slots, which means 2 slots of the 5 slots have exclusively downlink symbols. The base station 105-*a* may also, for the second set of uplink transmission timing patterns 605-*b* through 640-*b*, configure the downlink symbol parameter (nrofDownlinkSymbol) by assigning the parameter value corresponding to the number of downlink symbols $d_{sym}$ to be 7. Each downlink slot therefore includes 7 downlink symbols. The base station 105-*a* may configure, in some examples, the uplink slot parameter (nrofUplinkSlots) by assigning a parameter value corresponding to a number of uplink slots $u_{slot}$ to be 2, which means 2 slots of the 5 slots has exclusively uplink symbols.

In other examples, the base station 105-*a* may configure the uplink symbol parameter (nrofUplinkSymbol) by assigning a parameter value corresponding to a number of uplink symbols $u_{sym}$ to be 5. Thus, each uplink slot includes 5 uplink symbols.

In the example of FIG. 6, with reference to FIG. 2, the base station 105-*a* and the UE 115-*a* may assume that one or more uplink carrier switching periods for retuning is two symbols in duration. The base station 105-*a* may configure one or more additional parameters, which may indicate a number of blank uplink symbols in the uplink transmission timing pattern. For example, the base station 105-*a* may configure one or more information elements to indicate presence or absence of the one or more blank uplink symbols. The parameter may be an uplink blank symbol parameter (nrofBlankSymbols1), which may have a parameter value corresponding to a number of blank uplink symbols $b_{sym1}$. Additionally or alternatively, the base station 105-*a* may configure another parameter that may be an uplink blank symbol parameter (nrofBlankSymbols2), which may have a parameter value corresponding to a number of blank uplink symbols $b_{sym2}$. The uplink blank symbol parameter (nrofBlankSymbols1) may indicate that a number of beginning uplink symbols of the uplink transmission timing pattern are tagged as blank uplink symbols. The uplink blank symbol parameter (nrofBlankSymbols2) may indicate that a number of ending uplink symbols of the uplink transmission timing pattern are tagged as blank uplink symbols. The blank uplink symbols thus correspond to the timing of the one or more uplink carrier switching periods for the retuning between the first carrier 205 and the second carrier 210, as described in FIG. 2.

In some examples, for the first uplink transmission timing pattern 605-*a*, the base station 105-*a* may configure the uplink blank symbol parameter (nrofBlankSymbols1) by assigning a parameter value corresponding to the number of blank uplink symbols $b_{sym1}$ to be 0 ($b_{sym1}$=0 if $b_{sym1}$ is absent), and may configure the uplink blank symbol parameter (nrofBlankSymbols2) by assigning a parameter value corresponding to the number of blank uplink symbols $b_{sym2}$ to be 0 ($b_{sym2}$=0 if $b_{sym2}$ is absent). Thus, for the first uplink transmission timing pattern 605-*a* there are no blank uplink symbols. For the second uplink transmission timing pattern 605-*b*, the base station 105-*a* may configure the uplink blank symbol parameter (nrofBlankSymbols1) by assigning a parameter value corresponding to the number of blank uplink symbols $b_{sym1}$ to be 0, and may configure the uplink blank symbol parameter (nrofBlankSymbols2) by assigning a parameter value corresponding to the number of blank uplink symbols $b_{sym2}$ to be 0. Thus, for the second uplink transmission timing pattern 605-*b* there are also no blank uplink symbols.

In some other examples, for the first uplink transmission timing pattern 610-*a*, the base station 105-*a* may configure the uplink blank symbol parameter (nrofBlankSymbols1) by assigning a parameter value corresponding to the number of blank uplink symbols $b_{sym1}$ to be 0, and may configure the uplink blank symbol parameter (nrofBlankSymbols2) by assigning a parameter value corresponding to the number of blank uplink symbols $b_{sym2}$ to be 2. Thus, for the first uplink transmission timing pattern 610-*a* there are two blank uplink symbols. The base station 105-*a* may therefore tag ending uplink symbols of the uplink transmission timing pattern as blank uplink symbols. For the second uplink transmission timing pattern 610-*b*, the base station 105-*a* may configure the uplink blank symbol parameter (nrofBlankSymbols1) by assigning a parameter value corresponding to the number of blank uplink symbols $b_{sym1}$ to be 0, and may configure the uplink blank symbol parameter (nrofBlankSymbols2) by assigning a parameter value corresponding to the number of blank uplink symbols $b_{sym2}$ to be 2. Thus, for the second uplink transmission timing pattern 610-b there are also two blank uplink symbols. The base station 105-a may therefore tag ending uplink symbols of the uplink transmission timing pattern as blank uplink symbols.

In other examples, for the first uplink transmission timing pattern 615-a, the base station 105-a may configure the uplink blank symbol parameter (nrofBlankSymbols1) by assigning a parameter value corresponding to the number of blank uplink symbols $b_{sym1}$ to be 2, and may configure the uplink blank symbol parameter (nrofBlankSymbols2) by assigning a parameter value corresponding to the number of blank uplink symbols $b_{sym2}$ to be 0. Thus, for the first uplink transmission timing pattern 615-a there are two blank uplink symbols. The base station 105-a may therefore tag beginning uplink symbols of the uplink transmission timing pattern as blank uplink symbols. For the second uplink transmission timing pattern 615-b, the base station 105-a may configure the uplink blank symbol parameter (nrofBlankSymbols1) by assigning a parameter value corresponding to the number of blank uplink symbols $b_{sym1}$ to be 2, and may configure the uplink blank symbol parameter (nrofBlankSymbols2) by assigning a parameter value corresponding to the number of blank uplink symbols $b_{sym2}$ to be 0. Thus, for the second uplink transmission timing pattern 615-b there are also two blank uplink symbols. The base station 105-a may therefore tag beginning uplink symbols of the uplink transmission timing pattern as blank uplink symbols.

In some other examples, for the first uplink transmission timing pattern 620-a, the base station 105-a may configure the uplink blank symbol parameter (nrofBlankSymbols1) by assigning a parameter value corresponding to the number of blank uplink symbols $b_{sym1}$ to be 2, and may configure the uplink blank symbol parameter (nrofBlankSymbols2) by assigning a parameter value corresponding to the number of blank uplink symbols $b_{sym2}$ to be 2. Thus, for the first uplink transmission timing pattern 620-a there are four blank uplink symbols. The base station 105-a may therefore tag two beginning uplink symbols of the uplink transmission timing pattern as blank uplink symbols, as well as two ending uplink symbols of the uplink transmission timing pattern as blank uplink symbols. For the second uplink transmission timing pattern 620-b, the base station 105-a may configure the uplink blank symbol parameter (nrofBlankSymbols1) by assigning a parameter value corresponding to the number of blank uplink symbols $b_{sym1}$ to be 2, and may configure the uplink blank symbol parameter (nrofBlankSymbols2) by assigning a parameter value corresponding to the number of blank uplink symbols $b_{sym2}$ to be 2. Thus, for the second uplink transmission timing pattern 620-b there are also four blank uplink symbols. The base station 105-a may therefore tag two beginning uplink symbols of the uplink transmission timing pattern as blank uplink symbols, as well as two ending uplink symbols of the uplink transmission timing pattern as blank uplink symbols.

In some examples, for the first uplink transmission timing pattern 625-a, the base station 105-a may configure the uplink blank symbol parameter (nrofBlankSymbols1) by assigning a parameter value corresponding to the number of blank uplink symbols $b_{sym1}$ to be 0, and may configure the uplink blank symbol parameter (nrofBlankSymbols2) by assigning a parameter value corresponding to the number of blank uplink symbols $b_{sym2}$ to be 14. Thus, for the first uplink transmission timing pattern 625-a there are 14 blank uplink symbols. The base station 105-a may therefore tag 14 ending uplink symbols of the uplink transmission timing pattern as blank uplink symbols. For the second uplink transmission timing pattern 625-b, the base station 105-a may configure the uplink blank symbol parameter (nrofBlankSymbols1) by assigning a parameter value corresponding to the number of blank uplink symbols $b_{sym1}$ to be 0, and may configure the uplink blank symbol parameter (nrofBlankSymbols2) by assigning a parameter value corresponding to the number of blank uplink symbols $b_{sym2}$ to be 28. Thus, for the second uplink transmission timing pattern 625-b there are 28 blank uplink symbols. The base station 105-a may therefore tag 28 ending uplink symbols of the uplink transmission timing pattern as blank uplink symbols.

In other examples for the first uplink transmission timing pattern 630-a, the base station 105-a may configure the uplink blank symbol parameter (nrofBlankSymbols1) by assigning a parameter value corresponding to the number of blank uplink symbols $b_{sym1}$ to be 0, and may configure the uplink blank symbol parameter (nrofBlankSymbols2) by assigning a parameter value corresponding to the number of blank uplink symbols $b_{sym2}$ to be 16. Thus, for the first uplink transmission timing pattern 630-a there are 16 blank uplink symbols. The base station 105-a may therefore tag 16 ending uplink symbols of the uplink transmission timing pattern as blank uplink symbols. For the second uplink transmission timing pattern 630-b, the base station 105-a may configure the uplink blank symbol parameter (nrofBlankSymbols1) by assigning a parameter value corresponding to the number of blank uplink symbols $b_{sym1}$ to be 0, and may configure the uplink blank symbol parameter (nrofBlankSymbols2) by assigning a parameter value corresponding to the number of blank uplink symbols $b_{sym2}$ to be 30. Thus, for the second uplink transmission timing pattern 630-b there are 30 blank uplink symbols. The base station 105-a may therefore tag 30 ending uplink symbols of the uplink transmission timing pattern as blank uplink symbols.

For the first uplink transmission timing pattern 635-a, the base station 105-a may configure the uplink blank symbol parameter (nrofBlankSymbols1) by assigning a parameter value corresponding to the number of blank uplink symbols $b_{sym1}$ to be 2, and may configure the uplink blank symbol parameter (nrofBlankSymbols2) by assigning a parameter value corresponding to the number of blank uplink symbols $b_{sym2}$ to be 16. Thus, for the first uplink transmission timing pattern 635-a there are 18 blank uplink symbols. The base station 105-a may therefore tag two beginning uplink symbols of the uplink transmission timing pattern as blank uplink symbols, as well as 16 ending uplink symbols of the uplink transmission timing pattern as blank uplink symbols. For the second uplink transmission timing pattern 635-b, the base station 105-a may configure the uplink blank symbol parameter (nrofBlankSymbols1) by assigning a parameter value corresponding to the number of blank uplink symbols $b_{sym1}$ to be 2, and may configure the uplink blank symbol parameter (nrofBlankSymbols2) by assigning a parameter value corresponding to the number of blank uplink symbols $b_{sym2}$ to be 28. Thus, for the second uplink transmission timing pattern 635-b there are 30 blank uplink symbols. The base station 105-a may therefore tag two beginning uplink symbols of the uplink transmission timing pattern as blank uplink symbols, as well as 28 ending uplink symbols of the uplink transmission timing pattern as blank uplink symbols.

In some examples, for the first uplink transmission timing pattern 640-a, the base station 105-a may configure the uplink blank symbol parameter (nrofBlankSymbols1) by assigning a parameter value corresponding to the number of blank uplink symbols $b_{sym1}$ to be 2, and may configure the uplink blank symbol parameter (nrofBlankSymbols2) by assigning a parameter value corresponding to the number of blank uplink symbols $b_{sym2}$ to be 16. Thus, for the first uplink transmission timing pattern 640-a there are 18 blank uplink symbols. The base station 105-a may therefore tag two beginning uplink symbols of the uplink transmission timing pattern as blank uplink symbols, as well as 16 ending uplink symbols of the uplink transmission timing pattern as blank uplink symbols. For the second uplink transmission timing pattern 640-b, the base station 105-a may configure the uplink blank symbol parameter (nrofBlankSymbols1) by assigning a parameter value corresponding to the number of blank uplink symbols $b_{sym1}$ to be 2, and may configure the uplink blank symbol parameter (nrofBlankSymbols2) by assigning a parameter value corresponding to the number of blank uplink symbols $b_{sym2}$ to be 30. Thus, for the second uplink transmission timing pattern 640-b there are 32 blank uplink symbols. The base station 105-a may therefore tag two beginning uplink symbols of the uplink transmission timing pattern as blank uplink symbols, as well as 30 ending uplink symbols of the uplink transmission timing pattern as blank uplink symbols.

Returning to FIG. 2, in some examples, the UE 115-a may be configured to transmit the uplink transmissions 215 on the second carrier 210 (e.g., an FDD uplink carrier) at least on slots or symbols where the uplink transmissions 215 on the first carrier 205 (e.g., a TDD carrier) are not allowed (including downlink symbols and blank symbols) according to the uplink transmission timing pattern. In some examples, the UE 115-a may be configured to do the retuning in uplink symbols on the second carrier 210 (e.g., FDD carriers) if no blank symbol tags are configured in the uplink transmission timing pattern (TDD-UL-DL-Config) (e.g., $b_{sym1}$ is absent or $b_{sym2}$ is absent). For example, the UE 115-a may identify an absence of one or more blank uplink symbols in the uplink transmission timing pattern or in one or more information elements, wherein the one or more blank uplink symbols correspond to the timing of the one or more uplink carrier switching periods for the retuning between the first carrier 205 and the second carrier 210 by the UE 115-a. The UE 115-a may thus determine that the timing of the one or more uplink carrier switching periods for the retuning between the first carrier 205 and the second carrier 210 corresponds to one or more symbols of the second carrier 210 based on the absence of one or more blank uplink symbols in the uplink transmission timing pattern. Alternatively, the UE 115-a may be configured to do retuning in blank symbols on the first carrier (e.g., a TDD carrier), if the blank symbols are specific in the uplink transmission timing pattern (TDD-UL-DL-Config). Once the UE 115-a completes the retuning, the UE 115-a can transmit the uplink transmission 215 according to the configured uplink transmission timing pattern.

In some examples, the UE 115-a may determine, based on the one or more blank symbol information elements, that one or more beginning uplink symbols of the uplink transmission timing pattern are tagged as the one or more blank uplink symbols. Additionally or alternatively, the UE 115-a may determine, based on the one or more blank symbol information elements, that one or more ending uplink symbols of the uplink transmission timing pattern are tagged as the one or more blank uplink symbols. The UE 115-a may, in some examples, determine that the timing of the one or more uplink carrier switching periods for the retuning between the first carrier 205 and the second carrier 210 correspond to one or more uplink symbols of the uplink transmission timing pattern of the first carrier 205 based on the one or more blank uplink symbols in the uplink transmission timing pattern.

In some examples, the UE 115-a may transmit the uplink transmissions 215 on the second carrier 210, retune from the second carrier 210 to the first carrier 205 based on the timing of the one or more uplink carrier switching periods, and transmit the uplink transmissions 215 on the first carrier 205 and on one or more uplink symbols of the uplink transmission timing pattern based on the retuning. The UE 115-a may thus transmit the uplink transmissions 215 on the second carrier 210 during a time duration corresponding to downlink symbols or one or more blank uplink symbols of the uplink transmission timing pattern. In some examples, retuning from the second carrier 210 to the first carrier 205 occurs before the one or more uplink symbols of the first carrier 205. In other examples, retuning from the second carrier 210 to the first carrier 205 occurs after the one or more uplink symbols of the first carrier 205.

In some other examples, the UE 115-a may transmit the uplink transmissions 215 on the first carrier 205, retune from the first carrier 205 to the second carrier 210 based on the timing of the one or more uplink carrier switching periods, and transmit the uplink transmissions 215 on the second carrier 210 and on one or more uplink symbols of the uplink transmission timing pattern based on the retuning. The UE 115-a may thus transmit the uplink transmissions 215 on the first carrier 205 during a time duration corresponding to downlink symbols or one or more blank uplink symbols of the uplink transmission timing pattern. In some examples, retuning from the first carrier 205 to the second carrier 210 occurs before the one or more uplink symbols of the second carrier 210. In other examples, retuning from the first carrier 205 to the second carrier 210 occurs after the one or more uplink symbols of the second carrier 210.

Figure 7:
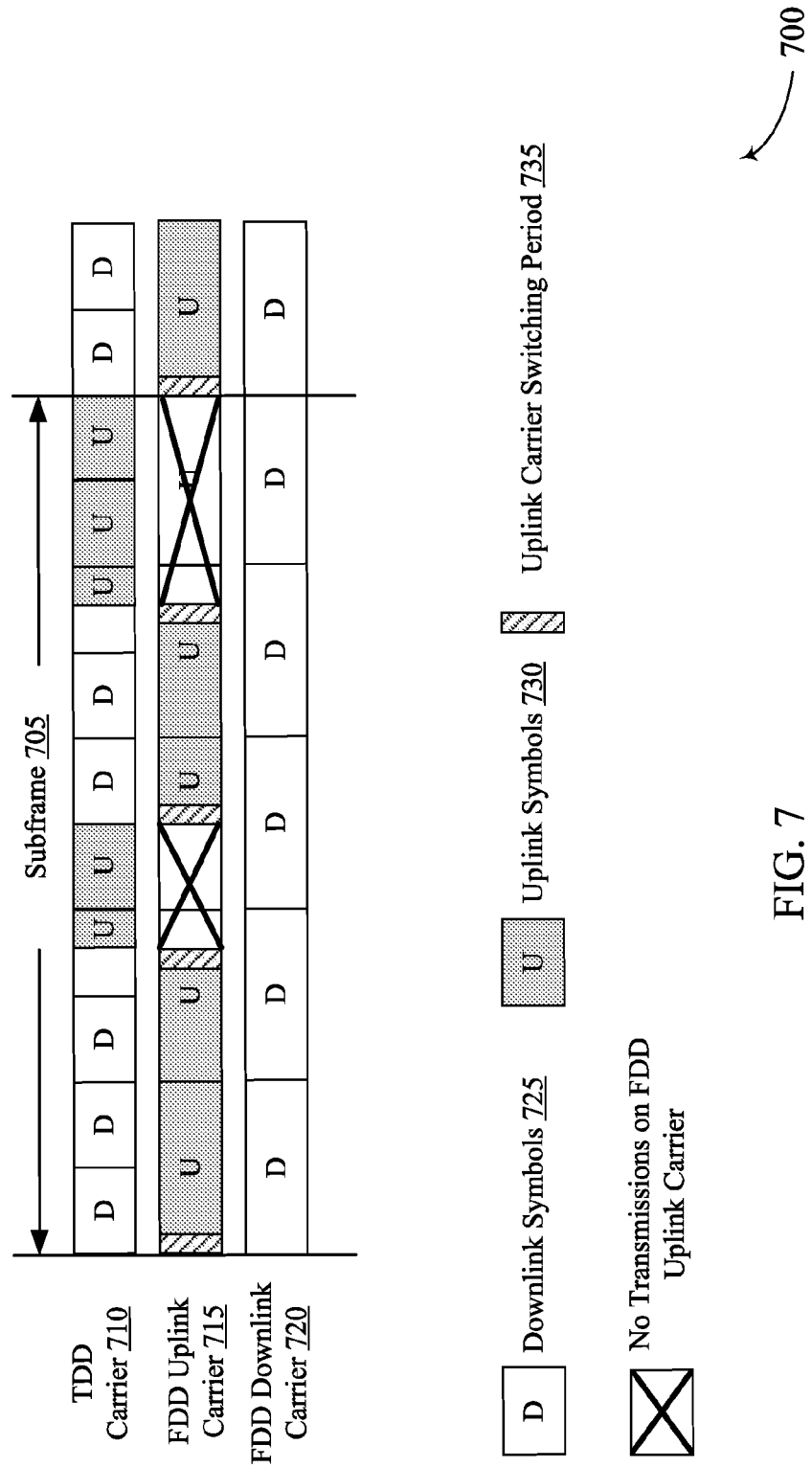

FIG. 7 illustrates an example of an uplink transmission timing pattern 700 in accordance with aspects of the present disclosure. In some examples, the uplink transmission timing pattern 700 may also implement aspects of the wireless communications systems 100 and 200, as described with reference to FIGS. 1 and 2. For example, the uplink transmission timing pattern 700 may be based on a configuration by the base station 105-a and implemented by the UE 115-a. In the example of FIG. 7, the uplink transmission timing pattern 700 may correspond to when the UE 115-a supports carrier aggregation, as described in FIG. 2.

With reference to FIG. 2, the UE 115-a may communicate with the base station 105-a in accordance with the uplink transmission timing pattern 700. In the example of FIG. 7, when operating in a carrier aggregation mode, the UE 115-a may communicate with the base station 105-a via one or more of a TDD carrier 710, an FDD uplink carrier 715, or an FDD downlink carrier 720 over a subframe 705. The TDD carrier 710 may be a carrier in a high radio frequency band, while the FDD uplink carrier 715 and the FDD downlink carrier 720 may be a carrier in a low radio frequency band. Similarly, the TDD carrier 710 may relate to a wide bandwidth, while the FDD uplink carrier 715 and the FDD downlink carrier 720 may relate to a narrow bandwidth.

In some examples, one or more of the TDD carrier 710, the FDD uplink carrier 715, or the FDD downlink carrier 720 of the uplink transmission timing pattern 700 may correspond to a slot configuration having one or more of downlink symbols 725 or uplink symbols 730 on which the UE 115-a may communicate with the base station 105-a. In some examples, one or more of the TDD carrier 710, the FDD uplink carrier 715, or the FDD downlink carrier 720 may correspond to a slot configuration having one or more uplink carrier switching periods 735 (also referred to as blank uplink symbols) on which the UE 115-a may perform retuning of one or more of the TDD carrier 710, the FDD uplink carrier 715, or the FDD downlink carrier 720. The UE 115-a may transmit uplink transmissions on the TDD carrier 710 or using the FDD uplink carrier 715 during all times except during the uplink symbols or slots of the TDD carrier 710. During the uplink symbols or slots of the TDD carrier 710, the UE 115-a may transmit the uplink transmissions using the TDD carrier 710. Thus, the one or more uplink carrier switching periods 735 may be located in either of the TDD carrier 710 or the FDD uplink carrier 715, and the UE 115-a may retune the carrier in accordance with the one or more uplink carrier switching periods 735 to communicate uplink transmissions.

Figure 8:
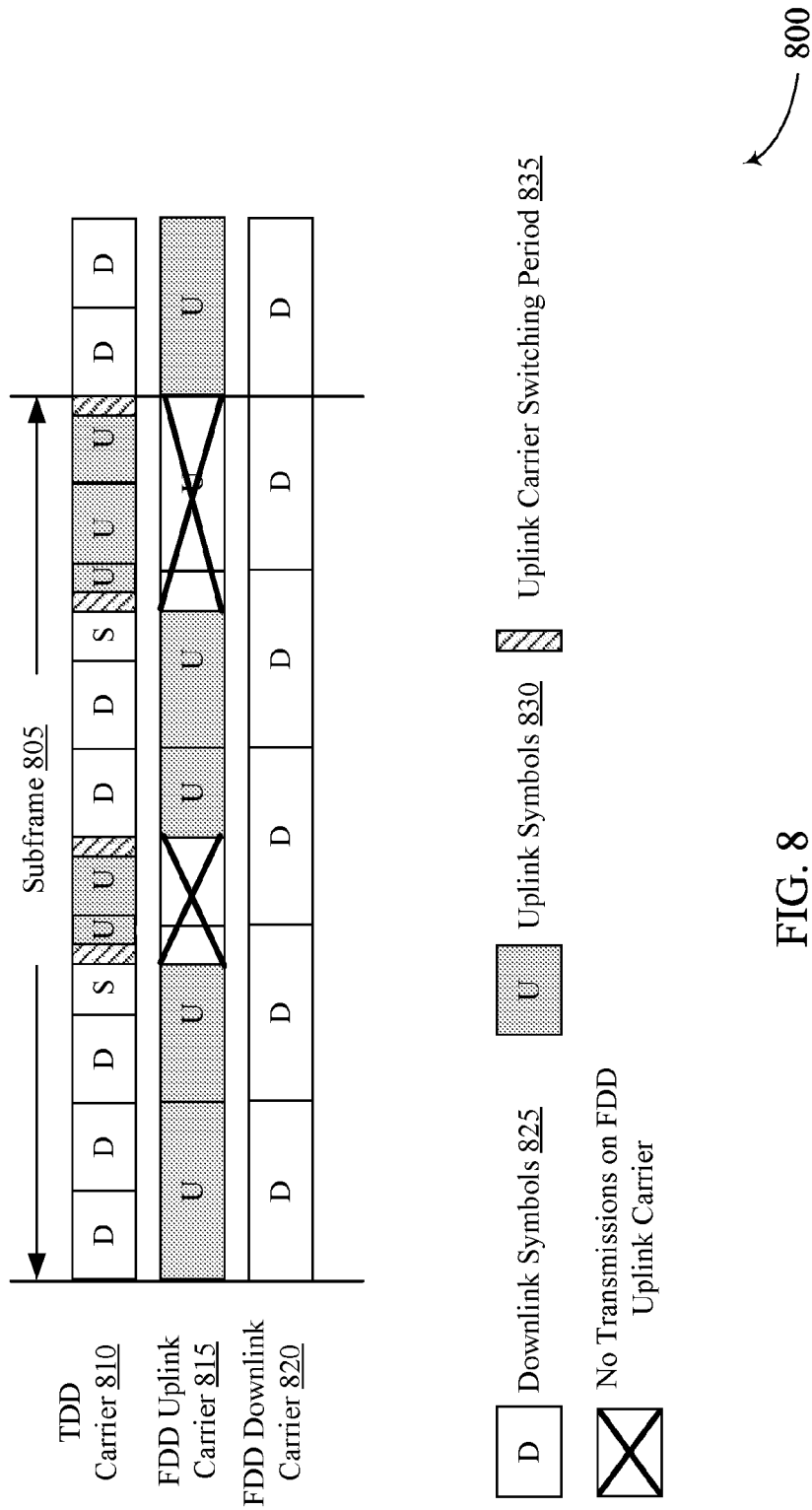

FIG. 8 illustrates an example of an uplink transmission timing pattern 800 in accordance with aspects of the present disclosure. In some examples, the uplink transmission timing pattern 800 may also implement aspects of the wireless communications systems 100 and 200, as described with reference to FIGS. 1 and 2. For example, the uplink transmission timing pattern 800 may be based on a configuration by the base station 105-a and implemented by the UE 115-a. In the example of FIG. 8, the uplink transmission timing pattern 800 may correspond to when the UE 115-a supports carrier aggregation, as described in FIG. 2.

With reference to FIG. 2, the UE 115-a may communicate with the base station 105-a in accordance with the uplink transmission timing pattern 800. In the example of FIG. 8, when operating in a carrier aggregation mode, the UE 115-a may communicate with the base station 105-a via one or more of a TDD carrier 810, an FDD uplink carrier 815, or an FDD downlink carrier 820 over a subframe 805. The TDD carrier 810 may be a carrier in a high radio frequency band, while the FDD uplink carrier 815 and the FDD downlink carrier 820 may be a carrier in a low radio frequency band. Similarly, the TDD carrier 810 may relate to a wide bandwidth, while the FDD uplink carrier 815 and the FDD downlink carrier 820 may relate to a narrow bandwidth.

In some examples, one or more of the TDD carrier 810, the FDD uplink carrier 815, or the FDD downlink carrier 820 of the uplink transmission timing pattern 800 may correspond to a slot configuration having one or more of downlink symbols 825 or uplink symbols 830 on which the UE 115-a may communicate with the base station 105-a. In some examples, one or more of the TDD carrier 810, the FDD uplink carrier 815, or the FDD downlink carrier 820 may correspond to a slot configuration having one or more uplink carrier switching periods 835 on which the UE 115-a may perform retuning of one or more of the TDD carrier 810, the FDD uplink carrier 815, or the FDD downlink carrier 820. In some cases, the uplink carrier switching periods 835 may overlap one or more blank uplink symbols (e.g., $b_{sym1}$, $b_{sym2}$, or both). The UE 115-a may transmit uplink transmissions on the TDD carrier 810 or using the FDD uplink carrier 815 during all times except during the uplink symbols or slots of the TDD carrier 810. During the uplink symbols or slots of the TDD carrier 810, the UE 115-a may transmit the uplink transmissions using the TDD carrier 810. Thus, the one or more uplink carrier switching periods 835 may be located in either of the TDD carrier 810 or the FDD uplink carrier 815, and the UE 115-a may retune the carrier in accordance with the one or more uplink carrier switching periods 835 to communicate uplink transmissions.

Figure 9:
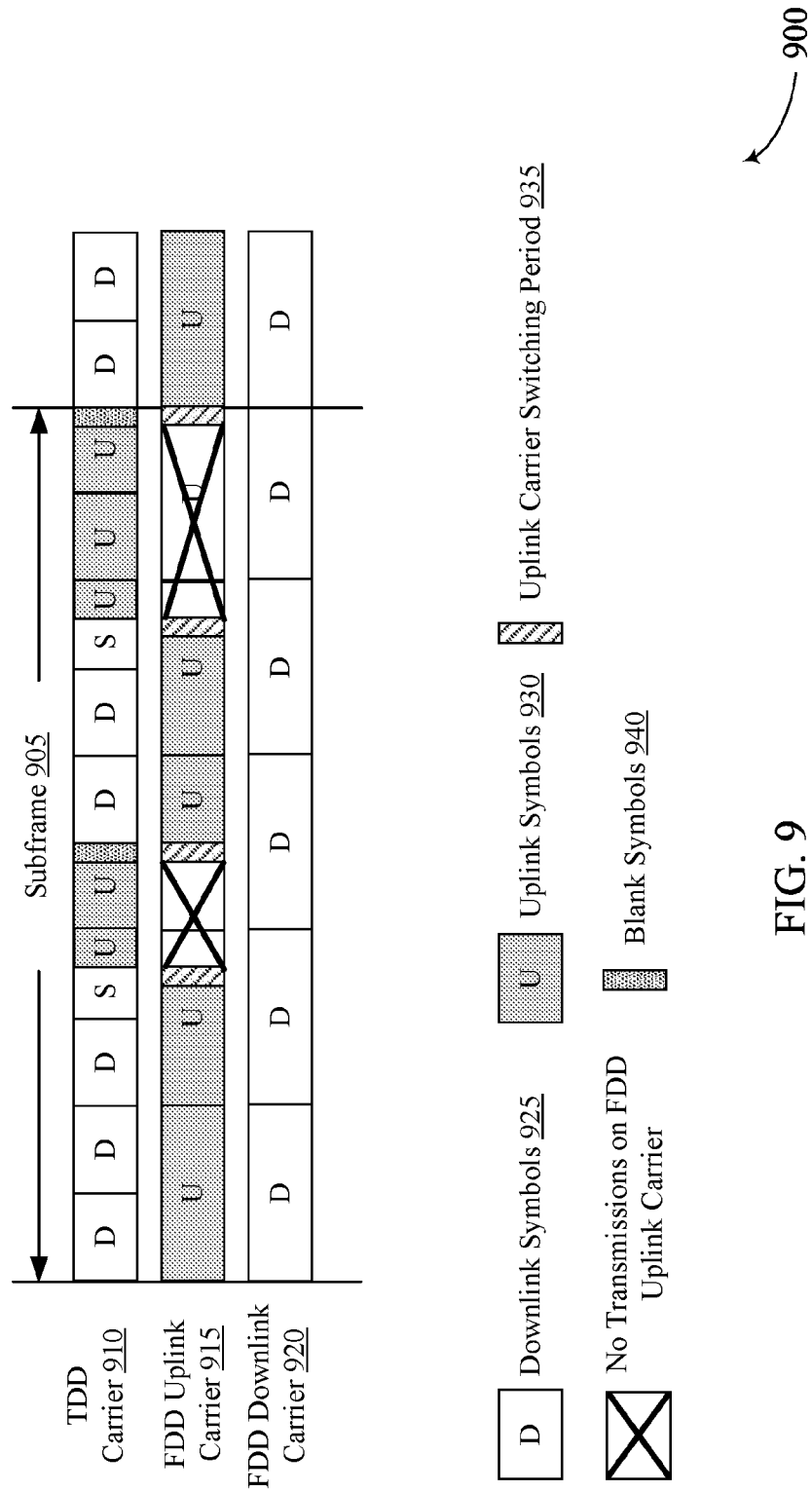

FIG. 9 illustrates an example of an uplink transmission timing pattern 900 in accordance with aspects of the present disclosure. In some examples, the uplink transmission timing pattern 900 may also implement aspects of the wireless communications systems 100 and 200, as described with reference to FIGS. 1 and 2. For example, the uplink transmission timing pattern 900 may be based on a configuration by the base station 105-a and implemented by the UE 115-a. In the example of FIG. 9, the uplink transmission timing pattern 900 may correspond to when the UE 115-a supports carrier aggregation, as described in FIG. 2.

With reference to FIG. 2, the UE 115-a may communicate with the base station 105-a in accordance with the uplink transmission timing pattern 900. In the example of FIG. 9, when operating in a carrier aggregation mode, the UE 115-a may communicate with the base station 105-a via one or more of a TDD carrier 910, an FDD uplink carrier 915, or an FDD downlink carrier 920 over a subframe 905. The TDD carrier 910 may be a carrier in a high radio frequency band, while the FDD uplink carrier 915 and the FDD downlink carrier 920 may be a carrier in a low radio frequency band. Similarly, the TDD carrier 910 may relate to a wide bandwidth, while the FDD uplink carrier 915 and the FDD downlink carrier 920 may relate to a narrow bandwidth.

In some examples, one or more of the TDD carrier 910, the FDD uplink carrier 915, or the FDD downlink carrier 920 of the uplink transmission timing pattern 900 may correspond to a slot configuration having one or more of downlink symbols 925 or uplink symbols 930 on which the UE 115-a may communicate with the base station 105-a. In some examples, one or more of the TDD carrier 910, the FDD uplink carrier 915, or the FDD downlink carrier 920 may correspond to a slot configuration having one or more uplink carrier switching periods 935 on which the UE 115-a may perform retuning of one or more of the TDD carrier 910, the FDD uplink carrier 915, or the FDD downlink carrier 920. In this example, the TDD carrier 910 may include one or more blank symbols 940 that correspond to the timing of the one or more uplink carrier switching periods 935. That is, the one or more blank symbols 940 may, by their temporal location(s) in the TDD carrier 910, be indicative of the temporal location(s) of the one or more uplink carrier switching periods 935. The UE 115-a may transmit uplink transmissions on the TDD carrier 910 or using the FDD uplink carrier 915 during all times except during the uplink symbols or slots of the TDD carrier 910. During the uplink symbols or slots of the TDD carrier 910, the UE 115-a may transmit the uplink transmissions using the TDD carrier 910. Thus, the one or more uplink carrier switching periods 935 may be located in either of the TDD carrier 910 or the FDD uplink carrier 915, and the UE 115-a may retune the carrier in accordance with the one or more uplink carrier switching periods 935 to communicate uplink transmissions.

Figure 10:
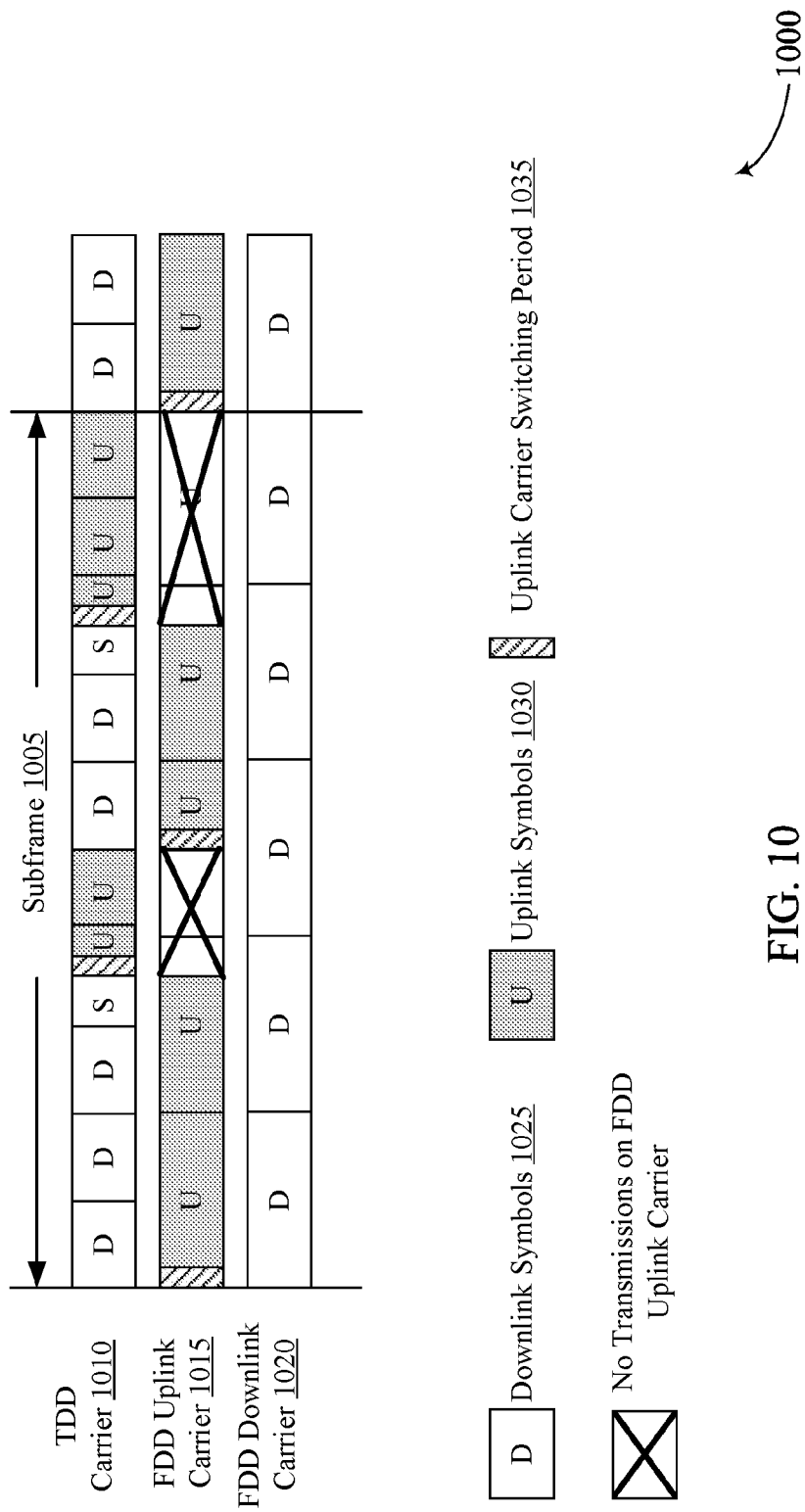

FIG. 10 illustrates an example of an uplink transmission timing pattern 1000 in accordance with aspects of the present disclosure. In some examples, the uplink transmission timing pattern 1000 may also implement aspects of the wireless communications systems 100 and 200, as described with reference to FIGS. 1 and 2. For example, the uplink transmission timing pattern 1000 may be based on a configuration by the base station 105-a and implemented by the UE 115-*a*. In the example of FIG. 10, the uplink transmission timing pattern 1000 may correspond to when the UE 115-*a* supports carrier aggregation, as described in FIG. 2.

With reference to FIG. 2, the UE 115-*a* may communicate with the base station 105-*a* in accordance with the uplink transmission timing pattern 1000. In the example of FIG. 10, when operating in a carrier aggregation mode, the UE 115-*a* may communicate with the base station 105-*a* via one or more of a TDD carrier 1010, an FDD uplink carrier 1015, or an FDD downlink carrier 1020 over a subframe 1005. The TDD carrier 1010 may be a carrier in a high radio frequency band, while the FDD uplink carrier 1015 and the FDD downlink carrier 1020 may be a carrier in a low radio frequency band. Similarly, the TDD carrier 1010 may relate to a wide bandwidth, while the FDD uplink carrier 1015 and the FDD downlink carrier 1020 may relate to a narrow bandwidth.

In some examples, one or more of the TDD carrier 1010, the FDD uplink carrier 1015, or the FDD downlink carrier 1020 of the uplink transmission timing pattern 1000 may correspond to a slot configuration having one or more of downlink symbols 1025 or uplink symbols 1030 on which the UE 115-*a* may communicate with the base station 105-*a*. In some examples, one or more of the TDD carrier 1010, the FDD uplink carrier 1015, or the FDD downlink carrier 1020 may correspond to a slot configuration having one or more uplink carrier switching periods 1035 (also referred to as blank uplink symbols), on which the UE 115-*a* may perform retuning of one or more of the TDD carrier 1010, the FDD uplink carrier 1015, or the FDD downlink carrier 1020. The UE 115-*a* may transmit uplink transmissions on the TDD carrier 1010 or using the FDD uplink carrier 1015 during all times except during the uplink symbols or slots of the TDD carrier 1010. During the uplink symbols or slots of the TDD carrier 1010, the UE 115-*a* may transmit the uplink transmissions using the TDD carrier 1010. Thus, the one or more uplink carrier switching periods 1035 may be located in either of the TDD carrier 1010 or the FDD uplink carrier 1015, and the UE 115-*a* may retune the carrier in accordance with the one or more uplink carrier switching periods 1035 to communicate uplink transmissions.

Figure 11:
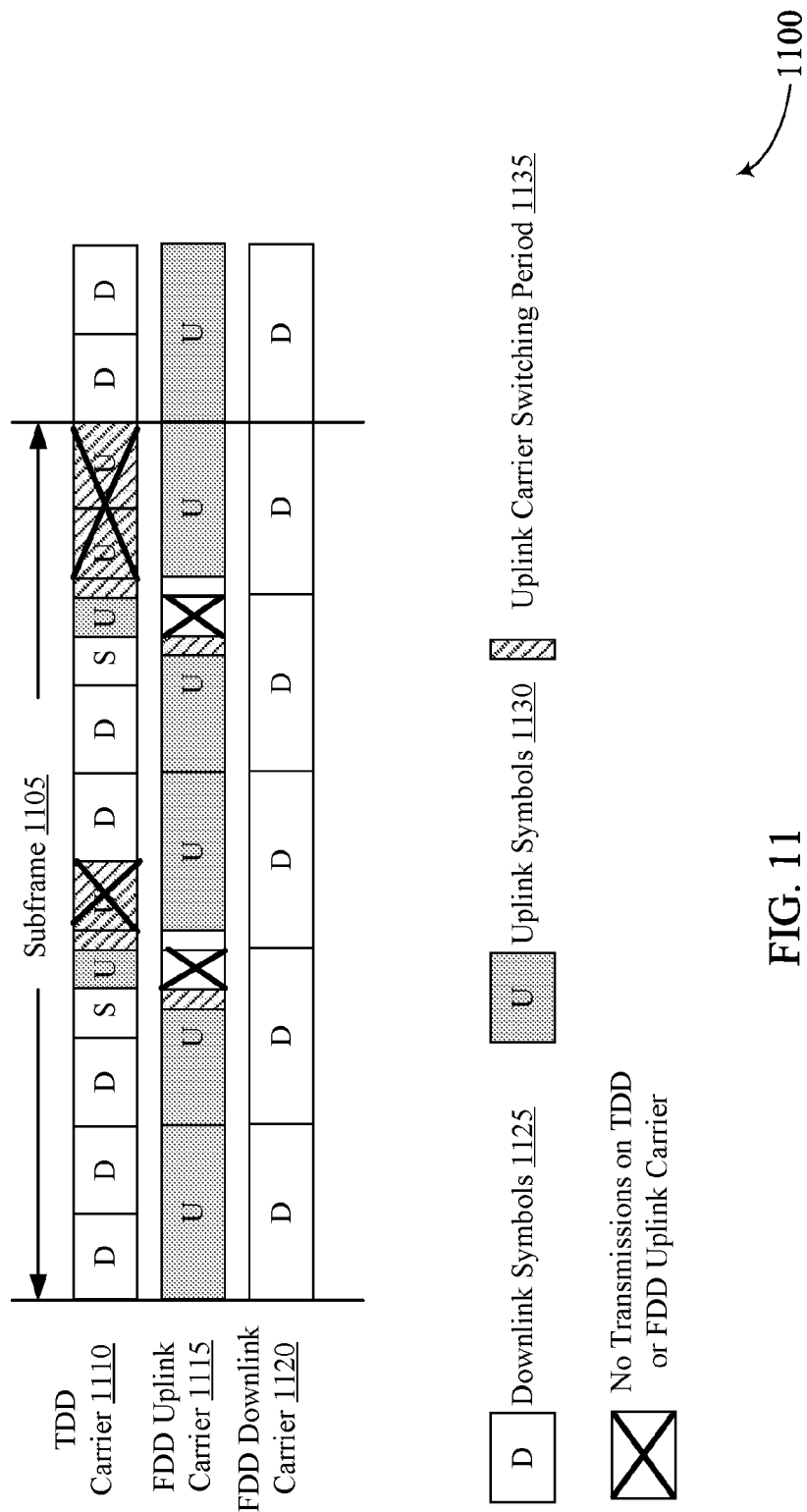

FIG. 11 illustrates an example of an uplink transmission timing pattern 1100 in accordance with aspects of the present disclosure. In some examples, the uplink transmission timing pattern 1100 may also implement aspects of the wireless communications systems 100 and 200, as described with reference to FIGS. 1 and 2. For example, the uplink transmission timing pattern 1100 may be based on a configuration by the base station 105-*a* and implemented by the UE 115-*a*. In the example of FIG. 11, the uplink transmission timing pattern 1100 may correspond to when the UE 115-*a* supports carrier aggregation, as described in FIG. 2.

With reference to FIG. 2, the UE 115-*a* may communicate with the base station 105-*a* in accordance with the uplink transmission timing pattern 1100. In the example of FIG. 11, when operating in a carrier aggregation mode, the UE 115-*a* may communicate with the base station 105-*a* via one or more of a TDD carrier 1110, an FDD uplink carrier 1115, or an FDD downlink carrier 1120 over a subframe 1105. The TDD carrier 1110 may be a carrier in a high radio frequency band, while the FDD uplink carrier 1115 and the FDD downlink carrier 1120 may be a carrier in a low radio frequency band. Similarly, the TDD carrier 1110 may relate to a wide bandwidth, while the FDD uplink carrier 1115 and the FDD downlink carrier 1120 may relate to a narrow bandwidth.

In some examples, one or more of the TDD carrier 1110, the FDD uplink carrier 1115, or the FDD downlink carrier 1120 of the uplink transmission timing pattern 1100 may correspond to a slot configuration having one or more of downlink symbols 1125 or uplink symbols 1130 on which the UE 115-*a* may communicate with the base station 105-*a*. In some examples, one or more of the TDD carrier 1110, the FDD uplink carrier 1115, or the FDD downlink carrier 1120 may correspond to a slot configuration having one or more uplink carrier switching periods 1135 (also referred to as blank uplink symbols), on which the UE 115-*a* may perform retuning of one or more of the TDD carrier 1110, the FDD uplink carrier 1115, or the FDD downlink carrier 1120. The UE 115-*a* may transmit uplink transmissions on the TDD carrier 1110 or using the FDD uplink carrier 1115 during all times except during the uplink symbols or slots of the TDD carrier 1110. During the uplink symbols or slots of the TDD carrier 1110, the UE 115-*a* may transmit the uplink transmissions using the TDD carrier 1110. Thus, the one or more uplink carrier switching periods 1135 may be located in either of the TDD carrier 1110 or the FDD uplink carrier 1115, and the UE 115-*a* may retune the carrier in accordance with the one or more uplink carrier switching periods 1135 to communicate uplink transmissions.

Figure 12:
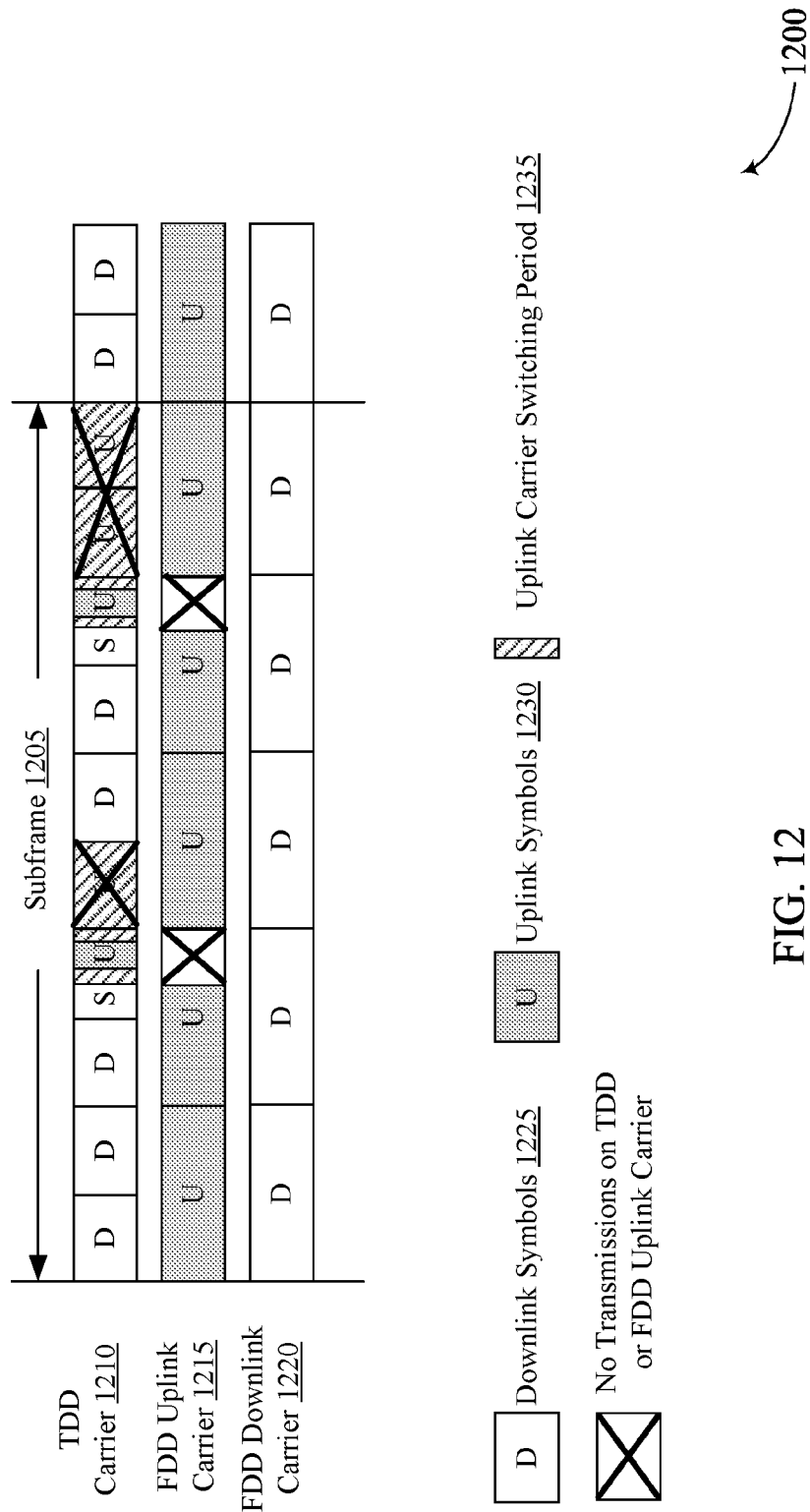

FIG. 12 illustrates an example of an uplink transmission timing pattern 1200 in accordance with aspects of the present disclosure. In some examples, the uplink transmission timing pattern 1200 may also implement aspects of the wireless communications systems 100 and 200, as described with reference to FIGS. 1 and 2. For example, the uplink transmission timing pattern 1200 may be based on a configuration by the base station 105-*a* and implemented by the UE 115-*a*. In the example of FIG. 12, the uplink transmission timing pattern 1200 may correspond to when the UE 115-*a* supports carrier aggregation, as described in FIG. 2.

With reference to FIG. 2, the UE 115-*a* may communicate with the base station 105-*a* in accordance with the uplink transmission timing pattern 1200. In the example of FIG. 12, when operating in a carrier aggregation mode, the UE 115-*a* may communicate with the base station 105-*a* via one or more of a TDD carrier 1210, an FDD uplink carrier 1215, or an FDD downlink carrier 1220 over a subframe 1205. The TDD carrier 1210 may be a carrier in a high radio frequency band, while the FDD uplink carrier 1215 and the FDD downlink carrier 1220 may be a carrier in a low radio frequency band. Similarly, the TDD carrier 1210 may relate to a wide bandwidth, while the FDD uplink carrier 1215 and the FDD downlink carrier 1220 may relate to a narrow bandwidth.

In some examples, one or more of the TDD carrier 1210, the FDD uplink carrier 1215, or the FDD downlink carrier 1220 of the uplink transmission timing pattern 1200 may correspond to a slot configuration having one or more of downlink symbols 1225 or uplink symbols 1230 on which the UE 115-*a* may communicate with the base station 105-*a*. In some examples, one or more of the TDD carrier 1210, the FDD uplink carrier 1215, or the FDD downlink carrier 1220 may correspond to a slot configuration having one or more uplink carrier switching periods 1235 on which the UE 115-*a* may perform retuning of one or more of the TDD carrier 1210, the FDD uplink carrier 1215, or the FDD downlink carrier 1220. In some cases, the uplink carrier switching periods 1235 may overlap one or more blank uplink symbols (e.g., $b_{sym1}$, $b_{sym2}$, or both). The UE 115-*a* may transmit uplink transmissions on the TDD carrier 1210 or using the FDD uplink carrier 1215 during all times except during the uplink symbols or slots of the TDD carrier 1210.

During the uplink symbols or slots of the TDD carrier 1210, the UE 115-a may transmit the uplink transmissions using the TDD carrier 1210. Thus, the one or more uplink carrier switching periods 1235 may be located in either of the TDD carrier 1210 or the FDD uplink carrier 1215, and the UE 115-a may retune the carrier in accordance with the one or more uplink carrier switching periods 1235 to communicate uplink transmissions.

Figure 13:
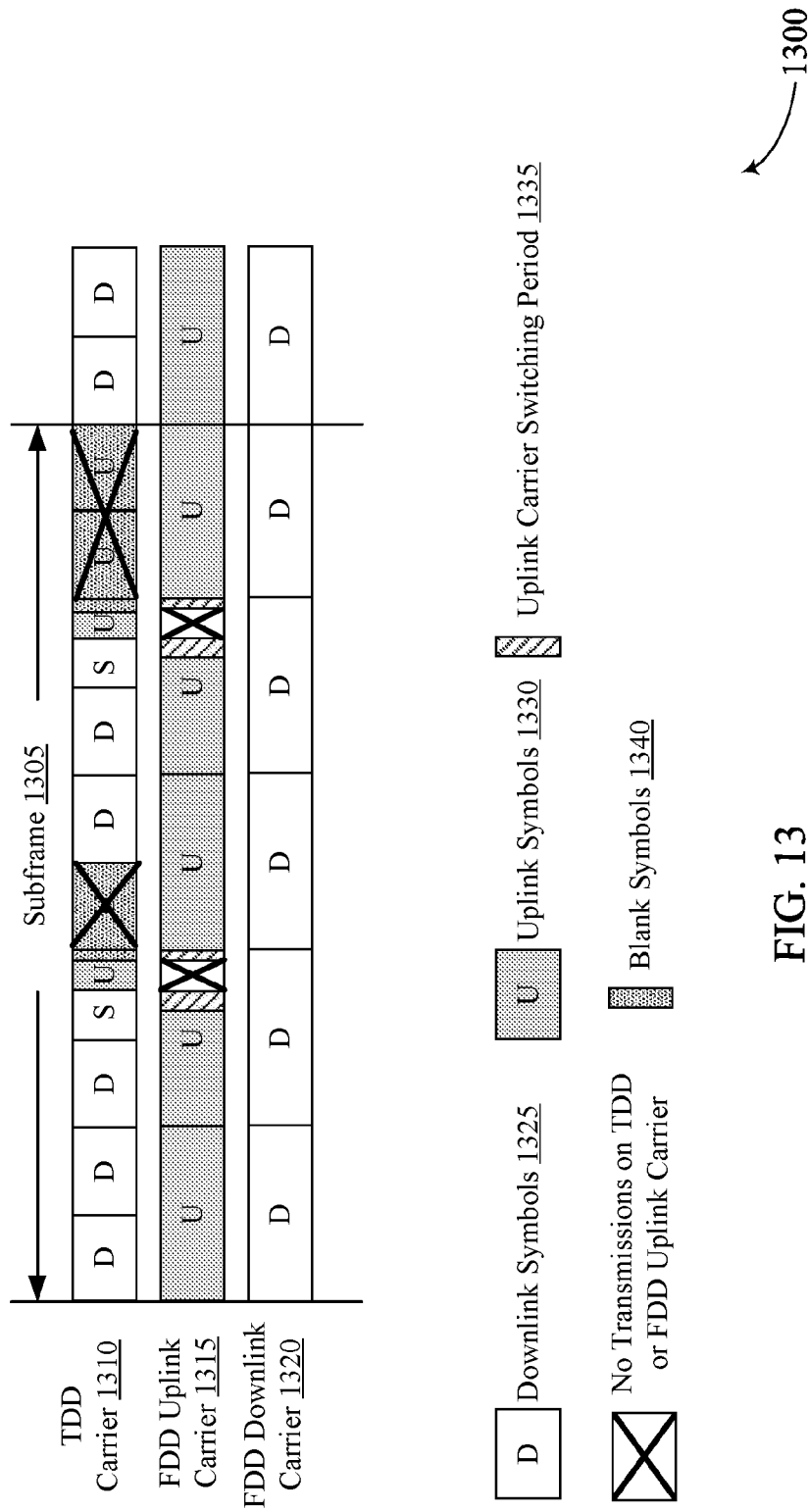

FIG. 13 illustrates an example of an uplink transmission timing pattern 1300 in accordance with aspects of the present disclosure. In some examples, the uplink transmission timing pattern 1300 may also implement aspects of the wireless communications systems 100 and 200, as described with reference to FIGS. 1 and 2. For example, the uplink transmission timing pattern 1300 may be based on a configuration by the base station 105-a and implemented by the UE 115-a. In the example of FIG. 13, the uplink transmission timing pattern 1300 may correspond to when the UE 115-a supports carrier aggregation, as described in FIG. 2.

With reference to FIG. 2, the UE 115-a may communicate with the base station 105-a in accordance with the uplink transmission timing pattern 1300. In the example of FIG. 13, when operating in a carrier aggregation mode, the UE 115-a may communicate with the base station 105-a via one or more of a TDD carrier 1310, an FDD uplink carrier 1315, or an FDD downlink carrier 1320 over a subframe 1305. The TDD carrier 1310 may be a carrier in a high radio frequency band, while the FDD uplink carrier 1315 and the FDD downlink carrier 1320 may be a carrier in a low radio frequency band. Similarly, the TDD carrier 1310 may relate to a wide bandwidth, while the FDD uplink carrier 1315 and the FDD downlink carrier 1320 may relate to a narrow bandwidth.

In some examples, one or more of the TDD carrier 1310, the FDD uplink carrier 1315, or the FDD downlink carrier 1320 of the uplink transmission timing pattern 1300 may correspond to a slot configuration having one or more of downlink symbols 1325 or uplink symbols 1330 on which the UE 115-a may communicate with the base station 105-a. In some examples, one or more of the TDD carrier 1310, the FDD uplink carrier 1315, or the FDD downlink carrier 1320 may correspond to a slot configuration having one or more uplink carrier switching periods 1335 on which the UE 115-a may perform retuning of one or more of the TDD carrier 1310, the FDD uplink carrier 1315, or the FDD downlink carrier 1320. In this example, the TDD carrier 1310 may include one or more blank symbols 1340 (e.g., $b_{sym1}$, $b_{sym2}$, or both) that correspond to the timing of the one or more uplink carrier switching periods 1335. That is, the one or more blank symbols 1340 may, by their temporal location(s) in the TDD carrier 1310, be indicative of the temporal location(s) of the one or more uplink carrier switching periods 1335. The UE 115-a may transmit uplink transmissions on the TDD carrier 1310 or using the FDD uplink carrier 1315 during all times except during the uplink symbols or slots of the TDD carrier 1310. During the uplink symbols or slots of the TDD carrier 1310, the UE 115-a may transmit the uplink transmissions using the TDD carrier 1310. Thus, the one or more uplink carrier switching periods 1135 may be located in either of the TDD carrier 1310 or the FDD uplink carrier 1315, and the UE 115-a may retune the carrier in accordance with the one or more uplink carrier switching periods 1335 to communicate uplink transmissions.

Figure 14:
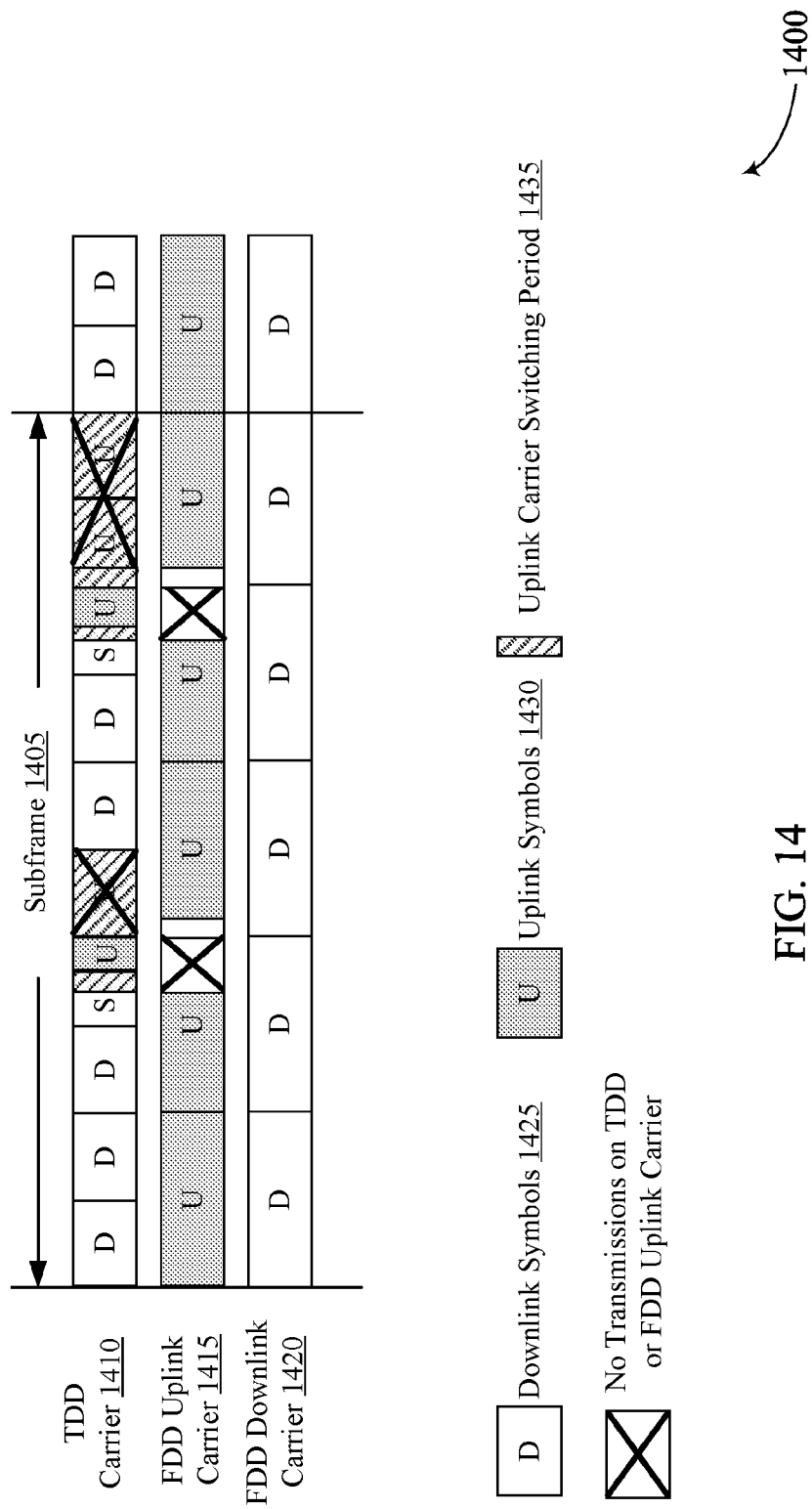

FIG. 14 illustrates an example of an uplink transmission timing pattern 1400 in accordance with aspects of the present disclosure. In some examples, the uplink transmission timing pattern 1400 may also implement aspects of the wireless communications systems 100 and 200, as described with reference to FIGS. 1 and 2. For example, the uplink transmission timing pattern 1400 may be based on a configuration by the base station 105-a and implemented by the UE 115-a. In the example of FIG. 14, the uplink transmission timing pattern 1400 may correspond to when the UE 115-a supports carrier aggregation, as described in FIG. 2.

With reference to FIG. 2, the UE 115-a may communicate with the base station 105-a in accordance with the uplink transmission timing pattern 1400. In the example of FIG. 14, when operating in a carrier aggregation mode, the UE 115-a may communicate with the base station 105-a via one or more of a TDD carrier 1410, an FDD uplink carrier 1415, or an FDD downlink carrier 1420 over a subframe 1405. The TDD carrier 1410 may be a carrier in a high radio frequency band, while the FDD uplink carrier 1415 and the FDD downlink carrier 1420 may be a carrier in a low radio frequency band. Similarly, the TDD carrier 1410 may relate to a wide bandwidth, while the FDD uplink carrier 1415 and the FDD downlink carrier 1420 may relate to a narrow bandwidth.

In some examples, one or more of the TDD carrier 1410, the FDD uplink carrier 1415, or the FDD downlink carrier 1420 of the uplink transmission timing pattern 1400 may correspond to a slot configuration having one or more of downlink symbols 1425 or uplink symbols 1430 on which the UE 115-a may communicate with the base station 105-a. In some examples, one or more of the TDD carrier 1410, the FDD uplink carrier 1415, or the FDD downlink carrier 1420 may correspond to a slot configuration having one or more uplink carrier switching periods 1435 (also referred to as blank uplink symbols), on which the UE 115-a may perform retuning of one or more of the TDD carrier 1410, the FDD uplink carrier 1415, or the FDD downlink carrier 1420. The UE 115-a may transmit uplink transmissions on the TDD carrier 1410 or using the FDD uplink carrier 1415 during all times except during the uplink symbols or slots of the TDD carrier 1410. During the uplink symbols or slots of the TDD carrier 1410, the UE 115-a may transmit the uplink transmissions using the TDD carrier 1410. Thus, the one or more uplink carrier switching periods 1435 may be located in either of the TDD carrier 1410 or the FDD uplink carrier 1415, and the UE 115-a may retune the carrier in accordance with the one or more uplink carrier switching periods 1435 to communicate uplink transmissions.

Figure 15:
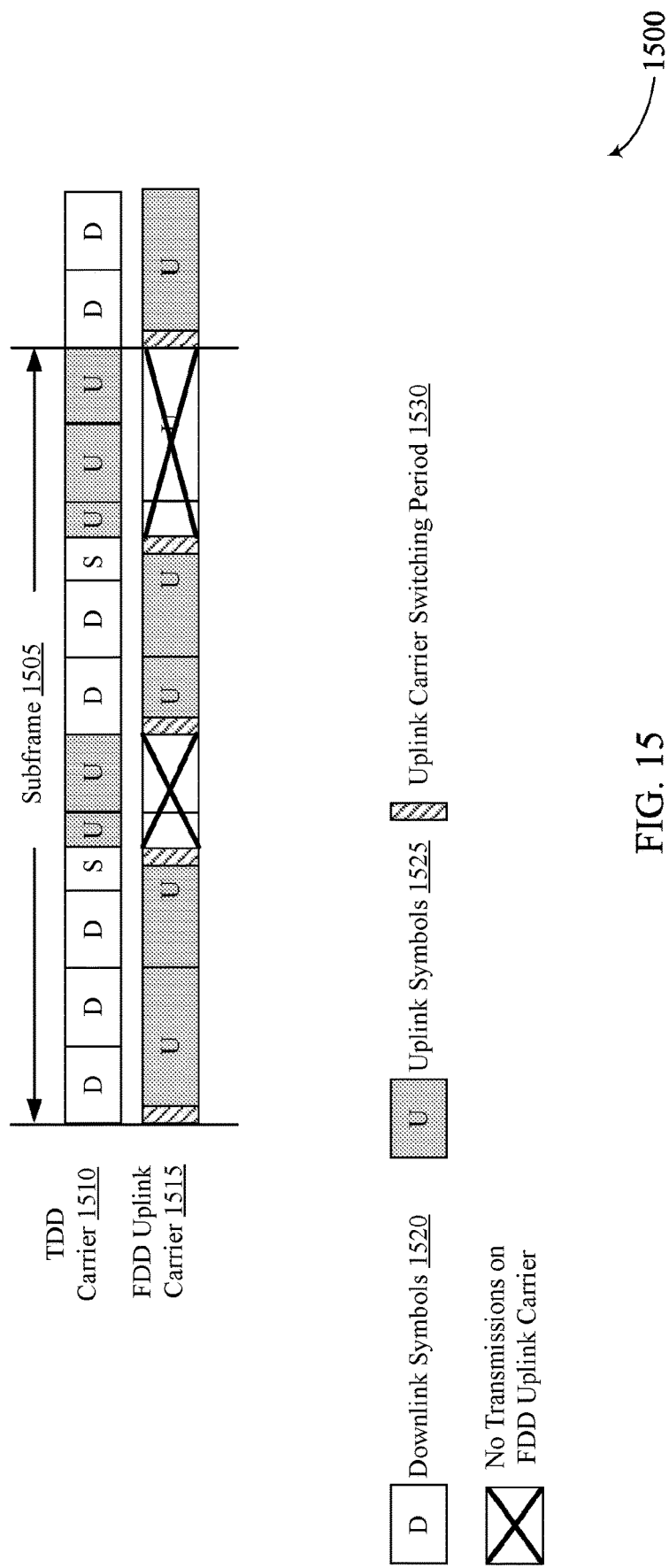

FIG. 15 illustrates an example of an uplink transmission timing pattern 1500 in accordance with aspects of the present disclosure. In some examples, the uplink transmission timing pattern 1500 may also implement aspects of the wireless communications systems 100 and 200, as described with reference to FIGS. 1 and 2. For example, the uplink transmission timing pattern 1500 may be based on a configuration by the base station 105-a and implemented by the UE 115-a. In the example of FIG. 15, the uplink transmission timing pattern 1500 may correspond to when the UE 115-a support a single uplink transmission mode, as described in FIG. 2.

With reference to FIG. 2, the UE 115-a may communicate with the base station 105-a in accordance with the uplink transmission timing pattern 1500. In the example of FIG. 15, when operating in the single uplink transmission mode, the UE 115-a may communicate with the base station 105-a via one or more of a TDD carrier 1510 or an FDD uplink carrier 1515 over a subframe 1505. The TDD carrier 1510 may be a carrier in a high radio frequency band, while the FDD uplink carrier 1515 may be a carrier in a low radio frequency band. Similarly, the TDD carrier 1510 may relate to a wide bandwidth, while the FDD uplink carrier 1515 may relate to a narrow bandwidth.

In some examples, one or more of the TDD carrier 1510 or the FDD uplink carrier 1515 of the uplink transmission timing pattern 1500 may correspond to a slot configuration having one or more of downlink symbols 1520 or uplink symbols 1525 on which the UE 115-*a* may communicate with the base station 105-*a*. In some examples, one or more of the TDD carrier 1510 or the FDD uplink carrier 1515 may correspond to a slot configuration having one or more uplink carrier switching periods 1530 (also referred to as blank uplink symbols), on which the UE 115-*a* may perform retuning of one or more of the TDD carrier 1510 or the FDD uplink carrier 1515. The one or more uplink carrier switching periods 1530 may be at a beginning or an ending of an uplink symbol 1525 in a slot configuration associated with the FDD uplink carrier 1515.

The UE 115-*a* may transmit uplink transmissions on the TDD carrier 1510 or using the FDD uplink carrier 1515 during all slots except the uplink symbols or slots of the TDD carrier 1510. During the uplink symbols or slots of the TDD carrier 1510, the UE 115-*a* may transmit the uplink transmissions using the TDD carrier 1510. Thus, the one or more uplink carrier switching periods 1530 may be located in either of the TDD carrier 1510 or the FDD uplink carrier 1515, and the UE 115-*a* may retune the TDD carrier 1510 or the FDD uplink carrier 1515 in accordance with the one or more uplink carrier switching periods 1530 to communicate uplink transmissions.

Figure 16:
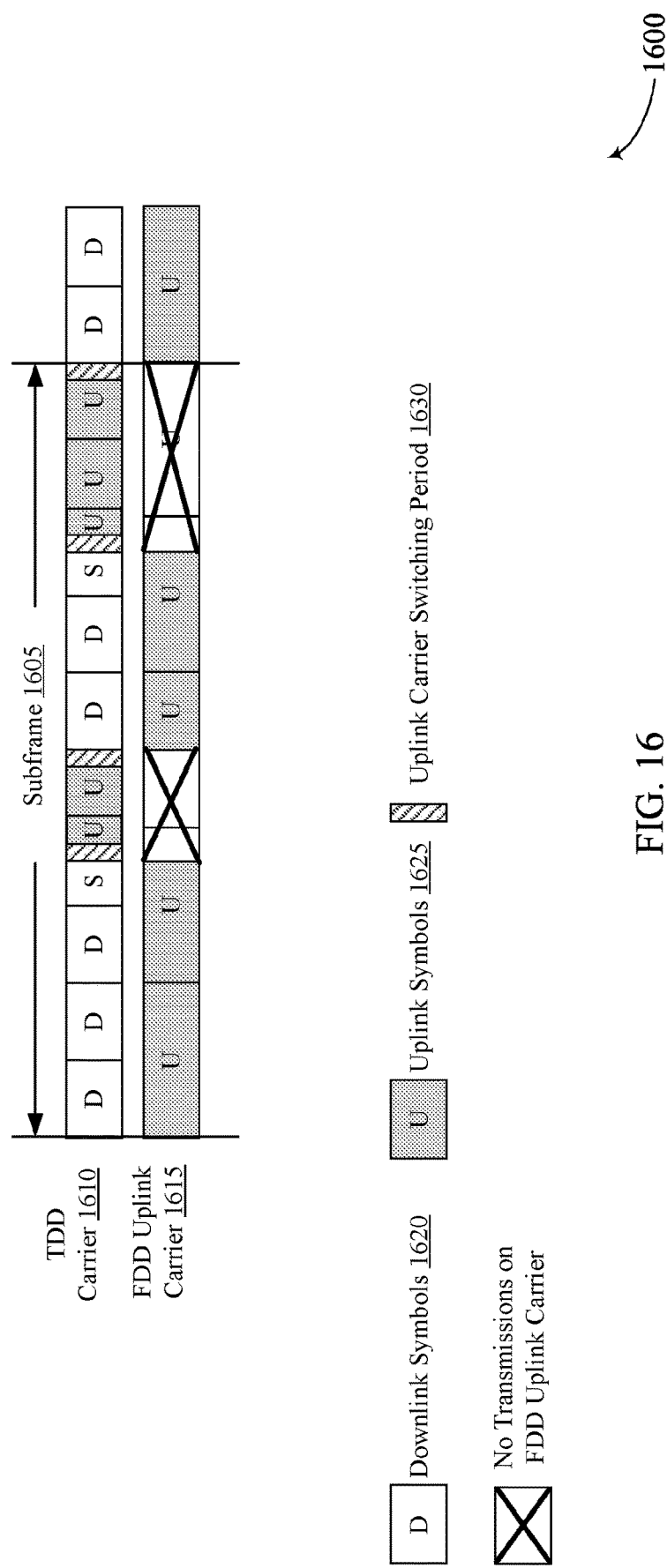

FIG. 16 illustrates an example of an uplink transmission timing pattern 1600 in accordance with aspects of the present disclosure. In some examples, the uplink transmission timing pattern 1600 may also implement aspects of the wireless communications systems 100 and 200, as described with reference to FIGS. 1 and 2. For example, the uplink transmission timing pattern 1600 may be based on a configuration by the base station 105-*a* and implemented by the UE 115-*a*. In the example of FIG. 16, the uplink transmission timing pattern 1600 may correspond to when the UE 115-*a* supports a single uplink transmission mode, as described in FIG. 2.

With reference to FIG. 2, the UE 115-*a* may communicate with the base station 105-*a* in accordance with the uplink transmission timing pattern 1600. In the example of FIG. 16, when operating in the single uplink transmission mode, the UE 115-*a* may communicate with the base station 105-*a* via one or more of a TDD carrier 1610 or an FDD uplink carrier 1615 over a subframe 1605. The TDD carrier 1610 may be a carrier in a high radio frequency band, while the FDD uplink carrier 1615 may be a carrier in a low radio frequency band. Similarly, the TDD carrier 1610 may relate to a wide bandwidth, while the FDD uplink carrier 1615 may relate to a narrow bandwidth.

In some examples, one or more of the TDD carrier 1610 or the FDD uplink carrier 1615 of the uplink transmission timing pattern 1600 may correspond to a slot configuration having one or more of downlink symbols 1620 or uplink symbols 1625 on which the UE 115-*a* may communicate with the base station 105-*a*. In some examples, one or more of the TDD carrier 1610 or the FDD uplink carrier 1615 may correspond to a slot configuration having one or more uplink carrier switching periods 1630 on which the UE 115-*a* may perform retuning of one or more of the TDD carrier 1610 or the FDD uplink carrier 1615. In some cases, the uplink carrier switching periods 1630 may overlap one or more blank uplink symbols (e.g., $b_{sym1}$, $b_{sym2}$, or both). The one or more uplink carrier switching periods 1630 may be at a beginning or an ending of an uplink symbol 1625 in a slot configuration associated with the TDD carrier 1610.

The UE 115-*a* may transmit uplink transmissions on the TDD carrier 1610 or using the FDD uplink carrier 1615 during all slots except the uplink symbols or slots of the TDD carrier 1610. During the uplink symbols or slots of the TDD carrier 1610, the UE 115-*a* may transmit the uplink transmissions using the TDD carrier 1610. Thus, the one or more uplink carrier switching periods 1630 may be located in either of the TDD carrier 1610 or the FDD uplink carrier 1615, and the UE 115-*a* may retune the TDD carrier 1610 or the FDD uplink carrier 1615 in accordance with the one or more uplink carrier switching periods 1630 to communicate uplink transmissions.

Figure 17:
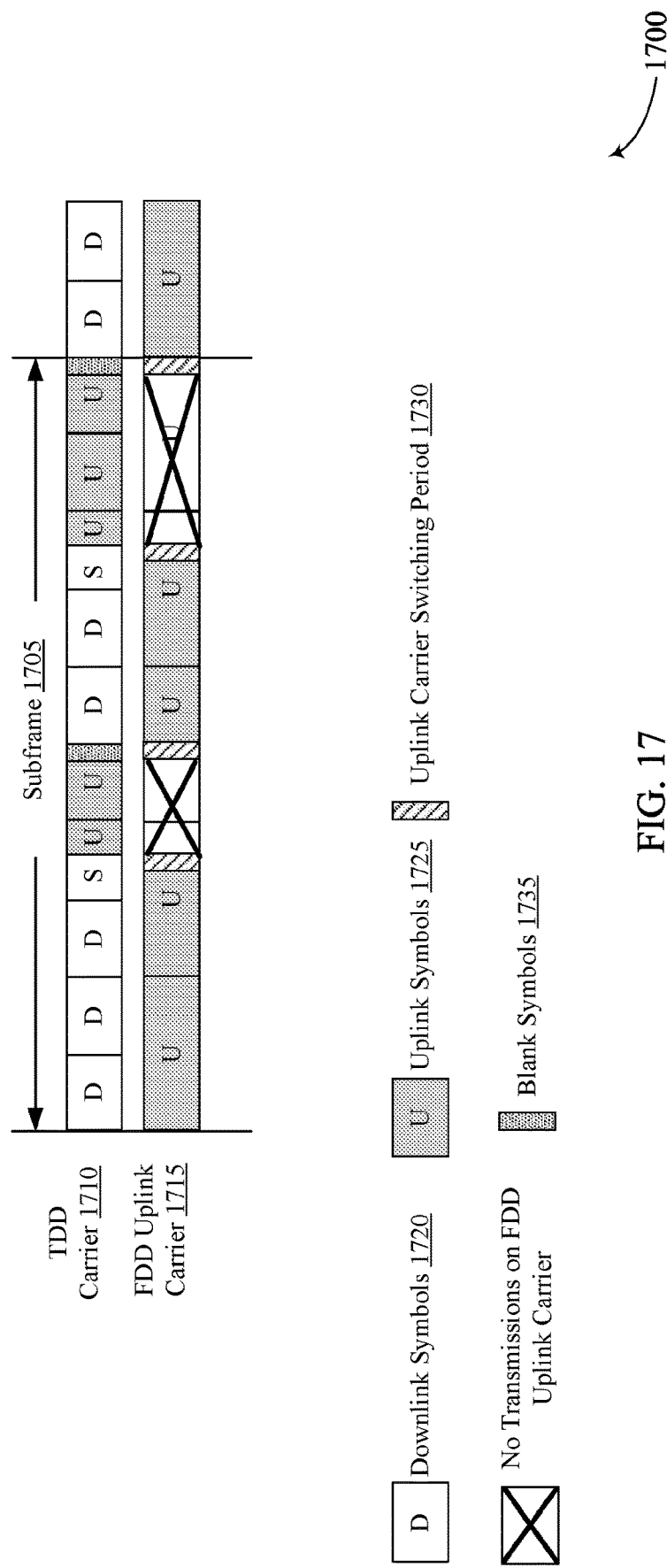

FIG. 17 illustrates an example of an uplink transmission timing pattern 1700 in accordance with aspects of the present disclosure. In some examples, the uplink transmission timing pattern 1700 may also implement aspects of the wireless communications systems 100 and 200, as described with reference to FIGS. 1 and 2. For example, the uplink transmission timing pattern 1700 may be based on a configuration by the base station 105-*a* and implemented by the UE 115-*a*. In the example of FIG. 17, the uplink transmission timing pattern 1700 may correspond to when the UE 115-*a* support a single uplink transmission mode, as described in FIG. 2.

With reference to FIG. 2, the UE 115-*a* may communicate with the base station 105-*a* in accordance with the uplink transmission timing pattern 1700. In the example of FIG. 17, when operating in the single uplink transmission mode, the UE 115-*a* may communicate with the base station 105-*a* via one or more of a TDD carrier 1710 or an FDD uplink carrier 1715 over a subframe 1705. The TDD carrier 1710 may be a carrier in a high radio frequency band, while the FDD uplink carrier 1715 may be a carrier in a low radio frequency band. Similarly, the TDD carrier 1710 may relate to a wide bandwidth, while the FDD uplink carrier 1715 may relate to a narrow bandwidth.

In some examples, one or more of the TDD carrier 1710 or the FDD uplink carrier 1715 of the uplink transmission timing pattern 1700 may correspond to a slot configuration having one or more of downlink symbols 1720 or uplink symbols 1725 on which the UE 115-*a* may communicate with the base station 105-*a*. In some examples, one or more of the TDD carrier 1710 or the FDD uplink carrier 1715 may correspond to a slot configuration having one or more uplink carrier switching periods on which the UE 115-*a* may perform retuning of one or more of the TDD carrier 1710 or the FDD uplink carrier 1715. In this example, the TDD carrier 1710 may include one or more blank symbols 1735 (e.g., $b_{sym1}$, $b_{sym2}$, or both) that correspond to the timing of the one or more uplink carrier switching periods 1730. That is, the one or more blank symbols 1735 may, by their temporal location(s) in the TDD carrier 1710, be indicative of the temporal location(s) of the one or more uplink carrier switching periods 1730. The one or more uplink carrier switching periods 1730 may be at a beginning or an ending of an uplink symbol 1725 in a slot configuration associated with the FDD uplink carrier 1715.

The UE 115-*a* may transmit uplink transmissions on the TDD carrier 1710 or using the FDD uplink carrier 1715 during all slots except the uplink symbols or slots of the TDD carrier 1710. During the uplink symbols or slots of the TDD carrier 1710, the UE 115-*a* may transmit the uplink transmissions using the TDD carrier 1710. Thus, the one or more uplink carrier switching periods 1730 may be located in either of the TDD carrier 1710 or the FDD uplink carrier 1715, and the UE 115-*a* may retune the TDD carrier 1710 or the FDD uplink carrier 1715 in accordance with the one or more uplink carrier switching periods 1730 to communicate uplink transmissions.

Figure 18:
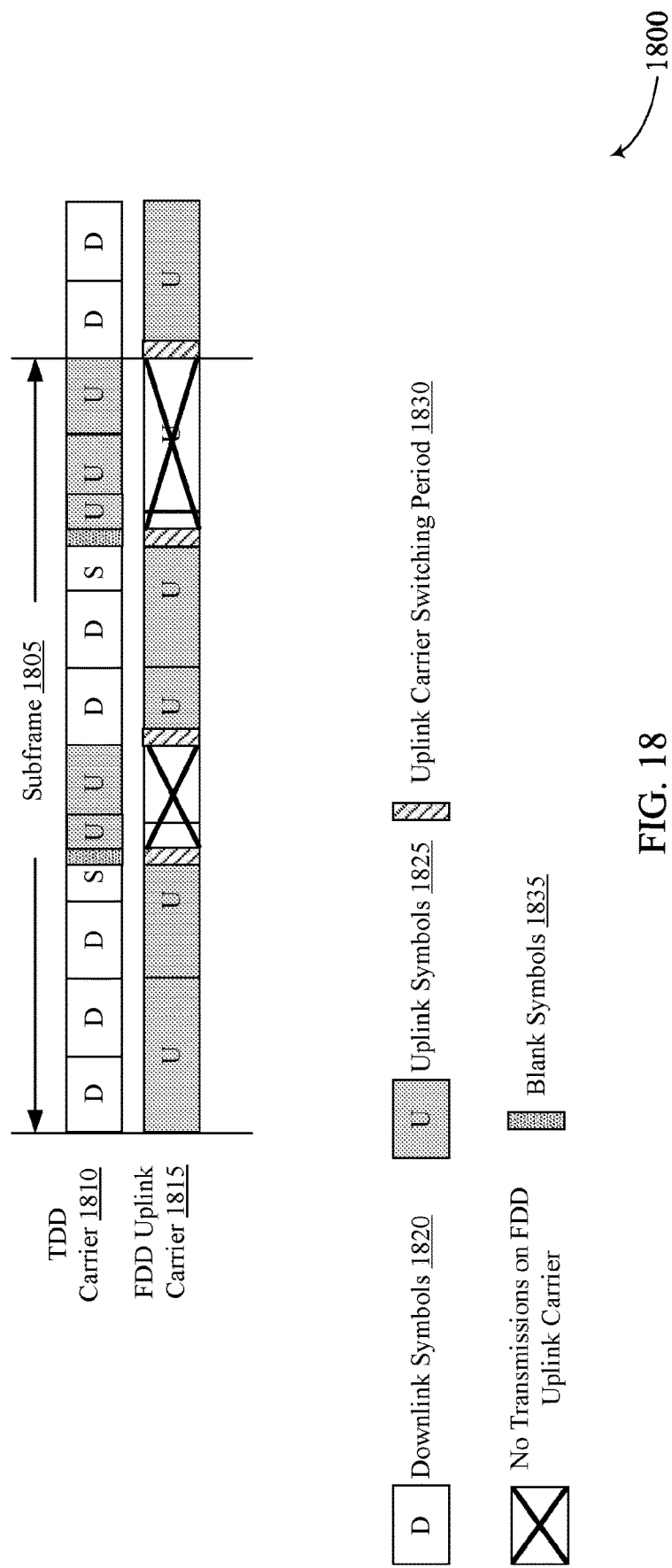

FIG. 18 illustrates an example of an uplink transmission timing pattern 1800 in accordance with aspects of the present disclosure. In some examples, the uplink transmission timing pattern 1800 may also implement aspects of the wireless communications systems 100 and 200, as described with reference to FIGS. 1 and 2. For example, the uplink transmission timing pattern 1800 may be based on a configuration by the base station 105-*a* and implemented by the UE 115-*a*. In the example of FIG. 18, the uplink transmission timing pattern 1800 may correspond to when the UE 115-*a* support a single uplink transmission mode, as described in FIG. 2.

With reference to FIG. 2, the UE 115-*a* may communicate with the base station 105-*a* in accordance with the uplink transmission timing pattern 1800. In the example of FIG. 18, when operating in the single uplink transmission mode, the UE 115-*a* may communicate with the base station 105-*a* via one or more of a TDD carrier 1810 or an FDD uplink carrier 1815 over a subframe 1805. The TDD carrier 1810 may be a carrier in a high radio frequency band, while the FDD uplink carrier 1815 may be a carrier in a low radio frequency band. Similarly, the TDD carrier 1810 may relate to a wide bandwidth, while the FDD uplink carrier 1815 may relate to a narrow bandwidth.

In some examples, one or more of the TDD carrier 1810 or the FDD uplink carrier 1815 of the uplink transmission timing pattern 1800 may correspond to a slot configuration having one or more of downlink symbols 1820 or uplink symbols 1825 on which the UE 115-*a* may communicate with the base station 105-*a*. In some examples, one or more of the TDD carrier 1810 or the FDD uplink carrier 1815 may correspond to a slot configuration having one or more uplink carrier switching periods on which the UE 115-*a* may perform retuning of one or more of the TDD carrier 1810 or the FDD uplink carrier 1815. In this example, the TDD carrier 1810 may include one or more blank symbols 1835 (e.g., $b_{sym1}$, $b_{sym2}$, or both) that correspond to the timing of the one or more uplink carrier switching periods 1830. That is, the one or more blank symbols 1835 may, by their temporal location(s) in the TDD carrier 1810, be indicative of the temporal location(s) of the one or more uplink carrier switching periods 1830. The one or more uplink carrier switching periods 1830 may be at a beginning or an ending of an uplink symbol 1825 in a slot configuration associated with the TDD carrier 1810 and/or the FDD uplink carrier 1815.

The UE 115-*a* may transmit uplink transmissions on the TDD carrier 1810 or using the FDD uplink carrier 1815 during all slots except the uplink symbols or slots of the TDD carrier 1810. During the uplink symbols or slots of the TDD carrier 1810, the UE 115-*a* may transmit the uplink transmissions using the TDD carrier 1810. Thus, the one or more uplink carrier switching periods 1830 and the one or more blank symbols 1835 may be located in either of the TDD carrier 1810 or the FDD uplink carrier 1815, and the UE 115-*a* may retune the TDD carrier 1810 or the FDD uplink carrier 1815 in accordance with the one or more uplink carrier switching periods 1830 to communicate uplink transmissions.

Figure 19:
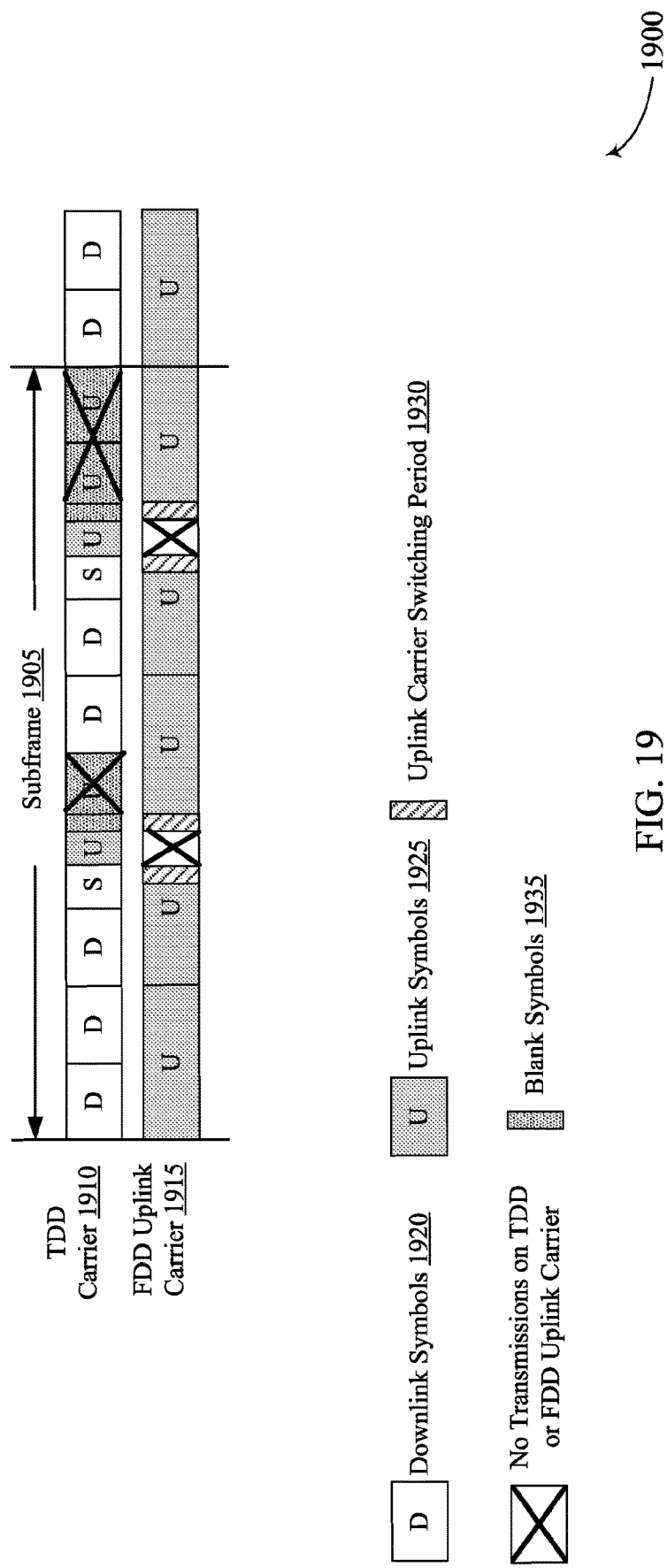

FIG. 19 illustrates an example of an uplink transmission timing pattern 1900 in accordance with aspects of the present disclosure. In some examples, the uplink transmission timing pattern 1900 may also implement aspects of the wireless communications systems 100 and 200, as described with reference to FIGS. 1 and 2. For example, the uplink transmission timing pattern 1900 may be based on a configuration by the base station 105-*a* and implemented by the UE 115-*a*. In the example of FIG. 19, the uplink transmission timing pattern 1900 may correspond to when the UE 115-*a* support a single uplink transmission mode, as described in FIG. 2.

With reference to FIG. 2, the UE 115-*a* may communicate with the base station 105-*a* in accordance with the uplink transmission timing pattern 1900. In the example of FIG. 19, when operating in the single uplink transmission mode, the UE 115-*a* may communicate with the base station 105-*a* via one or more of a TDD carrier 1910 or an FDD uplink carrier 1915 over a subframe 1905. The TDD carrier 1910 may be a carrier in a high radio frequency band, while the FDD uplink carrier 1915 may be a carrier in a low radio frequency band. Similarly, the TDD carrier 1910 may relate to a wide bandwidth, while the FDD uplink carrier 1915 may relate to a narrow bandwidth.

In some examples, one or more of the TDD carrier 1910 or the FDD uplink carrier 1915 of the uplink transmission timing pattern 1900 may correspond to a slot configuration having one or more of downlink symbols 1920 or uplink symbols 1925 on which the UE 115-*a* may communicate with the base station 105-*a*. In some examples, one or more of the TDD carrier 1910 or the FDD uplink carrier 1915 may correspond to a slot configuration having one or more uplink carrier switching periods 1930 on which the UE 115-*a* may perform retuning of one or more of the TDD carrier 1910 or the FDD uplink carrier 1915. In this example, the TDD carrier 1910 may include one or more blank symbols 1935 (e.g., $b_{sym1}$, $b_{sym2}$, or both) that correspond to the timing of the one or more uplink carrier switching periods 1930. That is, the one or more blank symbols 1935 may, by their temporal location(s) in the TDD carrier 1910, be indicative of the temporal location(s) of the one or more uplink carrier switching periods 1930. The one or more uplink carrier switching periods 1930 may be at a beginning or an ending of an uplink symbol 1925 in a slot configuration associated with the TDD carrier 1910 and/or the FDD uplink carrier 1915.

The UE 115-*a* may transmit uplink transmissions on the TDD carrier 1910 or using the FDD uplink carrier 1915 during all slots except the uplink symbols or slots of the TDD carrier 1910. During the uplink symbols or slots of the TDD carrier 1910, the UE 115-*a* may transmit the uplink transmissions using the TDD carrier 1910. Thus, the one or more uplink carrier switching periods 1930 and the one or more blank symbols 1935 may be located in either of the TDD carrier 1910 or the FDD uplink carrier 1915, and the UE 115-*a* may retune the TDD carrier 1910 or the FDD uplink carrier 1915 in accordance with the one or more uplink carrier switching periods 1930 to communicate uplink transmissions.

Figure 20:
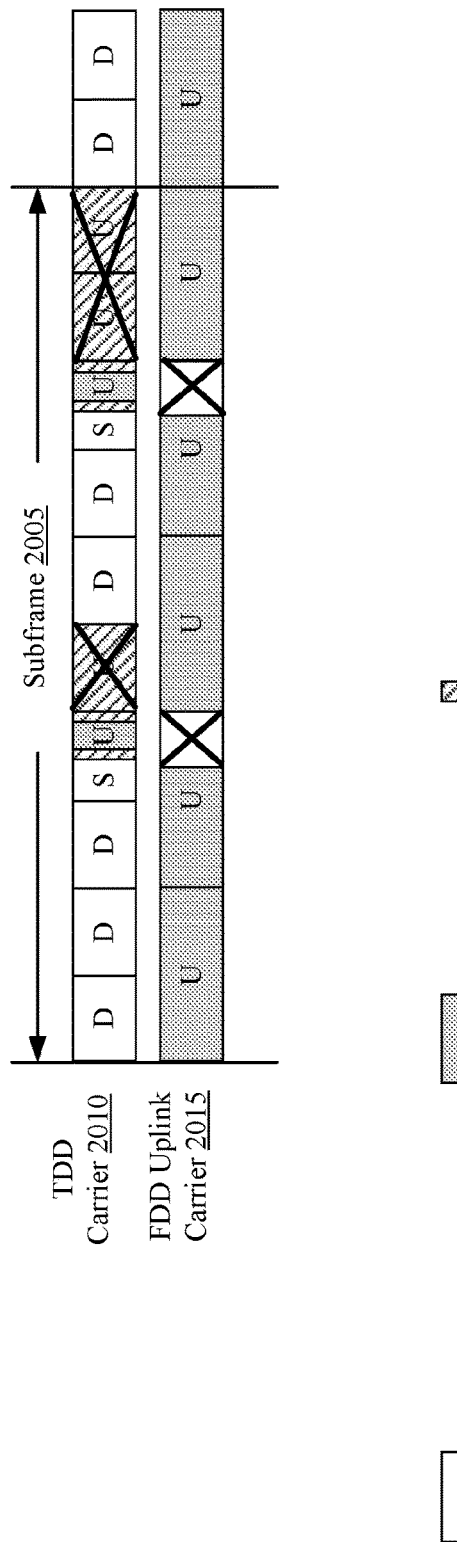

FIG. 20 illustrates an example of an uplink transmission timing pattern 2000 in accordance with aspects of the present disclosure. In some examples, the uplink transmission timing pattern 2000 may also implement aspects of the wireless communications systems 100 and 200, as described with reference to FIGS. 1 and 2. For example, the uplink transmission timing pattern 2000 may be based on a configuration by the base station 105-*a* and implemented by the UE 115-*a*. In the example of FIG. 20, the uplink transmission timing pattern 2000 may correspond to when the UE 115-*a* support a single uplink transmission mode, as described in FIG. 2.

With reference to FIG. 2, the UE 115-*a* may communicate with the base station 105-*a* in accordance with the uplink transmission timing pattern 2000. In the example of FIG. 20, when operating in the single uplink transmission mode, the UE 115-*a* may communicate with the base station 105-*a* via one or more of a TDD carrier 2010 or an FDD uplink carrier 2015 over a subframe 2005. The TDD carrier 2010 may be a carrier in a high radio frequency band, while the FDD uplink carrier 2015 may be a carrier in a low radio frequency band. Similarly, the TDD carrier 2010 may relate to a wide bandwidth, while the FDD uplink carrier 2015 may relate to a narrow bandwidth.

In some examples, one or more of the TDD carrier 2010 or the FDD uplink carrier 2015 of the uplink transmission timing pattern 2000 may correspond to a slot configuration having one or more of downlink symbols 2020 or uplink symbols 2025 on which the UE 115-*a* may communicate with the base station 105-*a*. In some examples, one or more of the TDD carrier 2010 or the FDD uplink carrier 2015 may correspond to a slot configuration having one or more uplink carrier switching periods 2030 on which the UE 115-*a* may perform retuning of one or more of the TDD carrier 2010 or the FDD uplink carrier 2015. In some cases, the uplink carrier switching periods 2030 may overlap one or more blank uplink symbols (e.g., $b_{sym1}$, $b_{sym2}$, or both). The one or more uplink carrier switching periods 2030 may be at a beginning or an ending of an uplink symbol 2025 in a slot configuration associated with the TDD carrier 2010 and/or the FDD uplink carrier 2015.

The UE 115-*a* may transmit uplink transmissions on the TDD carrier 2010 or using the FDD uplink carrier 2015 during all slots except the uplink symbols or slots of the TDD carrier 2010. During the uplink symbols or slots of the TDD carrier 2010, the UE 115-*a* may transmit the uplink transmissions using the TDD carrier 2010. Thus, the one or more uplink carrier switching periods 2030 and the one or more blank uplink symbols may be located in either of the TDD carrier 2010 or the FDD uplink carrier 2015, and the UE 115-*a* may retune the TDD carrier 2010 or the FDD uplink carrier 2015 in accordance with the one or more uplink carrier switching periods 2030 to communicate uplink transmissions.

Figure 21:
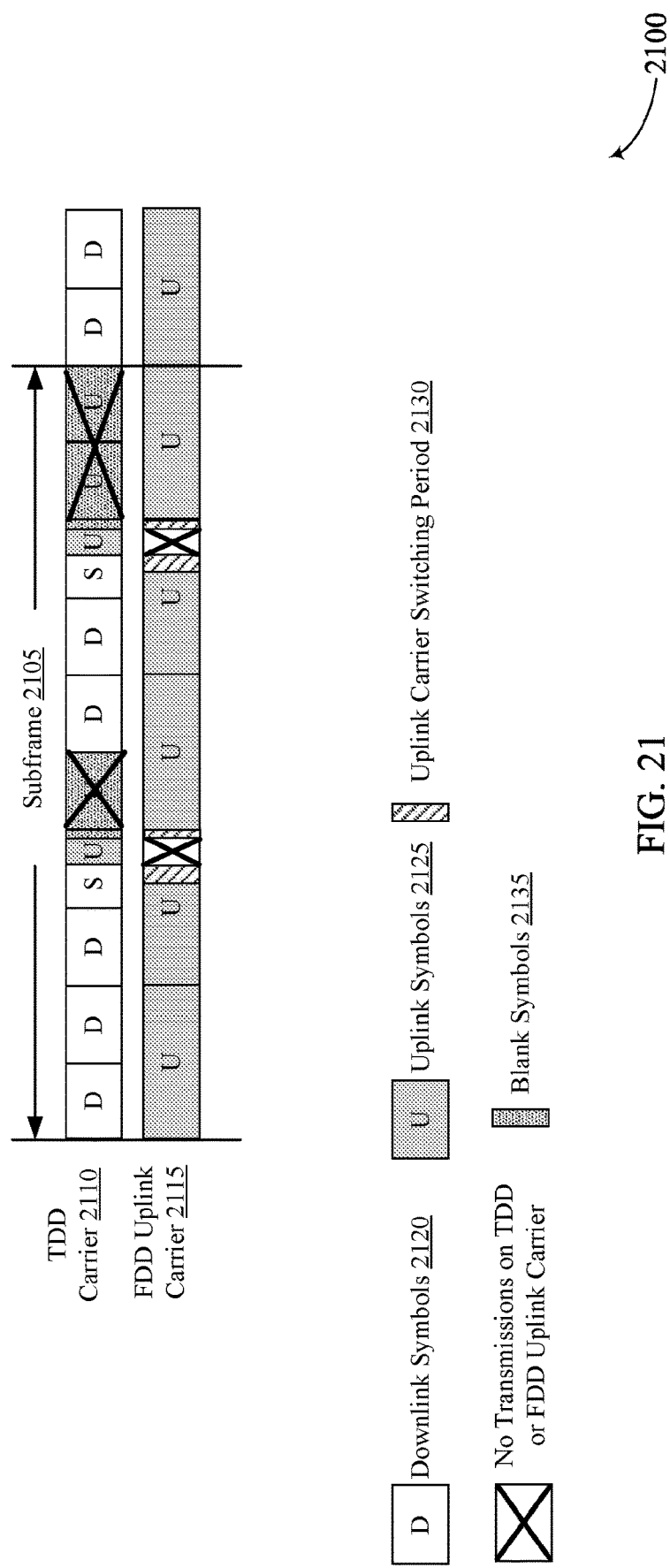

FIG. 21 illustrates an example of an uplink transmission timing pattern 2100 in accordance with aspects of the present disclosure. In some examples, the uplink transmission timing pattern 2100 may also implement aspects of the wireless communications systems 100 and 200, as described with reference to FIGS. 1 and 2. For example, the uplink transmission timing pattern 2100 may be based on a configuration by the base station 105-*a* and implemented by the UE 115-*a*. In the example of FIG. 21, the uplink transmission timing pattern 2100 may correspond to when the UE 115-*a* support a single uplink transmission mode, as described in FIG. 2.

With reference to FIG. 2, the UE 115-*a* may communicate with the base station 105-*a* in accordance with the uplink transmission timing pattern 2100. In the example of FIG. 21, when operating in the single uplink transmission mode, the UE 115-*a* may communicate with the base station 105-*a* via one or more of a TDD carrier 2110 or an FDD uplink carrier 2115 over a subframe 2105. The TDD carrier 2110 may be a carrier in a high radio frequency band, while the FDD uplink carrier 2115 may be a carrier in a low radio frequency band. Similarly, the TDD carrier 2110 may relate to a wide bandwidth, while the FDD uplink carrier 2115 may relate to a narrow bandwidth.

In some examples, one or more of the TDD carrier 2110 or the FDD uplink carrier 2115 of the uplink transmission timing pattern 2100 may correspond to a slot configuration having one or more of downlink symbols 2120 or uplink symbols 2125 on which the UE 115-*a* may communicate with the base station 105-*a*. In some examples, one or more of the TDD carrier 2110 or the FDD uplink carrier 2115 may correspond to a slot configuration having one or more uplink carrier switching periods 2130 on which the UE 115-*a* may perform retuning of one or more of the TDD carrier 2110 or the FDD uplink carrier 2115. In this example, the TDD carrier 2110 may include one or more blank symbols 2135 (e.g., $b_{sym1}$, $b_{sym2}$, or both) that correspond to the timing of the one or more uplink carrier switching periods 2130. That is, the one or more blank symbols 2135 may, by their temporal location(s) in the TDD carrier 2110, be indicative of the temporal location(s) of the one or more uplink carrier switching periods 2130. The one or more uplink carrier switching periods 2130 may be at a beginning or an ending of an uplink symbol 2125 in a slot configuration associated with the TDD carrier 2110 and/or the FDD uplink carrier 2115.

The UE 115-*a* may transmit uplink transmissions on the TDD carrier 2110 or using the FDD uplink carrier 2115 during all slots except the uplink symbols or slots of the TDD carrier 2110. During the uplink symbols or slots of the TDD carrier 2110, the UE 115-*a* may transmit the uplink transmissions using the TDD carrier 2110. Thus, the one or more uplink carrier switching periods 2130 and the one or more blank symbols 2135 may be located in either of the TDD carrier 2110 or the FDD uplink carrier 2115, and the UE 115-*a* may retune the TDD carrier 2110 or the FDD uplink carrier 2115 in accordance with the one or more uplink carrier switching periods 2130 to communicate uplink transmissions.

Figure 22:
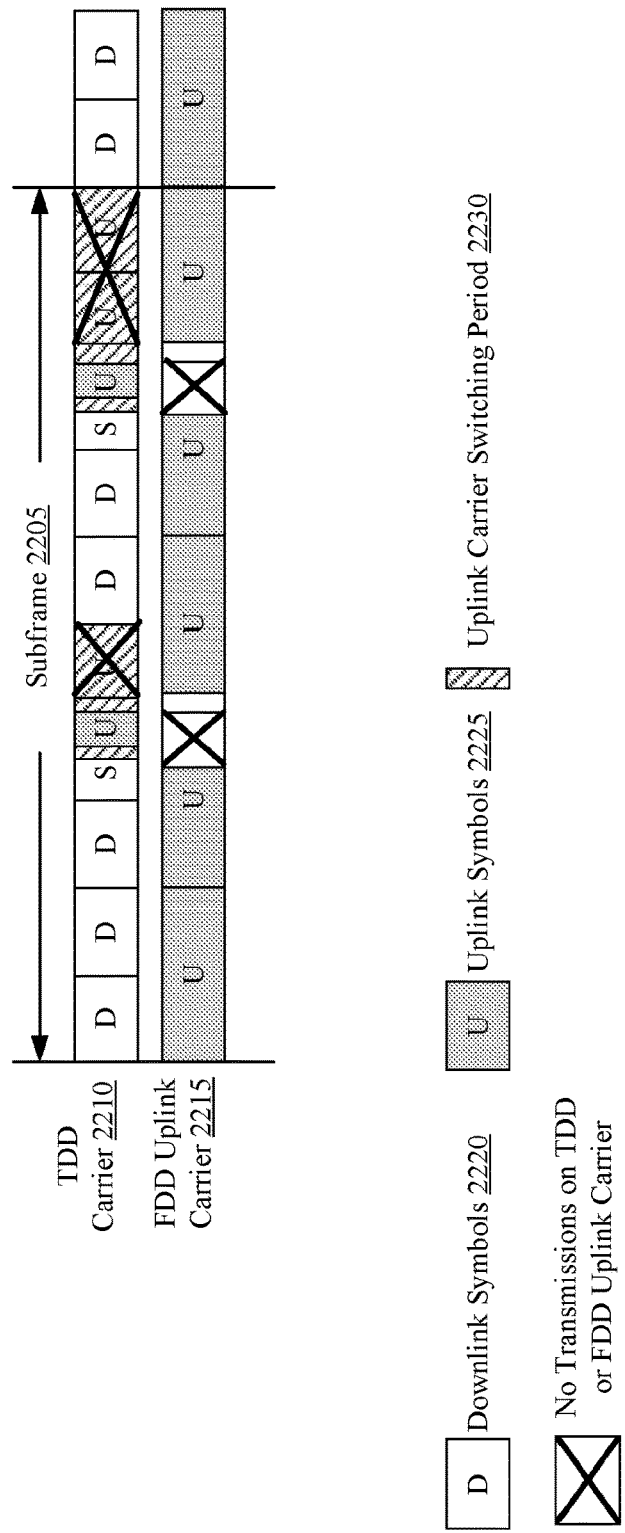

FIG. 22 illustrates an example of an uplink transmission timing pattern 2200 in accordance with aspects of the present disclosure. In some examples, the uplink transmission timing pattern 2200 may also implement aspects of the wireless communications systems 100 and 200, as described with reference to FIGS. 1 and 2. For example, the uplink transmission timing pattern 2200 may be based on a configuration by the base station 105-*a* and implemented by the UE 115-*a*. In the example of FIG. 22, the uplink transmission timing pattern 2200 may correspond to when the UE 115-*a* support a single uplink transmission mode, as described in FIG. 2.

With reference to FIG. 2, the UE 115-*a* may communicate with the base station 105-*a* in accordance with the uplink transmission timing pattern 2200. In the example of FIG. 22, when operating in the single uplink transmission mode, the UE 115-*a* may communicate with the base station 105-*a* via one or more of a TDD carrier 2210 or an FDD uplink carrier 2215 over a subframe 2205. The TDD carrier 2210 may be a carrier in a high radio frequency band, while the FDD uplink carrier 2215 may be a carrier in a low radio frequency band. Similarly, the TDD carrier 2210 may relate to a wide bandwidth, while the FDD uplink carrier 2215 may relate to a narrow bandwidth.

In some examples, one or more of the TDD carrier 2210 or the FDD uplink carrier 2215 of the uplink transmission timing pattern 2200 may correspond to a slot configuration having one or more of downlink symbols 2220 or uplink symbols 2225 on which the UE 115-*a* may communicate with the base station 105-a. In some examples, one or more of the TDD carrier 2210 or the FDD uplink carrier 2215 may correspond to a slot configuration having one or more uplink carrier switching periods 2230 (also referred to as blank uplink symbols), on which the UE 115-a may perform retuning of one or more of the TDD carrier 2210 or the FDD uplink carrier 2215. The one or more uplink carrier switching periods 2230 may be at a beginning or an ending of an uplink symbol 2225 in a slot configuration associated with the TDD carrier 2210 and/or the FDD uplink carrier 2215.

The UE 115-a may transmit uplink transmissions on the TDD carrier 2210 or using the FDD uplink carrier 2215 during all slots except the uplink symbols or slots of the TDD carrier 2210. During the uplink symbols or slots of the TDD carrier 2210, the UE 115-a may transmit the uplink transmissions using the TDD carrier 2210. Thus, the one or more uplink carrier switching periods 2230 may be located in either of the TDD carrier 2210 or the FDD uplink carrier 2215, and the UE 115-a may retune the TDD carrier 2210 or the FDD uplink carrier 2215 in accordance with the one or more uplink carrier switching periods 2230 to communicate uplink transmissions.

Figure 23:
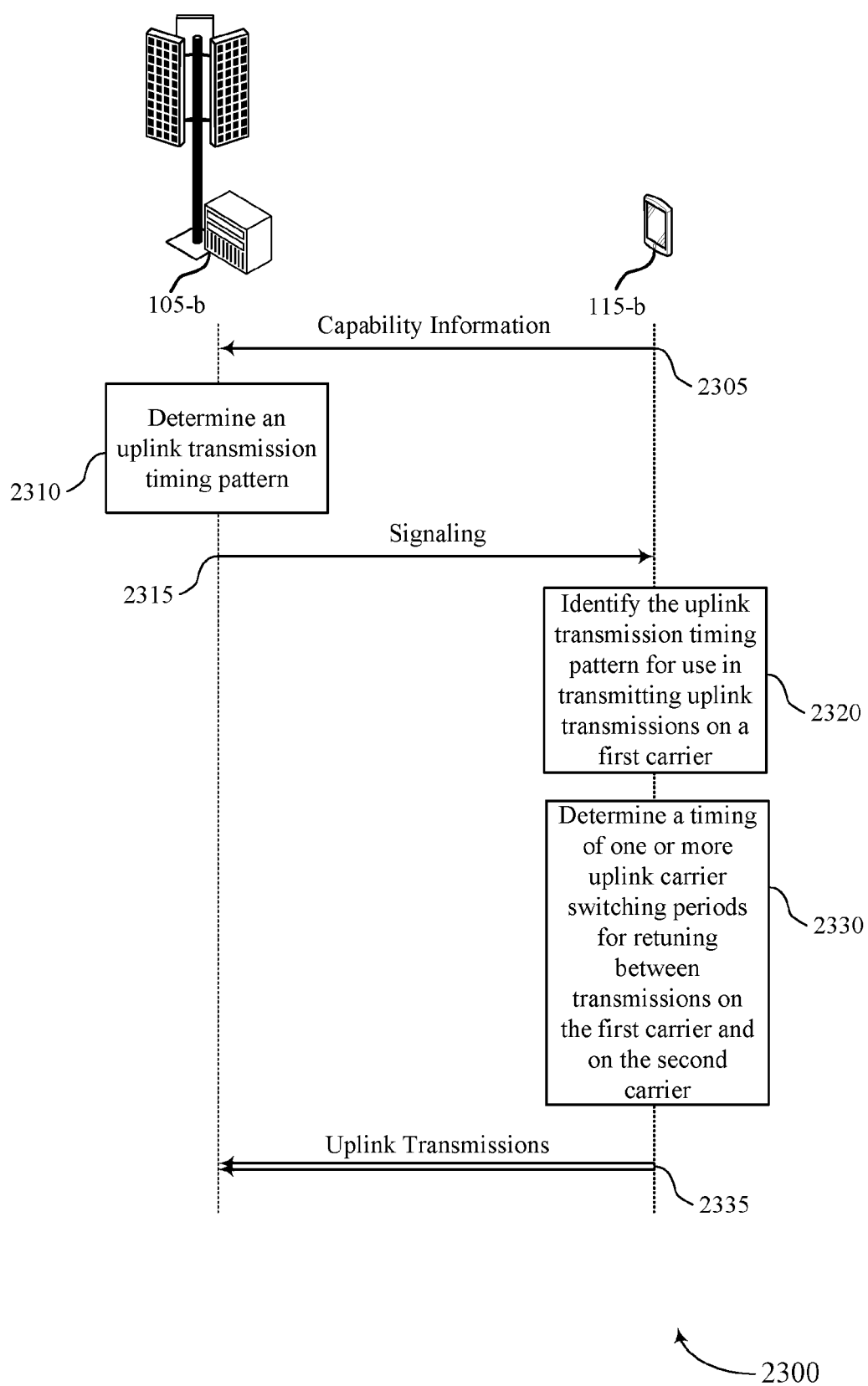
FIG. 23 illustrates an example of a process flow that supports uplink transmission timing patterns in accordance with aspects of the present disclosure.

FIG. 23 illustrates an example of a process flow 2300 that supports uplink transmission timing patterns in accordance with aspects of the present disclosure. In some examples, the process flow 2300 may implement aspects of the wireless communications systems 100 and 200, as described with reference to FIGS. 1 and 2. For example, the process flow 2300 may be based on a configuration by a base station 105 or a UE 115, and implemented by the UE 115 for reduced power consumption, spectral efficiency, higher data rates, among other benefits. The process flow 2300 may include a base station 105-b and a UE 115-b, which may be examples of base stations 105 and UEs 115 as described with reference to FIGS. 1 and 2. In the following description of the process flow 2300, the operations between the base station 105-b and the UE 115-b may be transmitted in a different order than the example order shown, or the operations performed by the base station 105-b and the UE 115-b may be performed in different orders or at different times. Some operations may also be omitted from the process flow 2300, and other operations may be added to the process flow 2300.

At 2305, the process flow 2300 may commence with the UE 115-b determining and transmitting capability information to the base station 105-b. At 2310, the base station 105-b may determine an uplink transmission timing pattern. For example, the base station 105-b may determine, based on the capability information, the uplink transmission timing pattern for use by the UE 115-b in transmitting uplink transmissions on a first carrier during a single uplink transmission mode. The uplink transmission timing pattern may include one or more blank uplink symbols corresponding to a timing of one or more uplink carrier switching periods for retuning between the first carrier and a second carrier by the UE 115-b when operating in the single uplink transmission mode. At 2315, the base station 105-b may transmit an indication of the uplink transmission timing pattern to the UE 115-b. The uplink transmission timing pattern may be UE-specific or cell-specific.

At 2320, the UE 115-b may identify to use both the first carrier and a second carrier during a single uplink transmission mode. The UE 115-b may transition between sending the uplink transmissions on the first carrier and on the second carrier. In some examples, the first carrier may be a TDD carrier, while the second carrier may be an FDD carrier. At 2325, the UE 115-b may determine a timing of one or more uplink carrier switching periods for retuning between transmissions on the first carrier and on the second carrier. For example, the UE 115-b may identify one or more blank uplink symbols based one or more blank symbol information elements received with the uplink transmission timing pattern. The one or more blank uplink symbols may correspond to one or more uplink symbols of the uplink transmission timing pattern. At 2330, the UE 115-b may transmit uplink transmissions, during the single uplink transmission mode, on both the first carrier and the second carrier in accordance with the uplink transmission timing pattern for the first carrier and the one or more uplink carrier switching periods.

Figure 24:
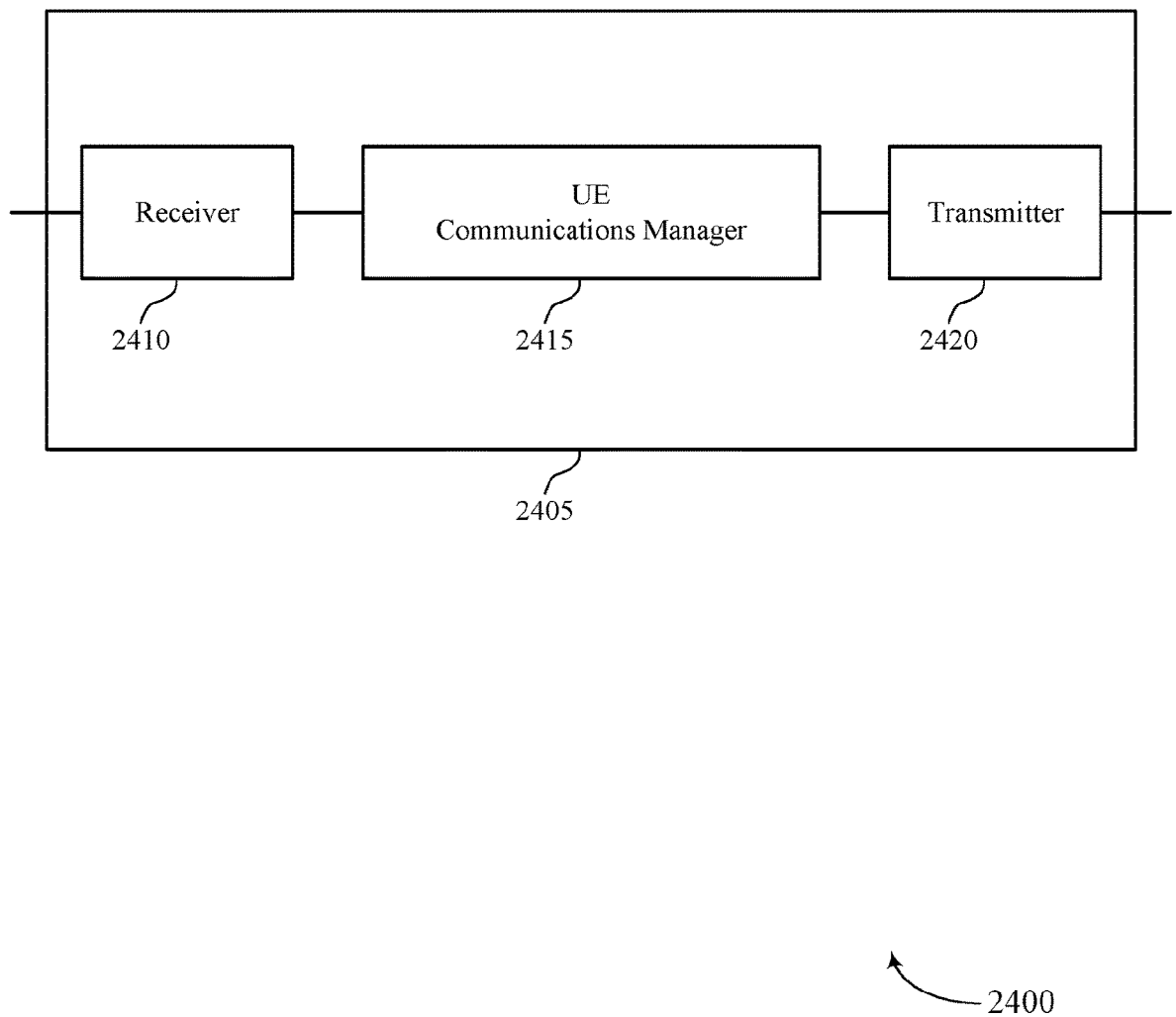
FIGS. 24 and 25 show block diagrams of devices that support uplink transmission timing patterns in accordance with aspects of the present disclosure.

FIG. 24 shows a block diagram 2400 of a device 2405 that supports uplink transmission timing patterns in accordance with aspects of the present disclosure. The device 2405 may be an example of aspects of a UE 115 as described herein. The device 2405 may include a receiver 2410, a UE communications manager 2415, and a transmitter 2420. The device 2405 may also include a processor. Each of these components may be in communication with one another (e.g., via one or more buses).

The receiver 2410 may receive information such as packets, user data, or control information associated with various information channels (e.g., control channels, data channels, and information related to uplink transmission timing pattern, etc.). Information may be passed on to other components of the device 2405. The receiver 2410 may be an example of aspects of the transceiver 2720 described with reference to FIG. 27. The receiver 2410 may utilize a single antenna or a set of antennas.

The UE communications manager 2415 may receive an indication of an uplink transmission timing patterns for use by the device 2405 in transmitting uplink transmissions on a first carrier, identify that the device 2405 is to use both the first carrier and a second carrier during a single uplink transmission mode, where the device 2405 transitions between sending the uplink transmissions on the first carrier and on the second carrier, determine, based on the uplink transmission timing pattern, a timing of one or more uplink carrier switching periods for retuning between transmissions on the first carrier and on the second carrier, and transmit, during the single uplink transmission mode, on both the first carrier and the second carrier in accordance with the uplink transmission timing pattern for the first carrier and the one or more uplink carrier switching periods. The UE communications manager 2415 may be an example of aspects of the UE communications manager 2710 described herein.

The UE communications manager 2415, or its sub-components, may be implemented in hardware, code (e.g., software or firmware) executed by a processor, or any combination thereof. If implemented in code executed by a processor, the functions of the UE communications manager 2415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 2415, or its sub-components, may be physically located at various positions, including being distributed such that portions of functions are implemented at different physical locations by one or more physical components. In some examples, the UE communications manager 2415, or its sub-components, may be a separate and distinct component in accordance with various aspects of the present disclosure. In some examples, the UE communications manager 2415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2420 may transmit signals generated by other components of the device 2405. In some examples, the transmitter 2420 may be collocated with a receiver 2410 in a transceiver module. For example, the transmitter 2420 may be an example of aspects of the transceiver 2720 described with reference to FIG. 27. The transmitter 2420 may utilize a single antenna or a set of antennas.

Figure 25:
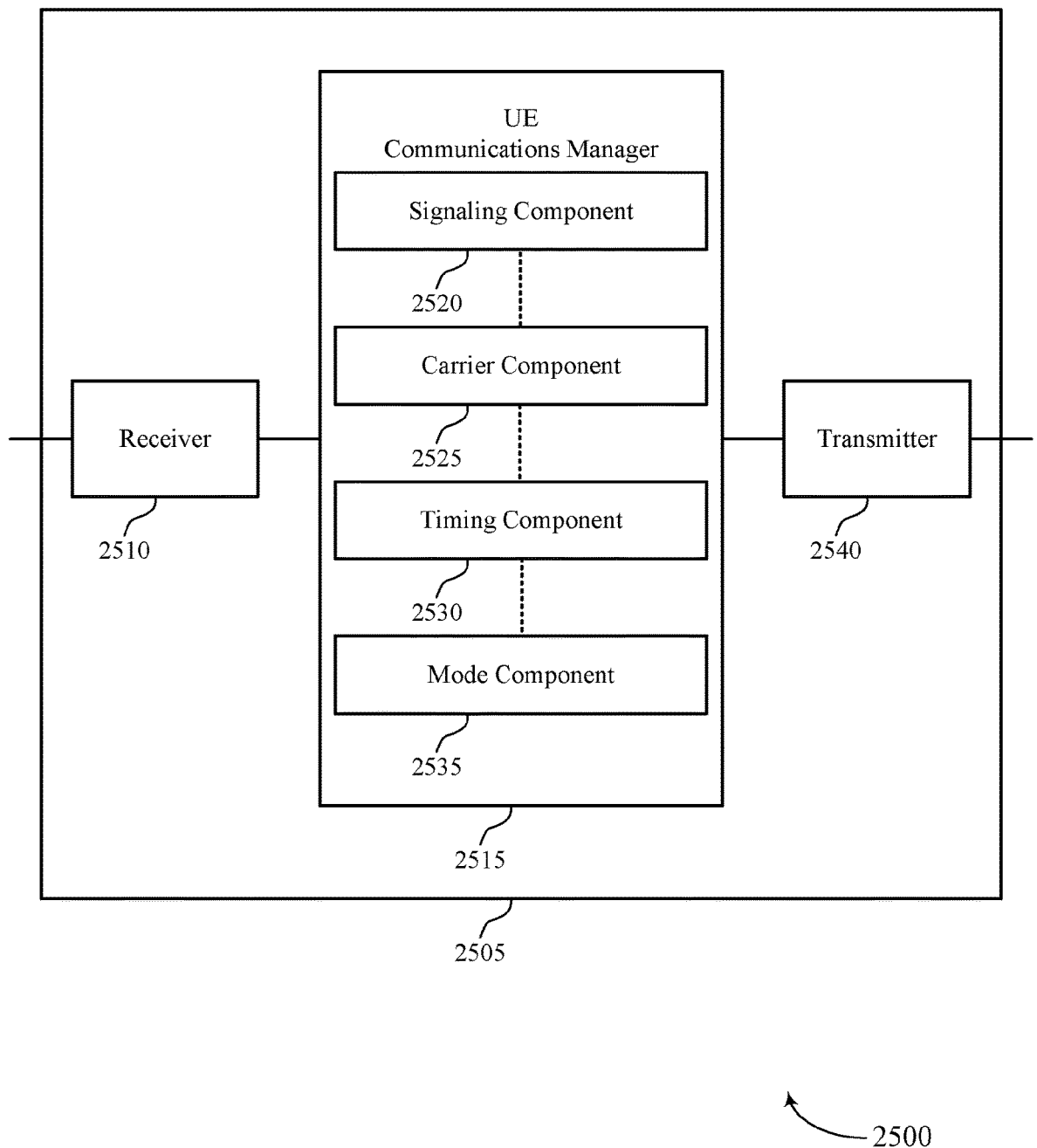

FIG. 25 shows a block diagram 2500 of a device 2505 that supports uplink transmission timing patterns in accordance with aspects of the present disclosure. The device 2505 may be an example of aspects of a device 2405, or a UE 115 as described herein. The device 2505 may include a receiver 2510, a UE communications manager 2515, and a transmitter 2540. The device 2505 may also include a processor. Each of these components may be in communication with one another (e.g., via one or more buses).

The receiver 2510 may receive information such as packets, user data, or control information associated with various information channels (e.g., control channels, data channels, and information related to uplink transmission timing pattern, etc.). Information may be passed on to other components of the device 2505. The receiver 2510 may be an example of aspects of the transceiver 2720 described with reference to FIG. 27. The receiver 2510 may utilize a single antenna or a set of antennas.

The UE communications manager 2515 may be an example of aspects of the UE communications manager 2415 as described herein. The UE communications manager 2515 may include a signaling component 2520, a carrier component 2525, a timing component 2530, and a mode component 2535. The UE communications manager 2515 may be an example of aspects of the UE communications manager 2710 described herein.

The signaling component 2520 may receive an indication of an uplink transmission timing pattern for use by the device 2505 in transmitting uplink transmissions on a first carrier. The carrier component 2525 may identify that the device 2505 is to use both the first carrier and a second carrier during a single uplink transmission mode, where the device 2505 transitions between sending the uplink transmissions on the first carrier and on the second carrier. The timing component 2530 may determine, based on the uplink transmission timing pattern, a timing of one or more uplink carrier switching periods for retuning between transmissions on the first carrier and on the second carrier. The mode component 2535 may transmit, during the single uplink transmission mode, on both the first carrier and the second carrier in accordance with the uplink transmission timing pattern for the first carrier and the one or more uplink carrier switching periods.

The transmitter 2540 may transmit signals generated by other components of the device 2505. In some examples, the transmitter 2540 may be collocated with a receiver 2510 in a transceiver module. For example, the transmitter 2540 may be an example of aspects of the transceiver 2720 described with reference to FIG. 27. The transmitter 2540 may utilize a single antenna or a set of antennas.

Figure 26:
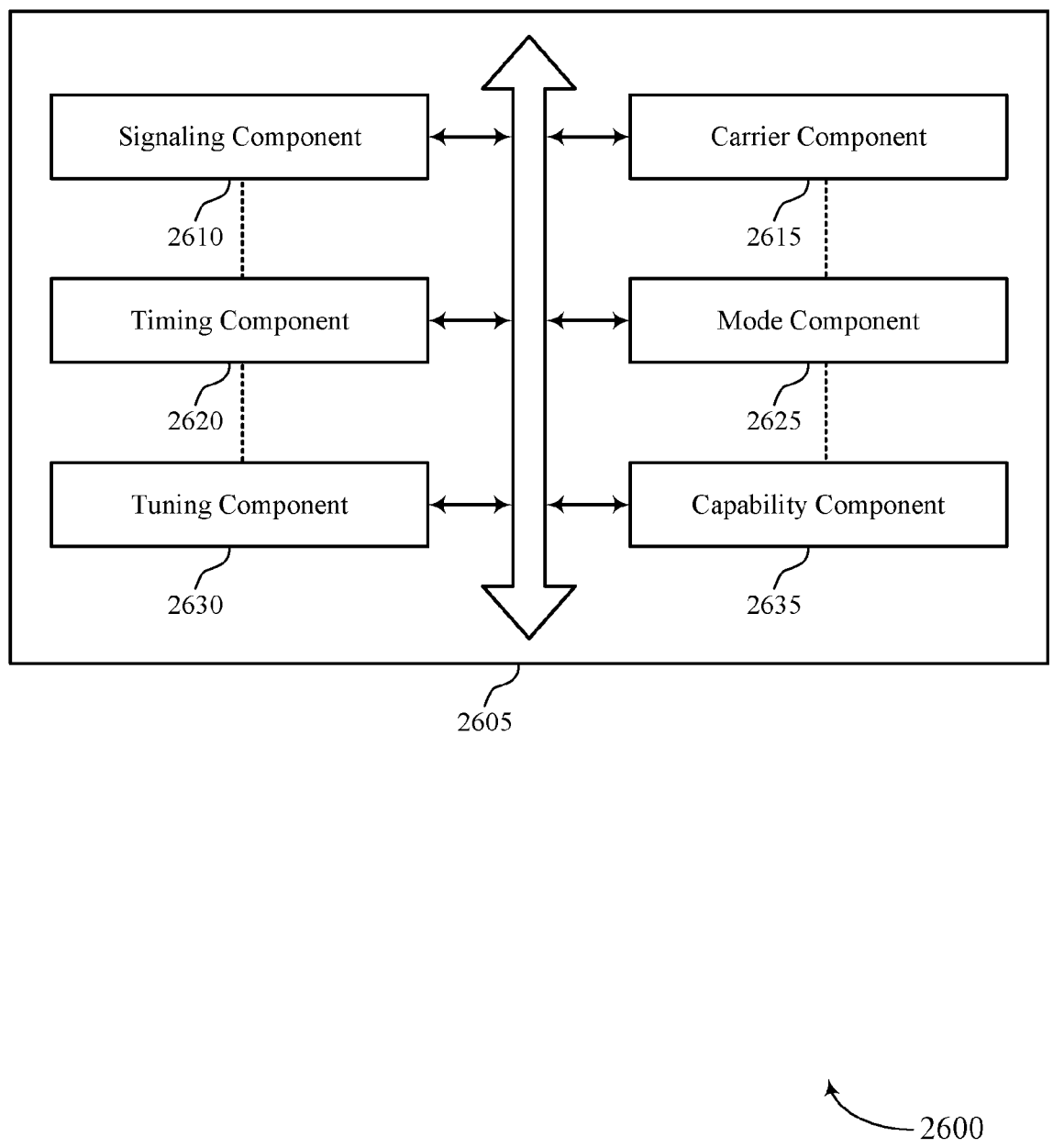
FIG. 26 shows a block diagram of a UE communications manager that supports uplink transmission timing patterns in accordance with aspects of the present disclosure.

FIG. 26 shows a block diagram 2600 of a UE communications manager 2605 that supports uplink transmission timing patterns in accordance with aspects of the present disclosure. The UE communications manager 2605 may be an example of aspects of a UE communications manager 2415, a UE communications manager 2515, or a UE communications manager 2710 described herein. The UE communications manager 2605 may include a signaling component 2610, a carrier component 2615, a timing component 2620, a mode component 2625, a tuning component 2630, and a capability component 2635. Each of these modules may communicate, directly or indirectly, with one another (e.g., via one or more buses).

The signaling component 2610 may receive an indication of an uplink transmission timing pattern for use by the UE in transmitting uplink transmissions on a first carrier. In some examples, receiving a radio resource control message, where the indication of the uplink transmission timing pattern includes one or more blank symbol information elements in the radio resource control message. In some cases, the uplink transmission timing pattern is UE-specific. In some cases, the uplink transmission timing pattern is cell-specific. The carrier component 2615 may identify that the UE is to use both the first carrier and a second carrier during a single uplink transmission mode, where the UE transitions between sending the uplink transmissions on the first carrier and on the second carrier. In some cases, the first carrier includes a TDD carrier. In some cases, the second carrier includes a FDD carrier.

The timing component 2620 may determine, based on the uplink transmission timing pattern, a timing of one or more uplink carrier switching periods for retuning between transmissions on the first carrier and on the second carrier. In some examples, the timing component 2620 may identify one or more blank uplink symbols based on one or more blank symbol information elements received with the uplink transmission timing pattern, where the one or more blank uplink symbols correspond to the timing of the one or more uplink carrier switching periods for the retuning between the first carrier and the second carrier. In some examples, the timing component 2620 may determine, based on the one or more blank symbol information elements, that one or more beginning uplink symbols of the uplink transmission timing pattern are tagged as the one or more blank uplink symbols. In some examples, the timing component 2620 may determine, based on the one or more blank symbol information elements, that one or more ending uplink symbols of the uplink transmission timing pattern are tagged as the one or more blank uplink symbols.

In some examples, the timing component 2620 may determine that the timing of the one or more uplink carrier switching periods for the retuning between the first carrier and the second carrier correspond to one or more uplink symbols of the uplink transmission timing pattern of the first carrier based on the one or more blank uplink symbols in the uplink transmission timing pattern. In some examples, the timing component 2620 may identify an absence of one or more blank uplink symbols in the uplink transmission timing pattern or in one or more information elements, where the one or more blank uplink symbols correspond to the timing of the one or more uplink carrier switching periods for the retuning between the first carrier and the second carrier by the UE.

In some examples, the timing component 2620 may determine that the timing of the one or more uplink carrier switching periods for the retuning between the first carrier and the second carrier corresponds to one or more symbols of the second carrier based on the absence of one or more blank uplink symbols in the uplink transmission timing pattern. In some cases, the one or more blank uplink symbols correspond to one or more uplink symbols of the uplink transmission timing pattern. In some cases, the one or more blank uplink symbols correspond to a time duration of the uplink transmissions on the second carrier. In some cases, a quantity of blank uplink symbols corresponding to the timing of the one or more uplink carrier switching periods for the retuning between the first carrier and the second carrier is based on a location of the UE within a cell. In some cases, the quantity of blank uplink symbols is higher at a cell edge of the cell compared to a cell center of the cell.

The mode component 2625 may transmit, during the single uplink transmission mode, on both the first carrier and the second carrier in accordance with the uplink transmission timing pattern for the first carrier and the one or more uplink carrier switching periods. In some examples, the mode component 2625 may transmit the uplink transmissions on the first carrier and on one or more uplink symbols of the uplink transmission timing pattern. In some examples, the mode component 2625 may transmit the uplink transmissions on the second carrier during a time duration corresponding to downlink symbols or one or more blank uplink symbols of the uplink transmission timing pattern.

The tuning component 2630 may transmit the uplink transmissions on the second carrier. In some examples, the tuning component 2630 may retune from the second carrier to the first carrier based on the timing of the one or more uplink carrier switching periods. In some examples, the tuning component 2630 may transmit the uplink transmissions on the first carrier and on one or more uplink symbols of the uplink transmission timing pattern based on the retuning. In some cases, the retuning from the second carrier to the first carrier occurs before the one or more uplink symbols of the first carrier. In some cases, the retuning from the second carrier to the first carrier occurs after the one or more uplink symbols of the first carrier. The capability component 2635 may determine capability information of the UE. In some examples, the capability component 2635 may transmit the capability information, where the uplink transmission timing pattern is indicated based on the capability information.

Figure 27:
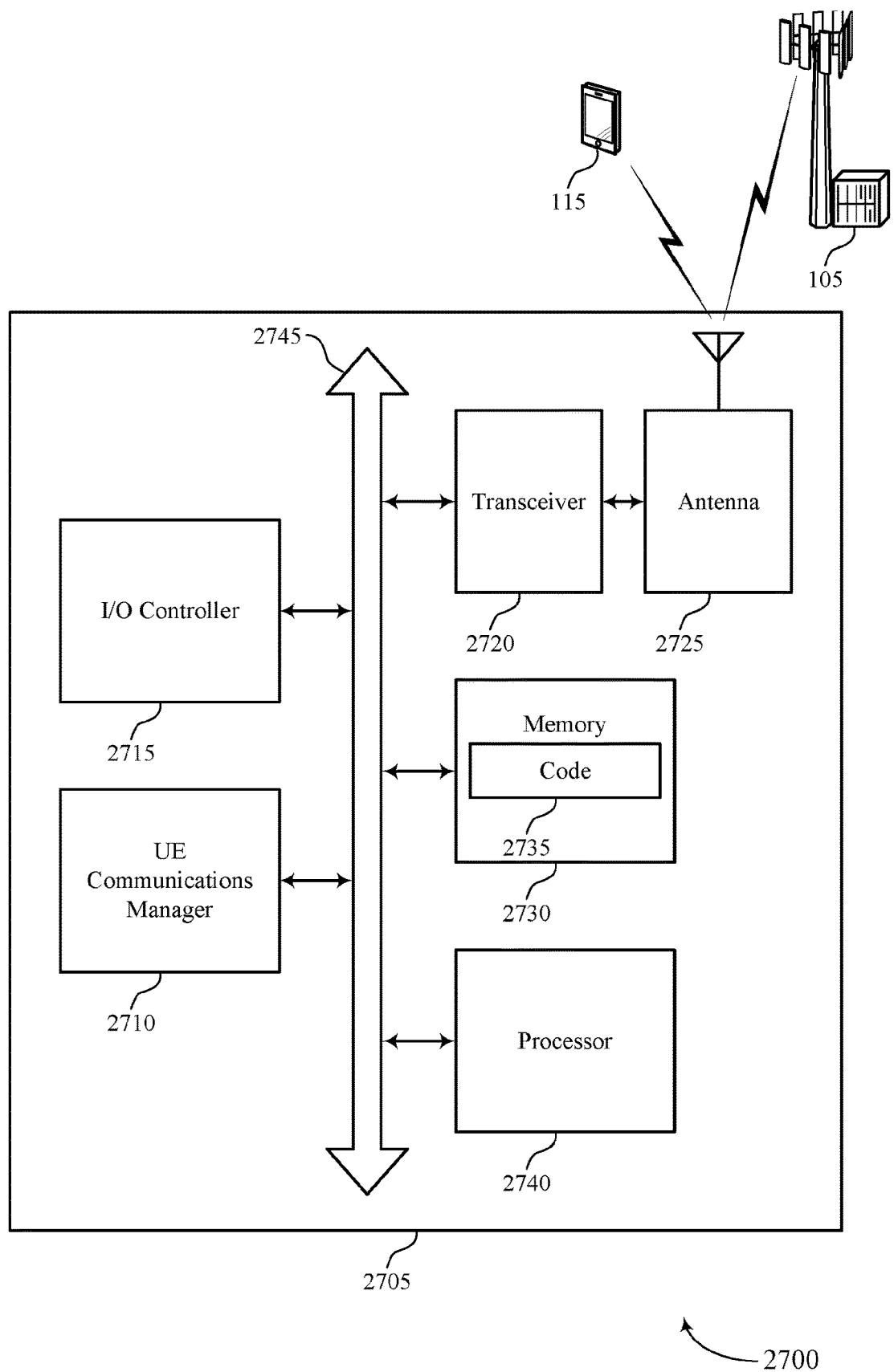
FIG. 27 shows a diagram of a system including a device that supports uplink transmission timing patterns in accordance with aspects of the present disclosure.

FIG. 27 shows a diagram of a system 2700 including a device 2705 that supports uplink transmission timing patterns in accordance with aspects of the present disclosure. The device 2705 may be an example of or include the components of device 2405, device 2505, or a UE 115 as described herein. The device 2705 may include components for bi-directional voice and data communications including components for transmitting and receiving communications, including a UE communications manager 2710, an I/O controller 2715, a transceiver 2720, an antenna 2725, memory 2730, and a processor 2740. These components may be in electronic communication via one or more buses (e.g., bus 2745).

The UE communications manager 2710 may receive an indication of an uplink transmission timing pattern for use by the UE in transmitting uplink transmissions on a first carrier, identify that the UE is to use both the first carrier and a second carrier during a single uplink transmission mode, where the UE transitions between sending the uplink transmissions on the first carrier and on the second carrier, determine, based on the uplink transmission timing pattern, a timing of one or more uplink carrier switching periods for retuning between transmissions on the first carrier and on the second carrier, and transmit, during the single uplink transmission mode, on both the first carrier and the second carrier in accordance with the uplink transmission timing pattern for the first carrier and the one or more uplink carrier switching periods.

The I/O controller 2715 may manage input and output signals for the device 2705. The I/O controller 2715 may also manage peripherals not integrated into the device 2705. In some cases, the I/O controller 2715 may represent a physical connection or port to an external peripheral. In some cases, the I/O controller 2715 may utilize an operating system such as iOS®, ANDROID®, MS-DOS®, MS-WINDOWS®, OS/2®, UNIX®, LINUX®, or another known operating system. In other cases, the I/O controller 2715 may represent or interact with a modem, a keyboard, a mouse, a touchscreen, or a similar device. In some cases, the I/O controller 2715 may be implemented as part of a processor. In some cases, a user may interact with the device 2705 via the I/O controller 2715 or via hardware components controlled by the I/O controller 2715.

The transceiver 2720 may communicate bi-directionally, via one or more antennas, wired, or wireless links as described above. For example, the transceiver 2720 may represent a wireless transceiver and may communicate bi-directionally with another wireless transceiver. The transceiver 2720 may also include a modem to modulate the packets and provide the modulated packets to the antennas for transmission, and to demodulate packets received from the antennas. In some cases, the device 2705 may include a single antenna 2725. However, in some cases the device 2705 may have more than one antenna 2725, which may be capable of concurrently transmitting or receiving multiple wireless transmissions.

The memory 2730 may include RAM and ROM. The memory 2730 may store computer-readable, computer-executable code 2735 including instructions that, when executed, cause the processor to perform various functions described herein. In some cases, the memory 2730 may contain, among other things, a BIOS which may control basic hardware or software operation such as the interaction with peripheral components or devices.

The processor 2740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2740 may be configured to operate a memory array using a memory controller. In other cases, a memory controller may be integrated into the processor 2740. The processor 2740 may be configured to execute computer-readable instructions stored in a memory (e.g., the memory 2730) to cause the device 2705 to perform various functions (e.g., functions or tasks supporting uplink transmission timing pattern).

The code 2735 may include instructions to implement aspects of the present disclosure, including instructions to support wireless communications. The code 2735 may be stored in a non-transitory computer-readable medium such as system memory or other type of memory. In some cases, the code 2735 may not be directly executable by the processor 2740 but may cause a computer (e.g., when compiled and executed) to perform functions described herein.

Figure 28:
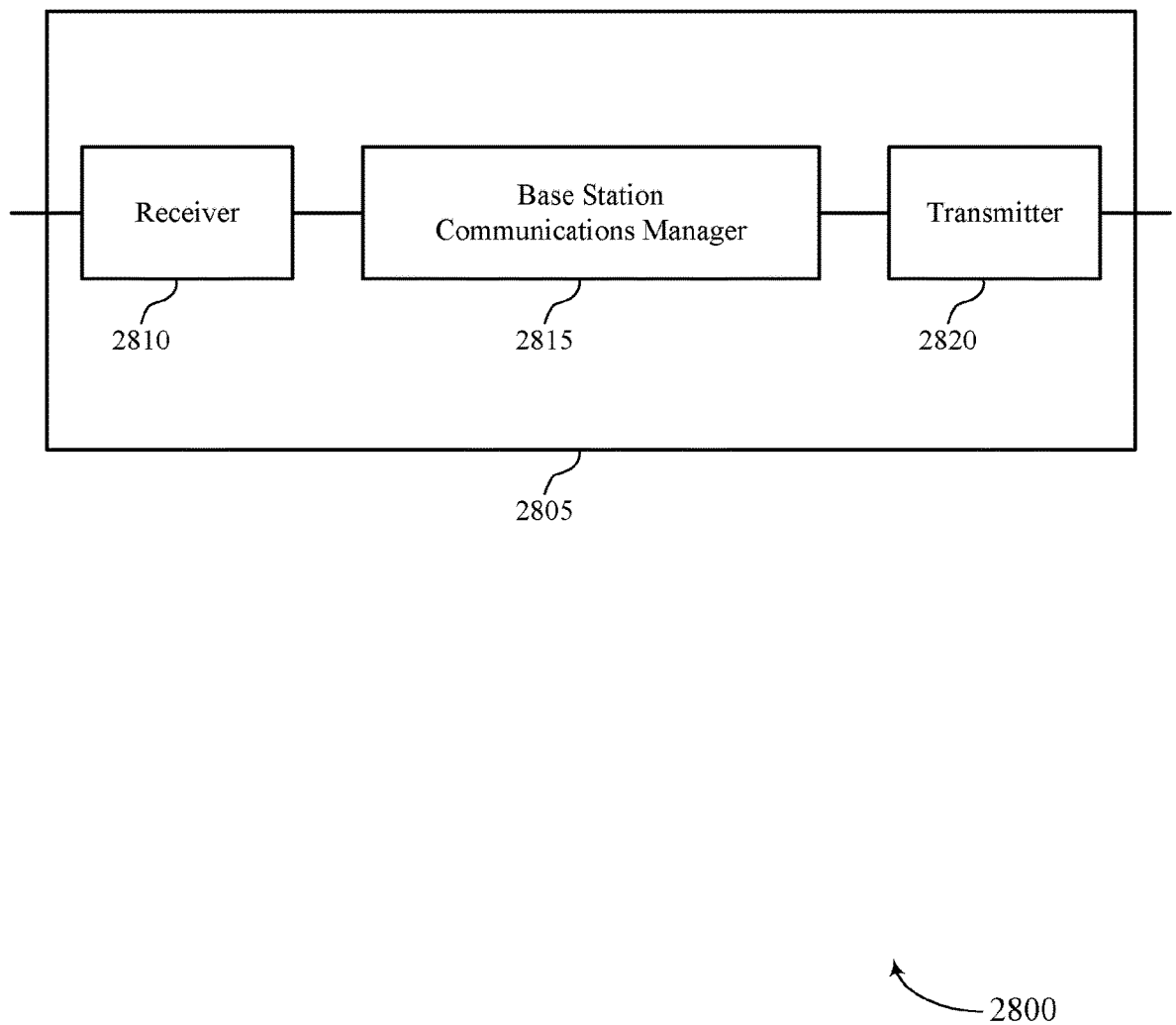
FIGS. 28 and 29 show block diagrams of devices that support uplink transmission timing patterns in accordance with aspects of the present disclosure.

FIG. 28 shows a block diagram 2800 of a device 2805 that supports uplink transmission timing patterns in accordance with aspects of the present disclosure. The device 2805 may be an example of aspects of a base station 105 as described herein. The device 2805 may include a receiver 2810, a base station communications manager 2815, and a transmitter 2820. The device 2805 may also include a processor. Each of these components may be in communication with one another (e.g., via one or more buses).

The receiver 2810 may receive information such as packets, user data, or control information associated with various information channels (e.g., control channels, data channels, and information related to uplink transmission timing pattern, etc.). Information may be passed on to other components of the device 2805. The receiver 2810 may be an example of aspects of the transceiver 3120 described with reference to FIG. 31. The receiver 2810 may utilize a single antenna or a set of antennas.

The base station communications manager 2815 may receive capability information from a UE, determine, based on the capability information, an uplink transmission timing pattern for use by the UE in transmitting uplink transmissions on a first carrier during a single uplink transmission mode, the uplink transmission timing pattern including one or more blank uplink symbols corresponding to a timing of one or more uplink carrier switching periods for retuning between the first carrier and a second carrier by the UE when operating in the single uplink transmission mode, and transmit an indication of the uplink transmission timing pattern to the UE. The base station communications manager 2815 may be an example of aspects of the base station communications manager 3110 described herein.

The base station communications manager 2815, or its sub-components, may be implemented in hardware, code (e.g., software or firmware) executed by a processor, or any combination thereof. If implemented in code executed by a processor, the functions of the base station communications manager 2815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 2815, or its sub-components, may be physically located at various positions, including being distributed such that portions of functions are implemented at different physical locations by one or more physical components. In some examples, the base station communications manager 2815, or its sub-components, may be a separate and distinct component in accordance with various aspects of the present disclosure. In some examples, the base station communications manager 2815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2820 may transmit signals generated by other components of the device 2805. In some examples, the transmitter 2820 may be collocated with a receiver 2810 in a transceiver module. For example, the transmitter 2820 may be an example of aspects of the transceiver 3120 described with reference to FIG. 31. The transmitter 2820 may utilize a single antenna or a set of antennas.

Figure 29:
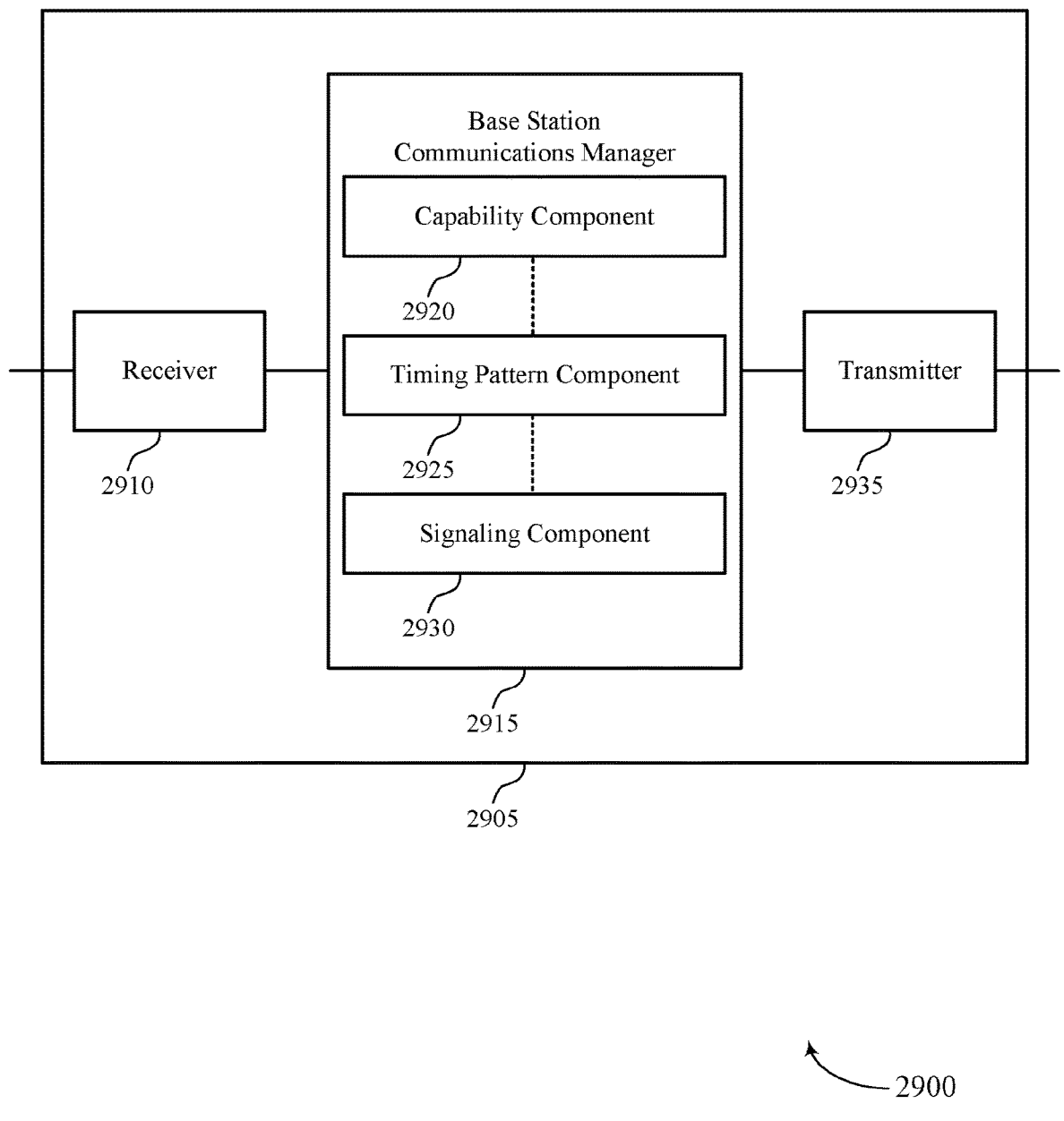

FIG. 29 shows a block diagram 2900 of a device 2905 that supports uplink transmission timing patterns in accordance with aspects of the present disclosure. The device 2905 may be an example of aspects of a device 2805, or a base station 105 as described herein. The device 2905 may include a receiver 2910, a base station communications manager 2915, and a transmitter 2935. The device 2905 may also include a processor. Each of these components may be in communication with one another (e.g., via one or more buses).

The receiver 2910 may receive information such as packets, user data, or control information associated with various information channels (e.g., control channels, data channels, and information related to uplink transmission timing pattern, etc.). Information may be passed on to other components of the device 2905. The receiver 2910 may be an example of aspects of the transceiver 3120 described with reference to FIG. 31. The receiver 2910 may utilize a single antenna or a set of antennas.

The base station communications manager 2915 may be an example of aspects of the base station communications manager 2815 as described herein. The base station communications manager 2915 may include a capability component 2920, a timing pattern component 2925, and a signaling component 2930. The base station communications manager 2915 may be an example of aspects of the base station communications manager 3110 described herein.

The capability component 2920 may receive capability information from a UE. The timing pattern component 2925 may determine, based on the capability information, an uplink transmission timing pattern for use by the UE in transmitting uplink transmissions on a first carrier during a single uplink transmission mode, the uplink transmission timing pattern including one or more blank uplink symbols corresponding to a timing of one or more uplink carrier switching periods for retuning between the first carrier and a second carrier by the UE when operating in the single uplink transmission mode. The signaling component 2930 may transmit an indication of the uplink transmission timing pattern to the UE.

The transmitter 2935 may transmit signals generated by other components of the device 2905. In some examples, the transmitter 2935 may be collocated with a receiver 2910 in a transceiver module. For example, the transmitter 2935 may be an example of aspects of the transceiver 3120 described with reference to FIG. 31. The transmitter 2935 may utilize a single antenna or a set of antennas.

Figure 30:
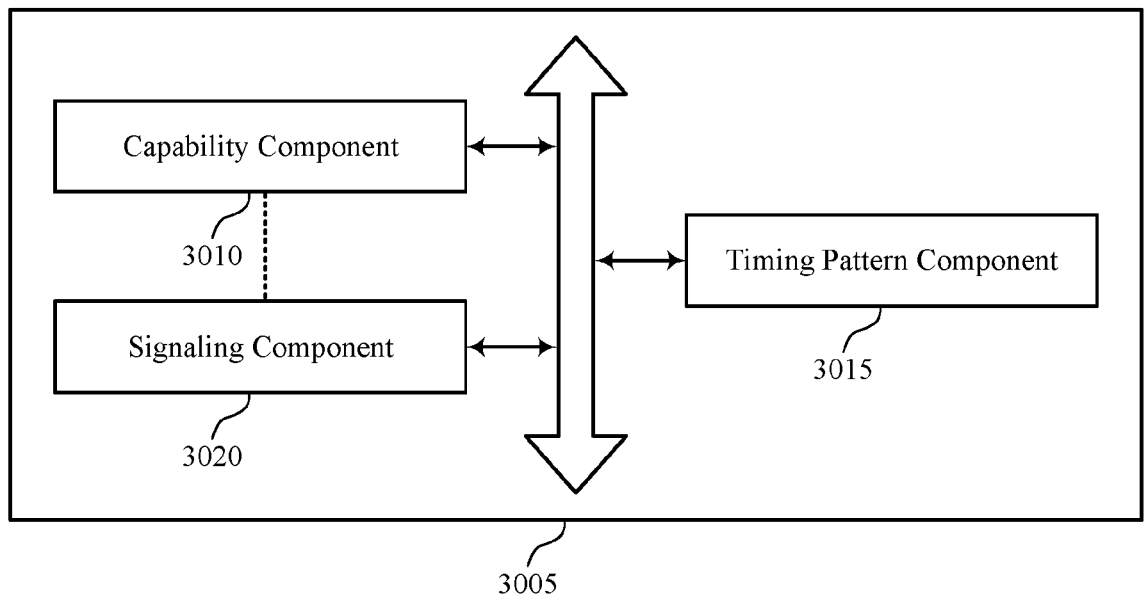
FIG. 30 shows a block diagram of a base station communications manager that supports uplink transmission timing patterns in accordance with aspects of the present disclosure.

FIG. 30 shows a block diagram 3000 of a base station communications manager 3005 that supports uplink transmission timing patterns in accordance with aspects of the present disclosure. The base station communications manager 3005 may be an example of aspects of a base station communications manager 2815, a base station communications manager 2915, or a base station communications manager 3110 described herein. The base station communications manager 3005 may include a capability component 3010, a timing pattern component 3015, and a signaling component 3020. Each of these modules may communicate, directly or indirectly, with one another (e.g., via one or more buses).

The capability component 3010 may receive capability information from a UE. The timing pattern component 3015 may determine, based on the capability information, an uplink transmission timing pattern for use by the UE in transmitting uplink transmissions on a first carrier during a single uplink transmission mode, the uplink transmission timing pattern including one or more blank uplink symbols corresponding to a timing of one or more uplink carrier switching periods for retuning between the first carrier and a second carrier by the UE when operating in the single uplink transmission mode. In some cases, the uplink transmission timing pattern is UE-specific. In some cases, the uplink transmission timing pattern is cell-specific. In some cases, the first carrier includes a TDD carrier. In some cases, the second carrier includes a FDD carrier. In some cases, a quantity of blank uplink symbols corresponding to the timing of the one or more uplink carrier switching periods for the retuning between the first carrier and the second carrier is based on a location of the UE within a cell. In some cases, the quantity of blank uplink symbols is higher at a cell edge of the cell compared to a cell center of the cell.

The signaling component 3020 may transmit an indication of the uplink transmission timing pattern to the UE. In some examples, transmitting a radio resource control message, where the indication of the uplink transmission timing pattern includes an information element in the radio resource control message. In some examples, the signaling component 3020 may configure one or more information elements to indicate presence or absence of the one or more blank uplink symbols. In some examples, the signaling component 3020 may configure one or more information elements to indicate that one or more beginning uplink symbols of the uplink transmission timing pattern are tagged as the one or more blank uplink symbols. In some examples, the signaling component 3020 may configure one or more information elements to indicate that one or more ending uplink symbols of the uplink transmission timing pattern are tagged as the one or more blank uplink symbols. In some cases, the one or more blank uplink symbols correspond to one or more uplink symbols of the uplink transmission timing pattern.

Figure 31:
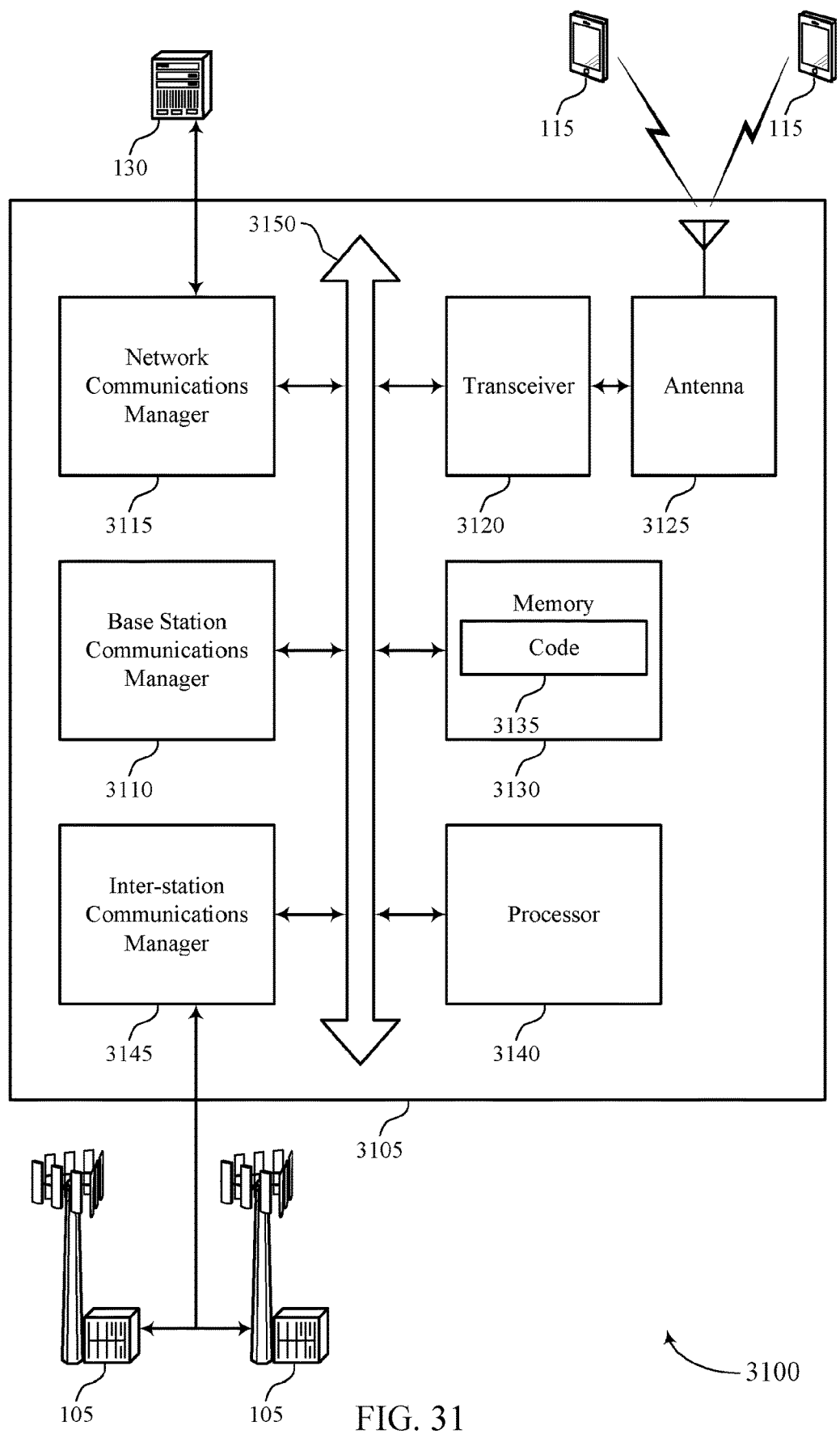
FIG. 31 shows a diagram of a system including a device that supports uplink transmission timing patterns in accordance with aspects of the present disclosure.

FIG. 31 shows a diagram of a system 3100 including a device 3105 that supports uplink transmission timing patterns in accordance with aspects of the present disclosure. The device 3105 may be an example of or include the components of device 2805, device 2905, or a base station 105 as described herein. The device 3105 may include components for bi-directional voice and data communications including components for transmitting and receiving communications, including a base station communications manager 3110, a network communications manager 3115, a transceiver 3120, an antenna 3125, memory 3130, a processor 3140, and an inter-station communications manager 3145. These components may be in electronic communication via one or more buses (e.g., bus 3150).

The base station communications manager 3110 may receive capability information from a UE, determine, based on the capability information, an uplink transmission timing pattern for use by the UE in transmitting uplink transmissions on a first carrier during a single uplink transmission mode, the uplink transmission timing pattern including one or more blank uplink symbols corresponding to a timing of one or more uplink carrier switching periods for retuning between the first carrier and a second carrier by the UE when operating in the single uplink transmission mode, and transmit an indication of the uplink transmission timing pattern to the UE.

The network communications manager 3115 may manage communications with the core network (e.g., via one or more wired backhaul links). For example, the network communications manager 3115 may manage the transfer of data communications for client devices, such as one or more UEs 115.

The transceiver 3120 may communicate bi-directionally, via one or more antennas, wired, or wireless links as described above. For example, the transceiver 3120 may represent a wireless transceiver and may communicate bi-directionally with another wireless transceiver. The transceiver 3120 may also include a modem to modulate the packets and provide the modulated packets to the antennas for transmission, and to demodulate packets received from the antennas. In some cases, the device 3105 may include a single antenna 3125. However, in some cases the device 3105 may have more than one antenna 3125, which may be capable of concurrently transmitting or receiving multiple wireless transmissions.

The memory 3130 may include RAM, ROM, or a combination thereof. The memory 3130 may store computer-readable code 3135 including instructions that, when executed by a processor (e.g., the processor 3140) cause the device to perform various functions described herein. In some cases, the memory 3130 may contain, among other things, a BIOS which may control basic hardware or software operation such as the interaction with peripheral components or devices.

The processor 3140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 3140 may be configured to operate a memory array using a memory controller. In some cases, a memory controller may be integrated into processor 3140. The processor 3140 may be configured to execute computer-readable instructions stored in a memory (e.g., the memory 3130) to cause the device 3105 to perform various functions (e.g., functions or tasks supporting uplink transmission timing pattern).

The inter-station communications manager 3145 may manage communications with other base station 105, and may include a controller or scheduler for controlling communications with UEs 115 in cooperation with other base stations 105. For example, the inter-station communications manager 3145 may coordinate scheduling for transmissions to UEs 115 for various interference mitigation techniques such as beamforming or joint transmission. In some examples, the inter-station communications manager 3145 may provide an X2 interface within an LTE/LTE-A wireless communication network technology to provide communication between base stations 105.

The code 3135 may include instructions to implement aspects of the present disclosure, including instructions to support wireless communications. The code 3135 may be stored in a non-transitory computer-readable medium such as system memory or other type of memory. In some cases, the code 3135 may not be directly executable by the processor 3140 but may cause a computer (e.g., when compiled and executed) to perform functions described herein.

Figure 32:
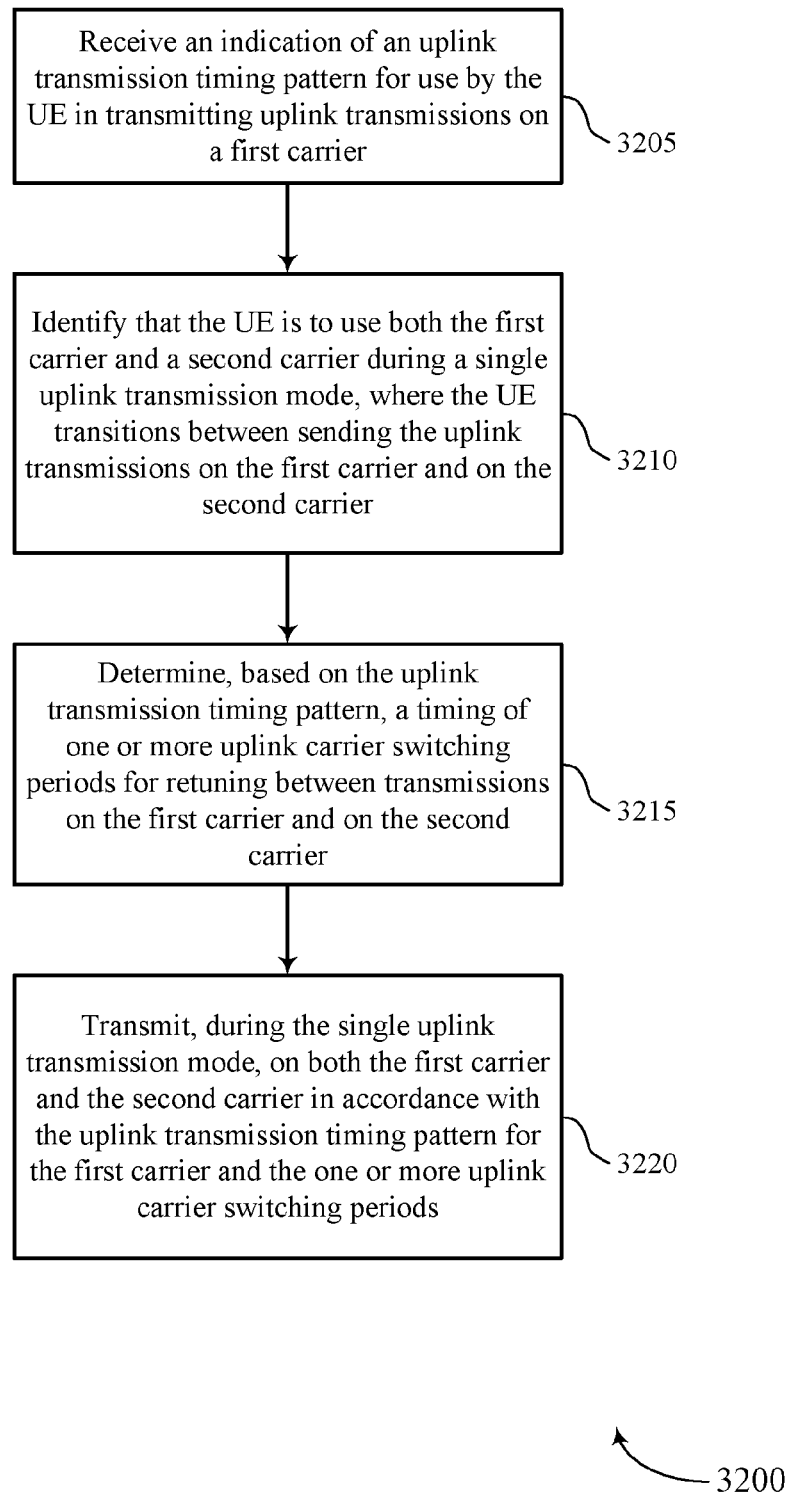
FIGS. 32 through 35 show flowcharts illustrating methods that support uplink transmission timing patterns in accordance with aspects of the present disclosure.

FIG. 32 shows a flowchart illustrating a method 3200 that supports uplink transmission timing patterns in accordance with aspects of the present disclosure. The operations of method 3200 may be implemented by a UE 115 or its components as described herein. For example, the operations of method 3200 may be performed by a communications manager as described with reference to FIGS. 24 through 27. In some examples, a UE may execute a set of instructions to control the functional elements of the UE to perform the functions described below. Additionally or alternatively, a UE may perform aspects of the functions described below using special-purpose hardware.

At 3205, the UE may receive an indication of an uplink transmission timing pattern for use by the UE in transmitting uplink transmissions on a first carrier. The operations of 3205 may be performed according to the methods described herein. In some examples, aspects of the operations of 3205 may be performed by a signaling component as described with reference to FIGS. 24 through 27.

At 3210, the UE may identify that the UE is to use both the first carrier and a second carrier during a single uplink transmission mode, where the UE transitions between sending the uplink transmissions on the first carrier and on the second carrier. The operations of 3210 may be performed according to the methods described herein. In some examples, aspects of the operations of 3210 may be performed by a carrier component as described with reference to FIGS. 24 through 27.

At 3215, the UE may determine, based on the uplink transmission timing pattern, a timing of one or more uplink carrier switching periods for retuning between transmissions on the first carrier and on the second carrier. The operations of 3215 may be performed according to the methods described herein. In some examples, aspects of the operations of 3215 may be performed by a timing component as described with reference to FIGS. 24 through 27.

At 3220, the UE may transmit, during the single uplink transmission mode, on both the first carrier and the second carrier in accordance with the uplink transmission timing pattern for the first carrier and the one or more uplink carrier switching periods. The operations of 3220 may be performed according to the methods described herein. In some examples, aspects of the operations of 3220 may be performed by a mode component as described with reference to FIGS. 24 through 27.

Figure 33:
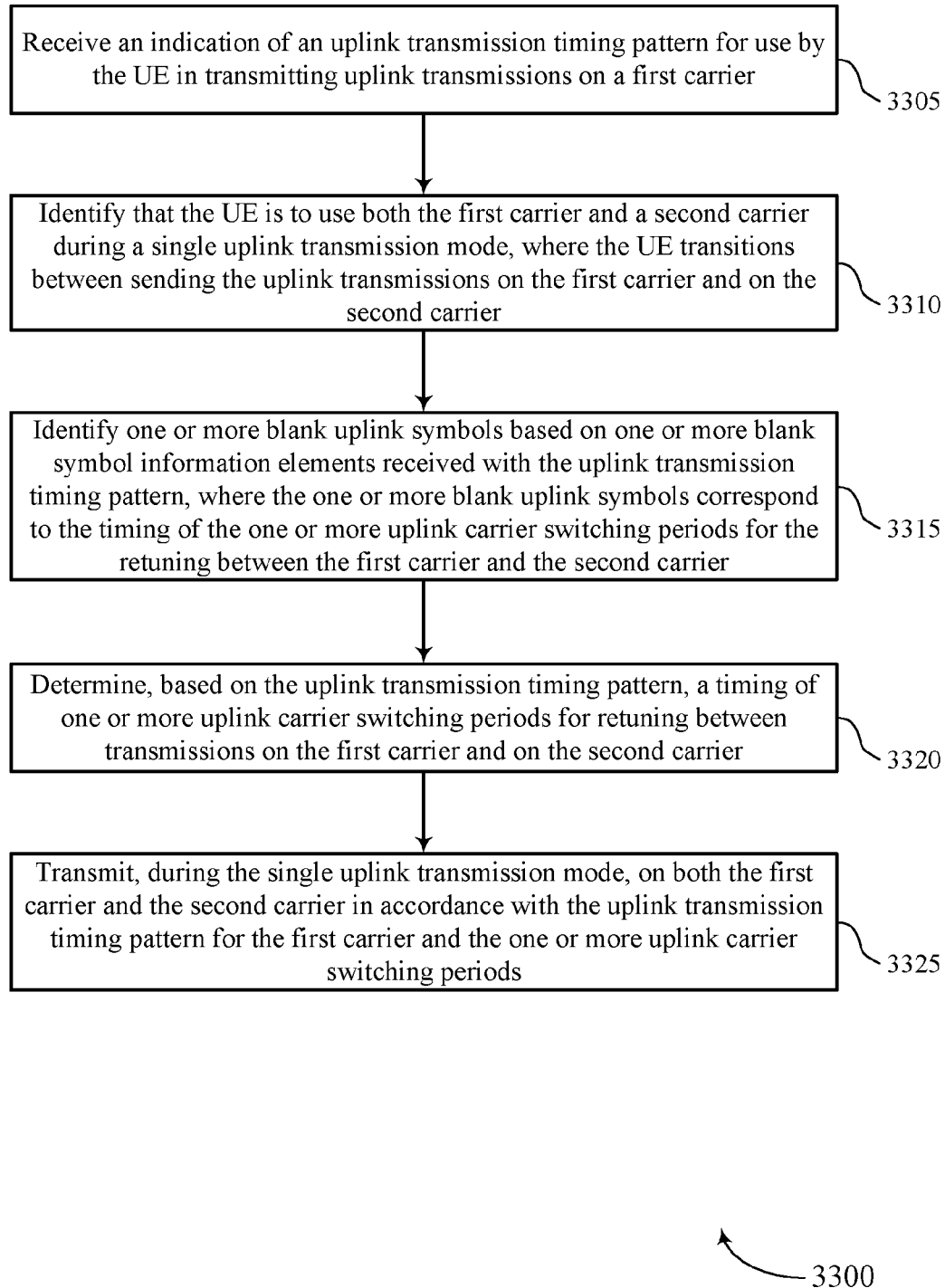

FIG. 33 shows a flowchart illustrating a method 3300 that supports uplink transmission timing patterns in accordance with aspects of the present disclosure. The operations of method 3300 may be implemented by a UE 115 or its components as described herein. For example, the operations of method 3300 may be performed by a communications manager as described with reference to FIGS. 24 through 27. In some examples, a UE may execute a set of instructions to control the functional elements of the UE to perform the functions described below. Additionally or alternatively, a UE may perform aspects of the functions described below using special-purpose hardware.

At 3305, the UE may receive an indication of an uplink transmission timing pattern for use by the UE in transmitting uplink transmissions on a first carrier. The operations of 3305 may be performed according to the methods described herein. In some examples, aspects of the operations of 3305 may be performed by a signaling component as described with reference to FIGS. 24 through 27.

At 3310, the UE may identify that the UE is to use both the first carrier and a second carrier during a single uplink transmission mode, where the UE transitions between sending the uplink transmissions on the first carrier and on the second carrier. The operations of 3310 may be performed according to the methods described herein. In some examples, aspects of the operations of 3310 may be performed by a carrier component as described with reference to FIGS. 24 through 27.

At 3315, the UE may identify one or more blank uplink symbols based on one or more blank symbol information elements received with the uplink transmission timing pattern, where the one or more blank uplink symbols correspond to the timing of the one or more uplink carrier switching periods for the retuning between the first carrier and the second carrier. The operations of 3315 may be performed according to the methods described herein. In some examples, aspects of the operations of 3315 may be performed by a timing component as described with reference to FIGS. 24 through 27.

At 3320, the UE may determine, based on the uplink transmission timing pattern, a timing of one or more uplink carrier switching periods for retuning between transmissions on the first carrier and on the second carrier. The operations of 3320 may be performed according to the methods described herein. In some examples, aspects of the operations of 3320 may be performed by a timing component as described with reference to FIGS. 24 through 27.

At 3325, the UE may transmit, during the single uplink transmission mode, on both the first carrier and the second carrier in accordance with the uplink transmission timing pattern for the first carrier and the one or more uplink carrier switching periods. The operations of 3325 may be performed according to the methods described herein. In some examples, aspects of the operations of 3325 may be performed by a mode component as described with reference to FIGS. 24 through 27.

Figure 34:
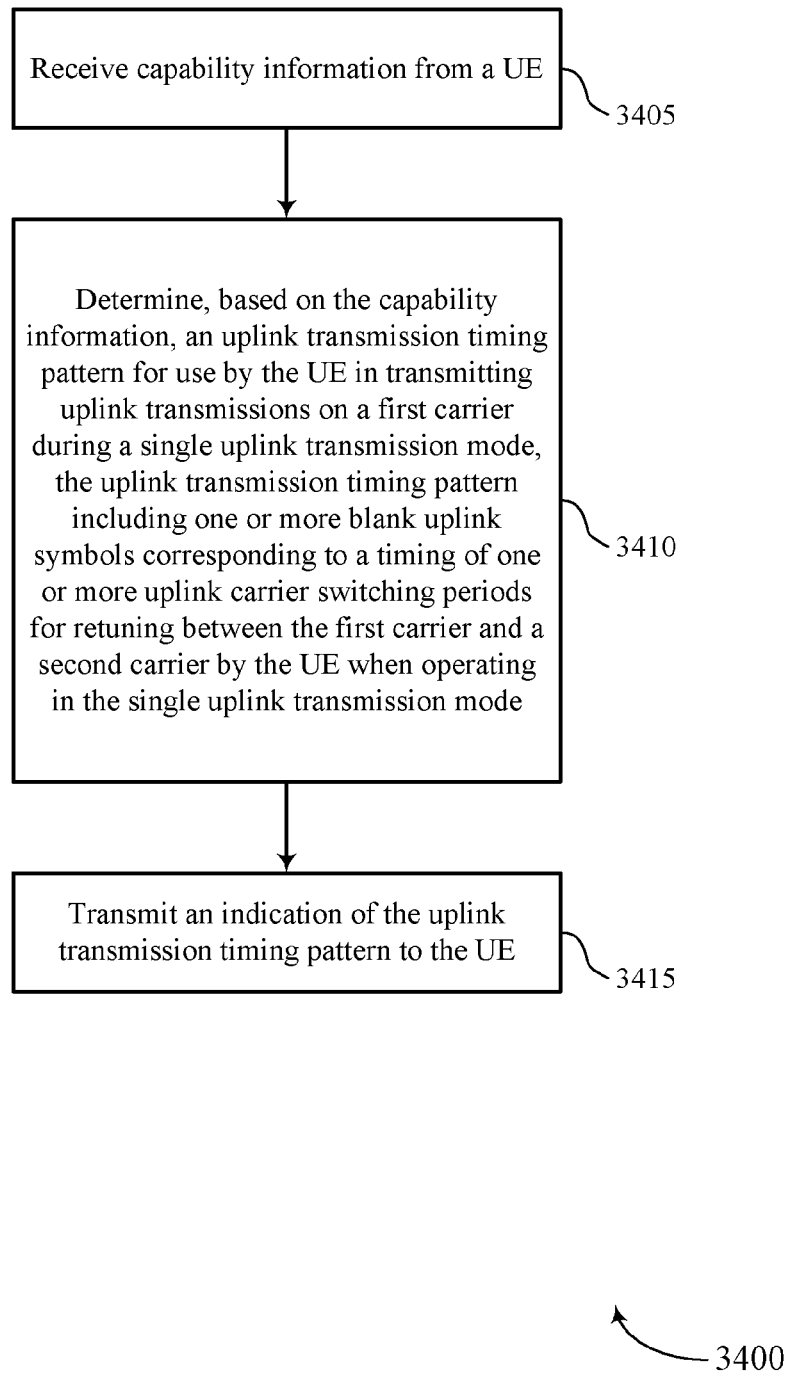

FIG. 34 shows a flowchart illustrating a method 3400 that supports uplink transmission timing patterns in accordance with aspects of the present disclosure. The operations of method 3400 may be implemented by a base station 105 or its components as described herein. For example, the operations of method 3400 may be performed by a communications manager as described with reference to FIGS. 28 through 31. In some examples, a base station may execute a set of instructions to control the functional elements of the base station to perform the functions described below. Additionally or alternatively, a base station may perform aspects of the functions described below using special-purpose hardware.

At 3405, the base station may receive capability information from a UE. The operations of 3405 may be performed according to the methods described herein. In some examples, aspects of the operations of 3405 may be performed by a capability component as described with reference to FIGS. 28 through 31.

At 3410, the base station may determine, based on the capability information, an uplink transmission timing pattern for use by the UE in transmitting uplink transmissions on a first carrier during a single uplink transmission mode, the uplink transmission timing pattern including one or more blank uplink symbols corresponding to a timing of one or more uplink carrier switching periods for retuning between the first carrier and a second carrier by the UE when operating in the single uplink transmission mode. The operations of 3410 may be performed according to the methods described herein. In some examples, aspects of the operations of 3410 may be performed by a timing pattern component as described with reference to FIGS. 28 through 31.

At 3415, the base station may transmit an indication of the uplink transmission timing pattern to the UE. The operations of 3415 may be performed according to the methods described herein. In some examples, aspects of the operations of 3415 may be performed by a signaling component as described with reference to FIGS. 28 through 31.

Figure 35:
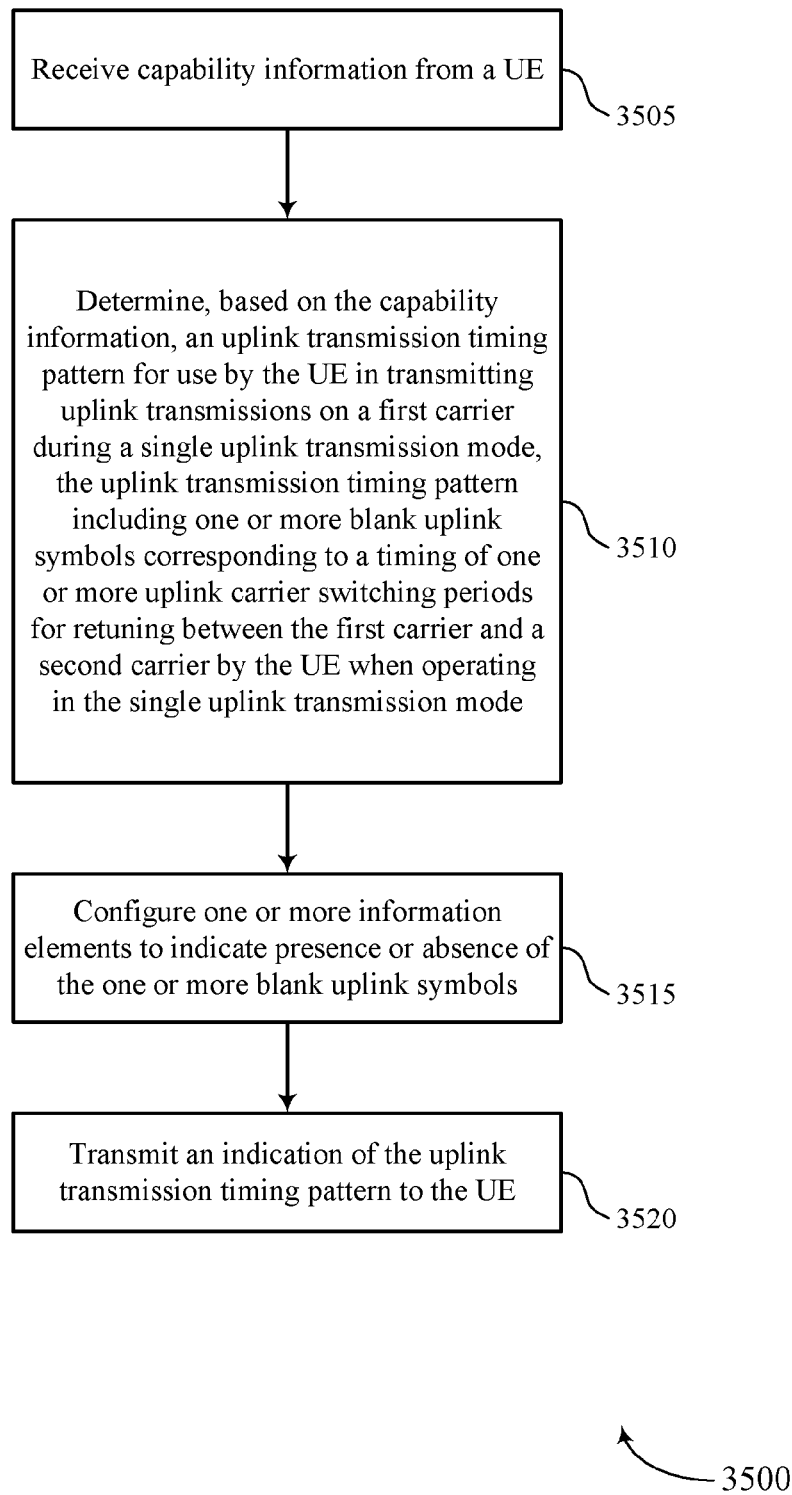

FIG. 35 shows a flowchart illustrating a method 3500 that supports uplink transmission timing patterns in accordance with aspects of the present disclosure. The operations of method 3500 may be implemented by a base station 105 or its components as described herein. For example, the operations of method 3500 may be performed by a communications manager as described with reference to FIGS. 28 through 31. In some examples, a base station may execute a set of instructions to control the functional elements of the base station to perform the functions described below. Additionally or alternatively, a base station may perform aspects of the functions described below using special-purpose hardware.

At 3505, the base station may receive capability information from a UE. The operations of 3505 may be performed according to the methods described herein. In some examples, aspects of the operations of 3505 may be performed by a capability component as described with reference to FIGS. 28 through 31.

At 3510, the base station may determine, based on the capability information, an uplink transmission timing pattern for use by the UE in transmitting uplink transmissions on a first carrier during a single uplink transmission mode, the uplink transmission timing pattern including one or more blank uplink symbols corresponding to a timing of one or more uplink carrier switching periods for retuning between the first carrier and a second carrier by the UE when operating in the single uplink transmission mode. The operations of 3510 may be performed according to the methods described herein. In some examples, aspects of the operations of 3510 may be performed by a timing pattern component as described with reference to FIGS. 28 through 31.

At 3515, the base station may configure one or more information elements to indicate presence or absence of the one or more blank uplink symbols. The operations of 3515 may be performed according to the methods described herein. In some examples, aspects of the operations of 3515 may be performed by a signaling component as described with reference to FIGS. 28 through 31.

At 3520, the base station may transmit an indication of the uplink transmission timing pattern to the UE. The operations of 3520 may be performed according to the methods described herein. In some examples, aspects of the operations of 3520 may be performed by a signaling component as described with reference to FIGS. 28 through 31.

Described below are a number of embodiments of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible embodiments, and other examples will be readily apparent to those skilled in the art without departing from the scope of the disclosure.

Example 1: A method for wireless communication at a user equipment (UE), comprising: receiving an indication of an uplink transmission timing pattern configuration for use by the UE in transmitting uplink transmissions; identifying that the UE is to use both a first carrier and a second carrier during a single uplink transmission mode, wherein the UE transitions between sending the uplink transmissions on the first carrier and on the second carrier; determining, based at least in part on the uplink transmission timing pattern configuration, a timing of one or more uplink carrier switching periods for retuning between transmissions on the first carrier and on the second carrier; and transmitting, during the single uplink transmission mode, on both the first carrier and the second carrier in accordance with the uplink transmission timing pattern configuration and the one or more uplink carrier switching periods.

Example 2: The method of example 1, wherein receiving the indication of the uplink transmission timing pattern configuration comprises: receiving a radio resource control message, wherein the indication of the uplink transmission timing pattern configuration comprises one or more blank symbol information elements in the radio resource control message, the radio resource control message also including an indication of a specific carrier on which one or more uplink carrier switching periods are used for the retuning between the first carrier and the second carrier.

Example 3: The method of example 2, wherein the one or more blank uplink symbols correspond to one or more uplink symbols of the uplink transmission timing pattern.

Example 4: The method of example 2, further comprising: identifying one or more blank uplink symbols based at least in part on one or more blank symbol information elements received with the uplink transmission timing pattern, wherein the one or more blank uplink symbols correspond to the timing of the one or more uplink carrier switching periods on the specific carrier for the retuning between the first carrier and the second carrier.

Example 5: The method of example 2, further comprising: determining, based at least in part on the one or more blank symbol information elements, that one or more beginning uplink symbols of the uplink transmission timing pattern configuration are tagged as the one or more blank uplink symbols; and determining, based at least in part on the one or more blank symbol information elements, that one or more ending uplink symbols of the uplink transmission timing pattern configuration are tagged as the one or more blank uplink symbols.

Example 6: The method of example 2, further comprising: determining that the timing and specific carrier of the one or more uplink carrier switching periods for the retuning between the first carrier and the second carrier correspond to one or more uplink symbols of the uplink transmission timing pattern configuration of the first carrier based at least in part on the one or more blank uplink symbols in the uplink transmission timing pattern configuration and the specific carrier.

Example 7: The method of any of examples 1 through 8, wherein transmitting during the single uplink transmission mode on both the first carrier and the second carrier comprises: transmitting the uplink transmissions on the second carrier; retuning from the second carrier to the first carrier based at least in part on the timing and specific carrier of the one or more uplink carrier switching periods; and transmitting the uplink transmissions on the first carrier and on one or more uplink symbols of the uplink transmission timing pattern configuration based at least in part on the retuning.

Example 8: The method of example 7, wherein the retuning from the second carrier to the first carrier occurs before the one or more uplink symbols of the first carrier.

Example 9: The method of example 7, wherein the retuning from the second carrier to the first carrier occurs after the one or more uplink symbols of the first carrier.

Example 10: The method of any of examples 1 through 9, wherein transmitting during the single uplink transmission mode on both the first carrier and the second carrier comprises: transmitting the uplink transmissions on the first carrier; retuning from the first carrier to the second carrier based at least in part on the timing and specific carrier of the one or more uplink carrier switching periods; and transmitting the uplink transmissions on the second carrier and on one or more uplink symbols of the uplink transmission timing pattern configuration based at least in part on the retuning.

Example 11: The method of any of examples 1 through 10, wherein transmitting during the single uplink transmission mode on both the first carrier and the second carrier comprises: transmitting the uplink transmissions on the first carrier and on one or more uplink symbols of the uplink transmission timing pattern.

Example 12: The method of any of examples 1 through 11, wherein transmitting during the single uplink transmission mode on both the first carrier and the second carrier comprises: transmitting the uplink transmissions on the second carrier during a time duration corresponding to downlink symbols or one or more blank uplink symbols of the uplink transmission timing pattern configuration.

Example 13: The method of any of examples 1 through 12, further comprising: identifying an absence of one or more blank uplink symbols in the uplink transmission timing pattern configuration or in one or more information elements, wherein the one or more blank uplink symbols correspond to the timing of the one or more uplink carrier switching periods for the retuning between the first carrier and the second carrier by the UE.

Example 14: The method of example 13, further comprising: determining that the timing of the one or more uplink carrier switching periods for the retuning between the first carrier and the second carrier corresponds to one or more symbols of the second carrier based at least in part on the absence of one or more blank uplink symbols in the uplink transmission timing pattern.

Example 15: The method of any of examples 1 through 14, further comprising: determining capability information of the UE; and transmitting the capability information, wherein the uplink transmission timing pattern configuration is indicated based at least in part on the capability information.

Example 16: The method of any of examples 1 through 15, wherein the uplink transmission timing pattern configuration is UE-specific.

Example 17: The method of any of examples 1 through 16, wherein the uplink transmission timing pattern configuration is cell-specific.

Example 18: The method of any of examples 1 through 17, wherein the first carrier comprises a time-division duplexing carrier.

Example 19: The method of any of examples 1 through 18, wherein the second carrier comprises a frequency-division duplexing carrier.

Example 20: The method of any of examples 1 through 19, wherein a quantity of blank uplink symbols corresponding to the timing of the one or more uplink carrier switching periods for the retuning between the first carrier and the second carrier is based at least in part on a location of the UE within a cell.

Example 21: The method of example 20, wherein the quantity of blank uplink symbols is higher at a cell edge of the cell compared to a cell center of the cell.

Example 22: An apparatus comprising at least one means for performing a method of any of examples 1 to 21.

Example 23: An apparatus for wireless communications comprising: a processor; memory coupled with the processor; and instructions stored in the memory and executable by the processor to cause the apparatus to perform a method of any of examples 1 to 21.

Example 24: A non-transitory computer-readable medium storing code for wireless communications, the code comprising instructions executable by a processor to perform a method of any of examples 1 to 21.

Example 25: A method for wireless communication at a base station, comprising: receiving capability information from a user equipment (UE); determining, based at least in part on the capability information, an uplink transmission timing pattern configuration for use by the UE in transmitting uplink transmissions on a first carrier during a single uplink transmission mode, the uplink transmission timing pattern configuration comprising one or more blank uplink symbols corresponding to a timing of one or more uplink carrier switching periods for retuning between the first carrier and a second carrier by the UE when operating in the single uplink transmission mode; and transmitting an indication of the uplink transmission timing pattern configuration to the UE.

Example 26: The method of claim 25, wherein transmitting the indication of the uplink transmission timing pattern configuration comprises: transmitting a radio resource control message, wherein the indication of the uplink transmission timing pattern configuration comprises an information element in the radio resource control message.

Example 27: The method of examples 25 or 26, further comprising: configuring one or more information elements to indicate presence or absence of the one or more blank uplink symbols.

Example 28: The method of any of examples 25 through 27, wherein the one or more blank uplink symbols correspond to one or more uplink symbols of the uplink transmission timing pattern configuration.

Example 29: The method of any of examples 25 through 28, further comprising: configuring one or more information elements to indicate that one or more beginning uplink symbols of the uplink transmission timing pattern configuration are tagged as the one or more blank uplink symbols.

Example 30: The method of any of examples 25 through 29, further comprising: configuring one or more information elements to indicate that one or more ending uplink symbols of the uplink transmission timing pattern configuration are tagged as the one or more blank uplink symbols.

Example 31: The method of any of examples 25 through 30, wherein the uplink transmission timing pattern configuration is UE-specific.

Example 32: The method of any of examples 25 through 31, wherein the uplink transmission timing pattern configuration is cell-specific.

Example 33: The method of any of examples 25 through 32, wherein the first carrier comprises a time-division duplexing carrier.

Example 34: The method any of examples 25 through 33, wherein the second carrier comprises a frequency-division duplexing carrier.

Example 35: The method of any of examples 25 through 34, wherein a quantity of blank uplink symbols corresponding to the timing of the one or more uplink carrier switching periods for the retuning between the first carrier and the second carrier is based at least in part on a location of the UE within a cell.

Example 36: The method of example 35, wherein the quantity of blank uplink symbols is higher at a cell edge of the cell compared to a cell center of the cell.

Example 37: An apparatus comprising at least one means for performing a method of any of examples 25 to 36.

Example 38: An apparatus for wireless communications comprising: a processor; memory coupled with the processor; and instructions stored in the memory and executable by the processor to cause the apparatus to perform a method of any of examples 25 to 36.

Example 39: A non-transitory computer-readable medium storing code for wireless communications, the code comprising instructions executable by a processor to perform a method of any of examples 25 to 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving an indication of an uplink transmission timing pattern configuration for use by the UE in transmitting uplink transmissions, wherein receiving the indication comprises receiving a radio resource control message, wherein the indication of the uplink transmission timing pattern configuration comprises one or more blank symbol information elements in the radio resource control message, the radio resource control message also including an indication of a specific carrier on which one or more uplink carrier switching periods are used for the retuning between the first carrier and the second carrier;

identifying that the UE is to use both a first carrier and a second carrier during a single uplink transmission mode, wherein the UE transitions between sending the uplink transmissions on the first carrier and on the second carrier;

identifying one or more blank uplink symbols based at least in part on one or more blank symbol information elements received with the uplink transmission timing pattern configuration, wherein the one or more blank uplink symbols correspond to the timing of the one or more uplink carrier switching periods on the specific carrier for the retuning between the first carrier and the second carrier;

determining, based at least in part on the uplink transmission timing pattern configuration, a timing of one or more uplink carrier switching periods for retuning between transmissions on the first carrier and on the second carrier; and transmitting, during the single uplink transmission mode, on both the first carrier and the second carrier in accordance with the uplink transmission timing pattern configuration and the one or more uplink carrier switching periods.

2. The method of claim 1, wherein the one or more blank uplink symbols correspond to one or more uplink symbols of the uplink transmission timing pattern configuration.

3. The method of claim 1, further comprising:
determining, based at least in part on the one or more blank symbol information elements, that one or more beginning uplink symbols of the uplink transmission timing pattern configuration are tagged as the one or more blank uplink symbols; and
determining, based at least in part on the one or more blank symbol information elements, that one or more ending uplink symbols of the uplink transmission timing pattern configuration are tagged as the one or more blank uplink symbols.

4. The method of claim 1, further comprising:
determining that the timing and the specific carrier of the one or more uplink carrier switching periods for the retuning between the first carrier and the second carrier correspond to one or more uplink symbols of the uplink transmission timing pattern configuration of the first carrier based at least in part on the one or more blank uplink symbols in the uplink transmission timing pattern configuration and the specific carrier.

5. The method of claim 1, wherein transmitting during the single uplink transmission mode on both the first carrier and the second carrier comprises:
transmitting the uplink transmissions on the second carrier;
retuning from the second carrier to the first carrier based at least in part on the timing and a specific carrier of the one or more uplink carrier switching periods; and
transmitting the uplink transmissions on the first carrier and on one or more uplink symbols of the uplink transmission timing pattern configuration based at least in part on the retuning.

6. The method of claim 5, wherein the retuning from the second carrier to the first carrier occurs before the one or more uplink symbols of the first carrier.

7. The method of claim 5, wherein the retuning from the second carrier to the first carrier occurs after the one or more uplink symbols of the first carrier.

8. The method of claim 1, wherein transmitting during the single uplink transmission mode on both the first carrier and the second carrier comprises:
transmitting the uplink transmissions on the first carrier;
retuning from the first carrier to the second carrier based at least in part on the timing and specific carrier of the one or more uplink carrier switching periods; and
transmitting the uplink transmissions on the second carrier and on one or more uplink symbols of the uplink transmission timing pattern configuration based at least in part on the retuning.

9. The method of claim 1, wherein transmitting during the single uplink transmission mode on both the first carrier and the second carrier comprises:
transmitting the uplink transmissions on the first carrier and on one or more uplink symbols of the uplink transmission timing pattern configuration.

10. The method of claim 1, wherein transmitting during the single uplink transmission mode on both the first carrier and the second carrier comprises:
transmitting the uplink transmissions on the second carrier during a time duration corresponding to downlink symbols or one or more blank uplink symbols of the uplink transmission timing pattern configuration.

11. The method of claim 1, further comprising:
identifying an absence of one or more blank uplink symbols in the uplink transmission timing pattern configuration or in one or more information elements,
wherein the one or more blank uplink symbols correspond to the timing of the one or more uplink carrier switching periods for the retuning between the first carrier and the second carrier by the UE.

12. The method of claim 11, further comprising:
determining that the timing of the one or more uplink carrier switching periods for the retuning between the first carrier and the second carrier corresponds to one or more symbols of the second carrier based at least in part on the absence of one or more blank uplink symbols in the uplink transmission timing pattern configuration.

13. The method of claim 1, further comprising:
determining capability information of the UE; and
transmitting the capability information, wherein the uplink transmission timing pattern configuration is indicated based at least in part on the capability information.

14. The method of claim 1, wherein the uplink transmission timing pattern configuration is UE-specific.

15. The method of claim 1, wherein the uplink transmission timing pattern configuration is cell-specific.

16. The method of claim 1, wherein the first carrier comprises a time-division duplexing carrier.

17. The method of claim 1, wherein the second carrier comprises a frequency-division duplexing carrier.

18. The method of claim 1, wherein a quantity of blank uplink symbols corresponding to the timing of the one or more uplink carrier switching periods for the retuning between the first carrier and the second carrier is based at least in part on a location of the UE within a cell.

19. The method of claim 18, wherein the quantity of blank uplink symbols is higher at a cell edge of the cell compared to a cell center of the cell.

20. A method for wireless communication at a base station, comprising:

receiving capability information from a user equipment (UE);

determining, based at least in part on the capability information, an uplink transmission timing pattern configuration for use by the UE in transmitting uplink transmissions on a first carrier during a single uplink transmission mode, the uplink transmission timing pattern configuration comprising one or more blank uplink symbols corresponding to a timing of one or more uplink carrier switching periods for retuning between the first carrier and a second carrier by the UE in response to operating in the single uplink transmission mode, wherein a quantity of blank uplink symbols corresponding to the timing of the one or more uplink carrier switching periods for the retuning between the first carrier and the second carrier is based at least in part on a location of the UE within a cell; and transmitting an indication of the uplink transmission timing pattern configuration to the UE.

21. The method of claim 20, wherein transmitting the indication of the uplink transmission timing pattern configuration comprises:

transmitting a radio resource control message, wherein the indication of the uplink transmission timing pattern configuration comprises an information element in the radio resource control message.

22. The method of claim 20, further comprising:

configuring one or more information elements to indicate presence or absence of the one or more blank uplink symbols.

23. The method of claim 20, wherein the one or more blank uplink symbols correspond to one or more uplink symbols of the uplink transmission timing pattern configuration.

24. The method of claim 20, further comprising:

configuring one or more information elements to indicate that one or more beginning uplink symbols of the uplink transmission timing pattern configuration are tagged as the one or more blank uplink symbols.

25. The method of claim 20, further comprising:

configuring one or more information elements to indicate that one or more ending uplink symbols of the uplink transmission timing pattern configuration are tagged as the one or more blank uplink symbols.

26. An apparatus for wireless communication, comprising:

a processor, memory coupled with the processor; and instructions stored in the memory and executable by the processor to cause the apparatus to:

receive an indication of an uplink transmission timing pattern configuration for use by the apparatus in transmitting uplink transmissions on a first carrier, wherein the indication comprises one or more blank symbol information elements in a radio resource control message, the radio resource control message also including an indication of a specific carrier on which one or more uplink carrier switching periods are used for the retuning between the first carrier and the second carrier;

identify that the apparatus is to use both the first carrier and a second carrier during a single uplink transmission mode, wherein the apparatus transitions between sending the uplink transmissions on the first carrier and on the second carrier;

identify one or more blank uplink symbols based at least in part on one or more blank symbol information elements received with the uplink transmission timing pattern configuration, wherein the one or more blank uplink symbols correspond to the timing of the one or more uplink carrier switching periods on the specific carrier for the retuning between the first carrier and the second carrier;

determine, based at least in part on the uplink transmission timing pattern configuration, a timing of one or more uplink carrier switching periods for retuning between transmissions on the first carrier and on the second carrier; and transmit, during the single uplink transmission mode, on both the first carrier and the second carrier in accordance with the uplink transmission timing pattern configuration for the first carrier and the one or more uplink carrier switching periods.

27. An apparatus for wireless communication, comprising:

a processor, memory coupled with the processor; and instructions stored in the memory and executable by the processor to cause the apparatus to:

receive capability information from a user equipment (UE);

determine, based at least in part on the capability information, an uplink transmission timing pattern configuration for use by the UE in transmitting uplink transmissions on a first carrier during a single uplink transmission mode, the uplink transmission timing pattern configuration comprising one or more blank uplink symbols corresponding to a timing of one or more uplink carrier switching periods for retuning between the first carrier and a second carrier by the UE in response to operating in the single uplink transmission mode, wherein a quantity of blank uplink symbols corresponding to the timing of the one or more uplink carrier switching periods for the retuning between the first carrier and the second carrier is based at least in part on a location of the UE within a cell; and transmit an indication of the uplink transmission timing pattern configuration to the UE.

* * * * *